US010435274B2

(12) United States Patent
Chin et al.

(10) Patent No.: US 10,435,274 B2
(45) Date of Patent: Oct. 8, 2019

(54) SEAWORTHY, WATERTIGHT, FLOATABLE CONTAINER FOR AN OFFSHORE WIND TURBINE MAINTENANCE PROGRAM

(71) Applicants: Howard M. Chin, Kingston (JM); Kimberly A. Carraha, Weston, FL (US)

(72) Inventors: Howard M. Chin, Kingston (JM); Kimberly A. Carraha, Weston, FL (US)

(*) Notice: Subject to any disclaimer, the term of this patent is extended or adjusted under 35 U.S.C. 154(b) by 8 days.

(21) Appl. No.: 15/722,105

(22) Filed: Oct. 2, 2017

(65) Prior Publication Data

US 2018/0057321 A1 Mar. 1, 2018

Related U.S. Application Data

(62) Division of application No. 14/775,456, filed as application No. PCT/US2014/024634 on Mar. 12, 2014, now Pat. No. 9,821,984.

(Continued)

(51) Int. Cl.
*B63C 9/06* (2006.01)
*B66B 9/187* (2006.01)
(Continued)

(52) U.S. Cl.
CPC ............ *B66B 9/187* (2013.01); *B63B 23/28* (2013.01); *B63B 27/10* (2013.01); *B63B 27/32* (2013.01); *B63C 9/06* (2013.01); *B66C 23/207* (2013.01); *F03D 13/20* (2016.05); *B63C 2009/035* (2013.01); *E02B 17/0034* (2013.01); *E02B 2017/0091* (2013.01)

(58) Field of Classification Search
CPC ..... B66C 13/02; B63C 9/06; B63C 2009/026; B63B 1/047; B63B 27/16
USPC ........ 114/259, 349, 366, 378; 182/145, 150; 414/138.1
See application file for complete search history.

(56) References Cited

U.S. PATENT DOCUMENTS 1,259,809 A * 3/1918 Unruh .................... B63B 22/18
441/22
1,378,273 A * 5/1921 Giovanni Picco ...... B63B 1/047
441/87
(Continued)

FOREIGN PATENT DOCUMENTS

CN           1849242 A      10/2006
CN         101550917 A      10/2009
(Continued)

OTHER PUBLICATIONS

European Search Report dated Oct. 21, 2016 for corresponding EP Application No. 14769220.6.
(Continued)

*Primary Examiner* — Gregory W Adams
(74) *Attorney, Agent, or Firm* — Walter | Haverfield LLP; D. Peter Hochberg; Sean F. Mellino

(57) ABSTRACT

A container for maintenance capsule as a component of a maintenance system for an offshore wind turbine maintenance program. The container transports tools, parts and maintenance personnel to and from respective wind turbine towers. The container is seaworthy, watertight and floatable, and can be loaded on a maintenance vessel which carries the container to and from a wind turbine tower.

12 Claims, 30 Drawing Sheets

Related U.S. Application Data

(60) Provisional application No. 61/793,822, filed on Mar. 15, 2013.

(51) Int. Cl.
  *B63B 23/28* (2006.01)
  *B63B 27/10* (2006.01)
  *B63B 27/32* (2006.01)
  *B66C 23/20* (2006.01)
  *F03D 13/20* (2016.01)
  *B63C 9/03* (2006.01)
  *E02B 17/00* (2006.01)

(56) References Cited

U.S. PATENT DOCUMENTS

| | | | |
|---|---|---|---|
| 2,812,944 A | 11/1957 | Finch | |
| 2,812,974 A | 11/1957 | McHugh | |
| 2,854,154 A | 9/1958 | Hepinstall | |
| 3,994,373 A | 11/1976 | Loos et al. | |
| 4,074,818 A | 2/1978 | Ray | |
| 4,395,178 A * | 7/1983 | MacDonell | B63B 27/30 |
| | | | 114/259 |
| 4,405,263 A * | 9/1983 | Hall | B63C 11/52 |
| | | | 114/294 |
| 4,569,453 A | 2/1986 | Oustad | |
| 4,630,542 A * | 12/1986 | Peyre | B66C 13/02 |
| | | | 104/112 |
| 4,632,622 A | 12/1986 | Robinson | |
| 4,666,357 A * | 5/1987 | Babbi | B66C 13/02 |
| | | | 212/230 |
| 4,739,721 A * | 4/1988 | Peyre | B63B 27/36 |
| | | | 104/114 |
| 4,822,311 A * | 4/1989 | Doerffer | B63B 23/28 |
| | | | 114/349 |
| 5,713,710 A * | 2/1998 | Strong | B63B 27/10 |
| | | | 114/350 |
| 5,980,190 A | 11/1999 | Takeda | |
| 7,069,874 B2 * | 7/2006 | Lavorata | B63C 9/02 |
| | | | 114/365 |
| 8,051,790 B2 | 11/2011 | Colangelo | |
| 2006/0236912 A1 * | 10/2006 | Haavie | B63B 27/16 |
| | | | 114/382 |
| 2009/0242581 A1 | 10/2009 | Heitkoetter | |
| 2010/0293781 A1 | 11/2010 | Foo et al. | |
| 2012/0227659 A1 * | 9/2012 | Bertsch | B63B 1/047 |
| | | | 114/349 |
| 2012/0282099 A1 | 11/2012 | Munk-Hansen | |
| 2012/0328442 A1 | 12/2012 | Davis | |
| 2013/0025522 A1 | 1/2013 | Prins | |
| 2013/0089405 A1 | 4/2013 | Wigant et al. | |

FOREIGN PATENT DOCUMENTS

| | | |
|---|---|---|
| CN | 102114902 A | 7/2011 |
| CN | 202186506 U | 4/2012 |
| EP | 0053770 A2 | 6/1982 |
| EP | 2551233 A1 | 1/2013 |
| WO | 2011150930 A1 | 12/2011 |
| WO | 2012148109 A2 | 11/2012 |

OTHER PUBLICATIONS

Chinese First Office Action dated Sep. 29, 2016 and Search Report dated Sep. 19, 2016 for corresponding CN Application No. 201480015856.4.

* cited by examiner

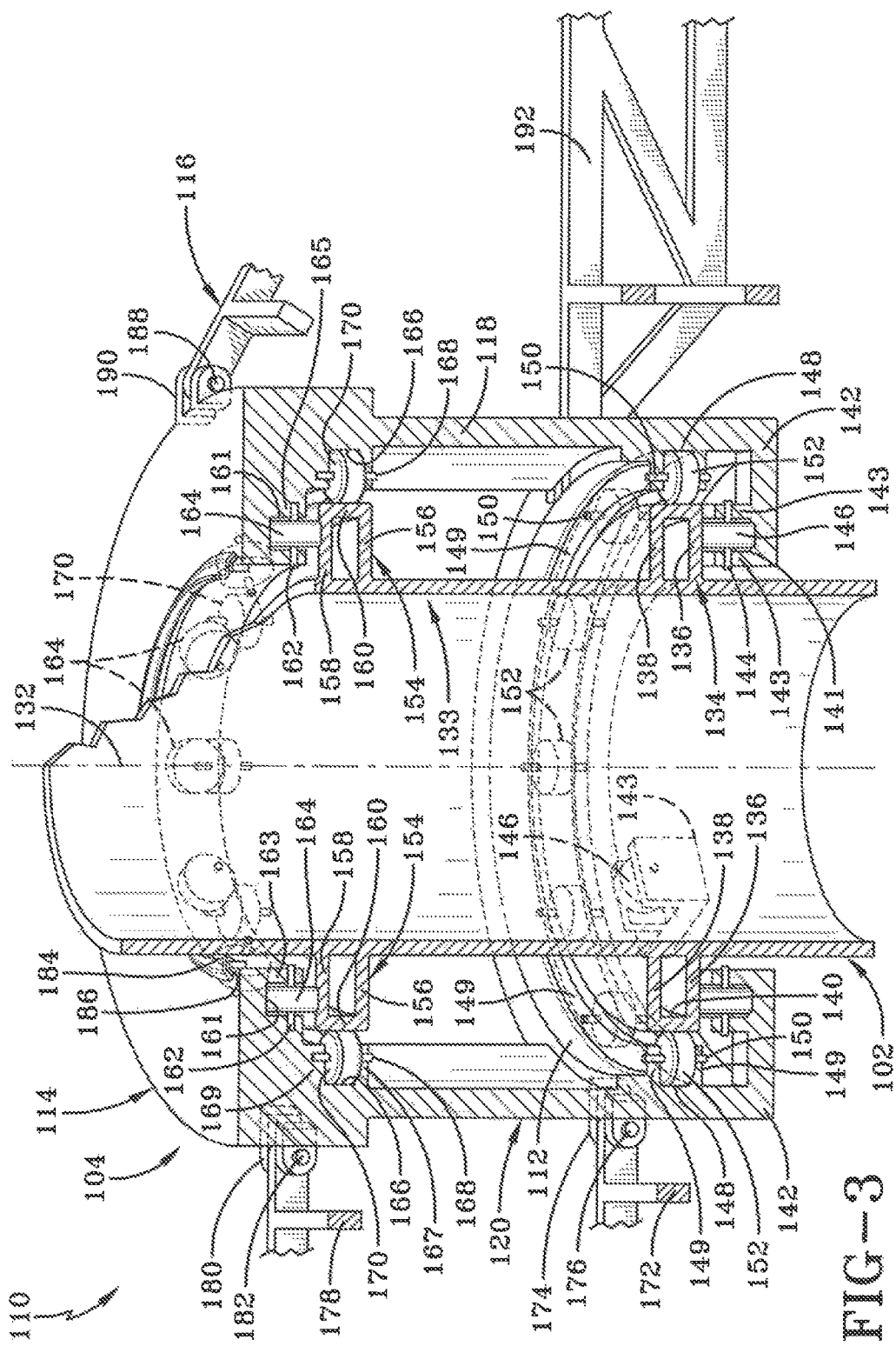

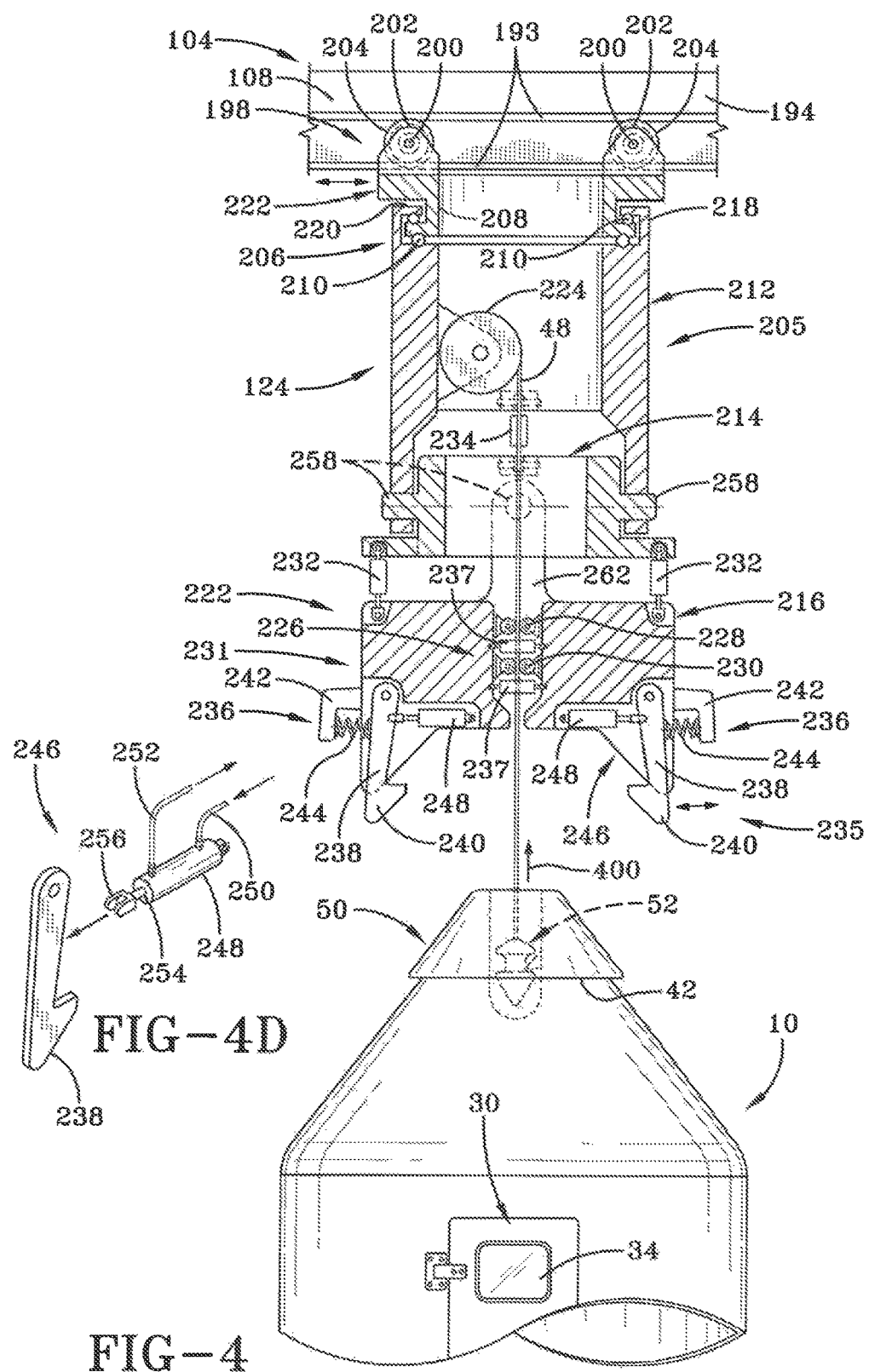

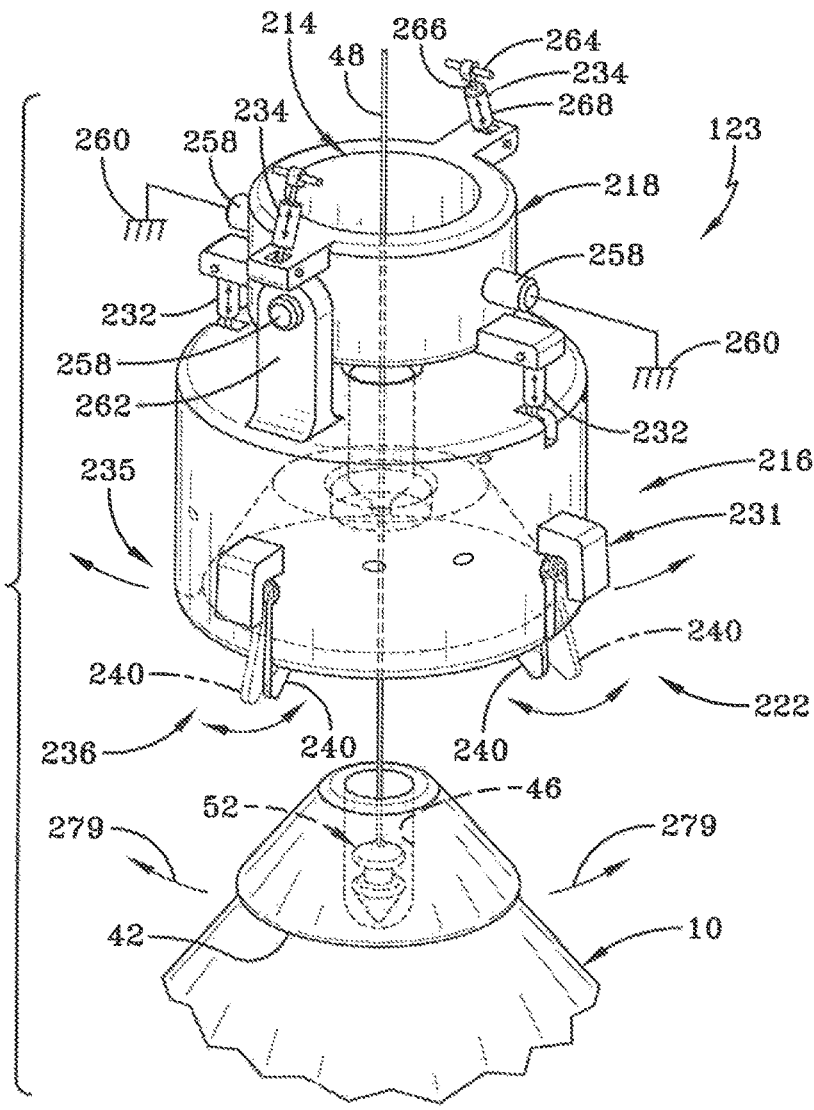

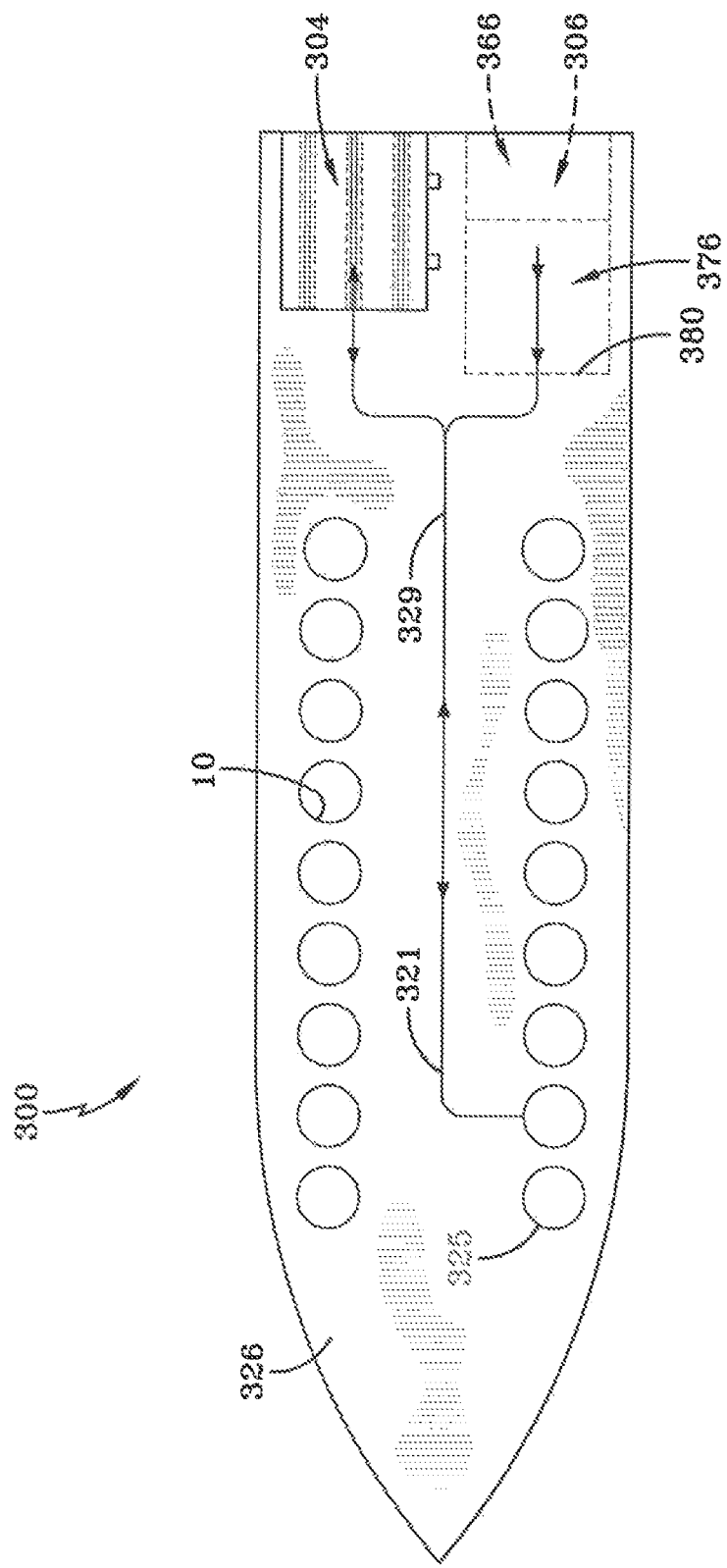

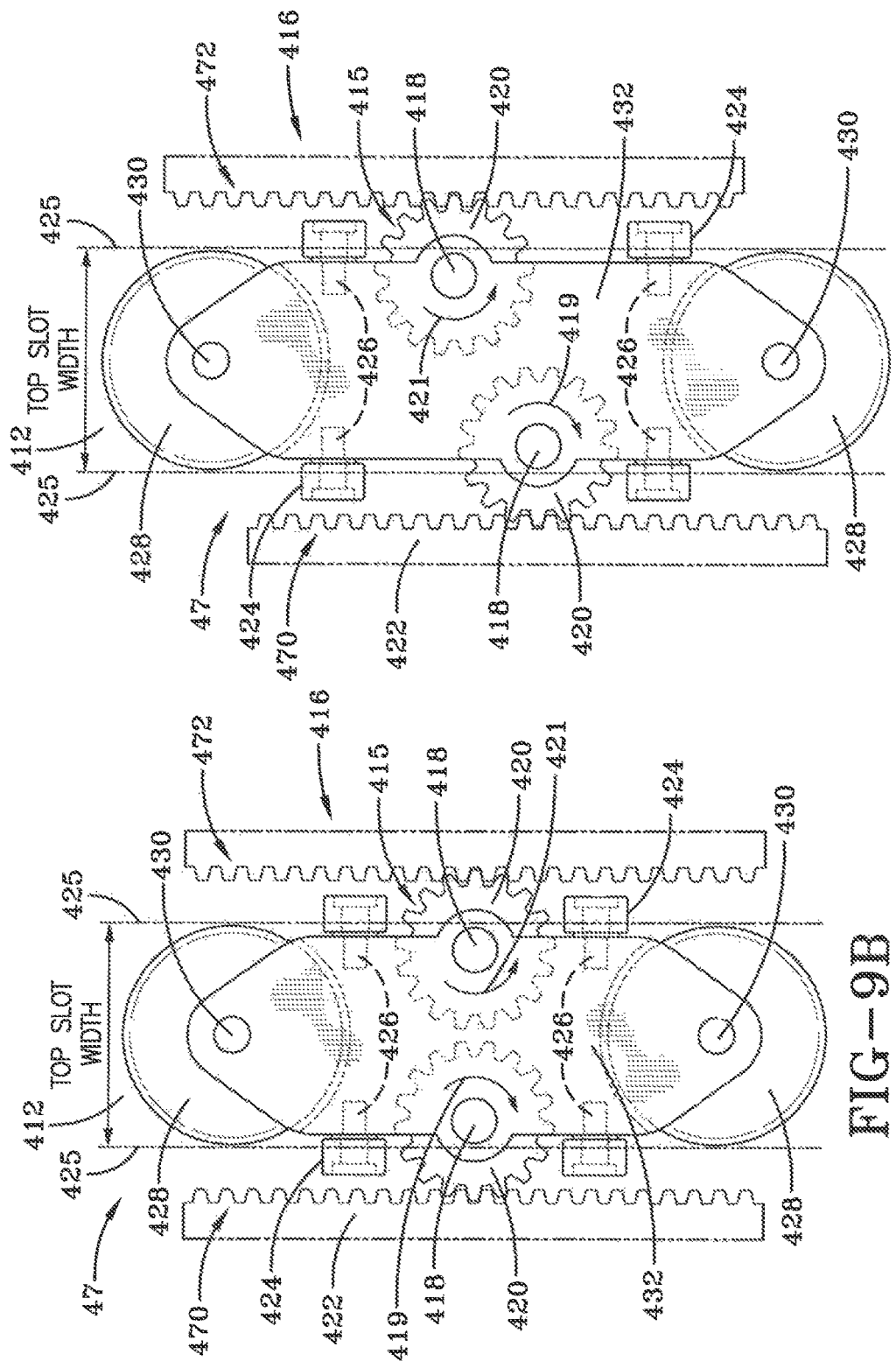

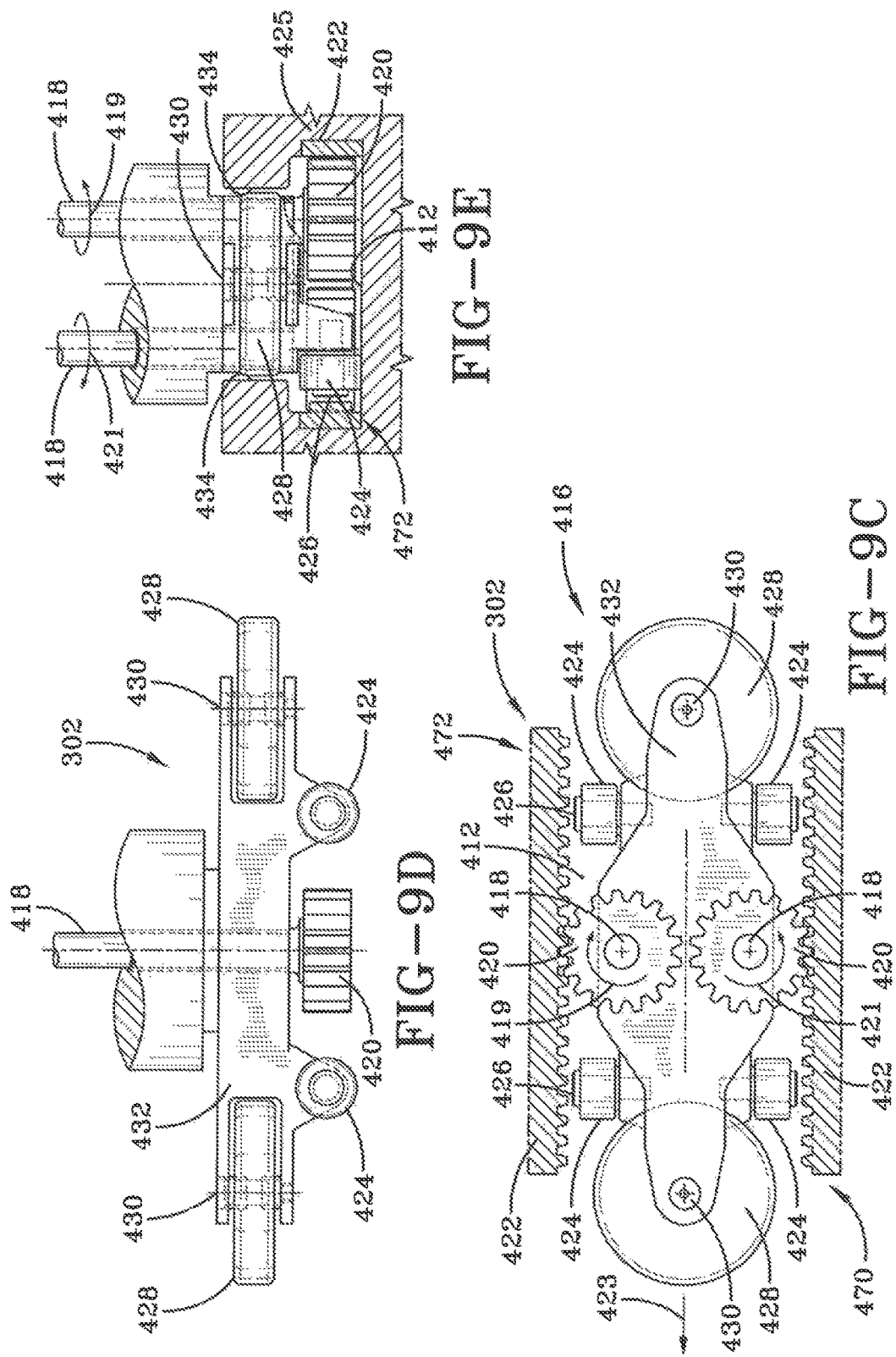

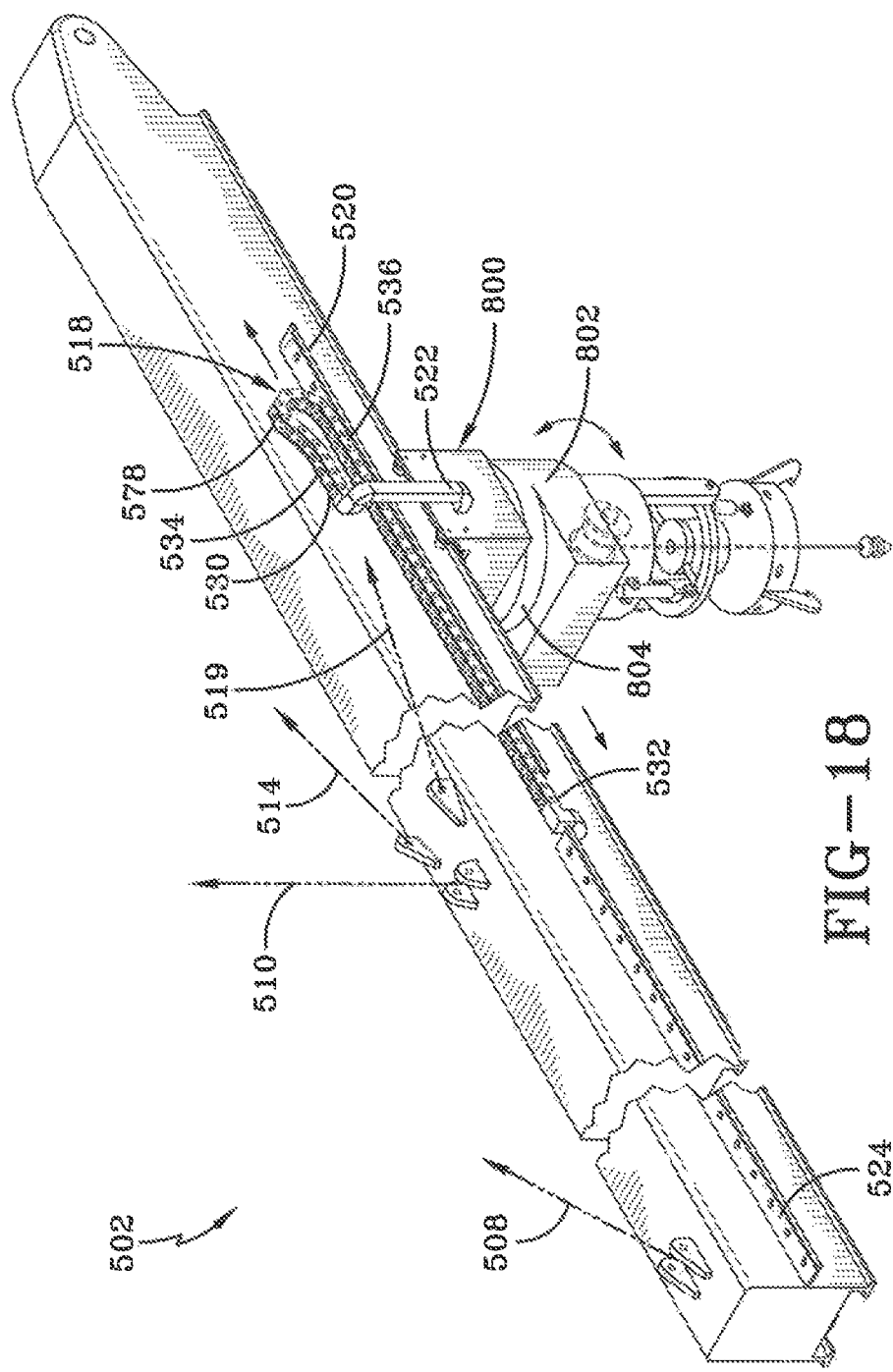

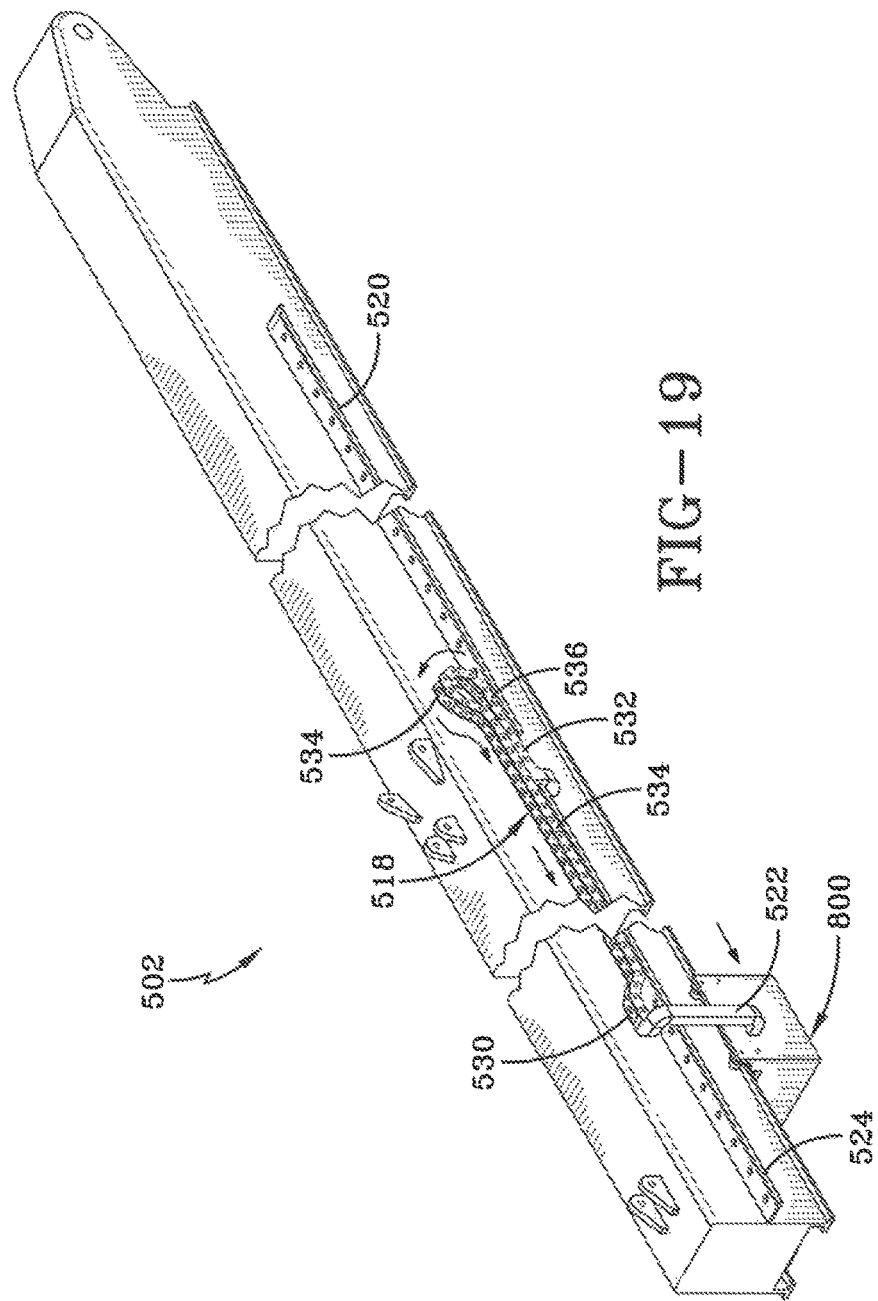

SEAWORTHY, WATERTIGHT, FLOATABLE CONTAINER FOR AN OFFSHORE WIND TURBINE MAINTENANCE PROGRAM

CROSS-REFERENCE TO RELATED APPLICATION

This application is a divisional of U.S. patent application Ser. No. 14/775,456 filed Sep. 11, 2015, which is a National Stage application of International Application No. PCT/US2014/024634, filed on Mar. 12, 2014, which claims priority of U.S. Provisional Application No. 61/793,822, filed on Mar. 15, 2013, all of which are incorporated herein by reference in their entireties.

BACKGROUND OF THE INVENTION

Field of the Invention

This invention relates to the maintenance of wind turbines mounted on towers located in bodies of water, and in particular to containers and capsules for transporting workmen or maintenance personnel, tools and parts to and from such wind turbines.

Description of the Prior Art

Wind turbines are currently being used or expected to be used offshore in wind farms. Wind farms are essentially multiple wind turbines disposed in the same locale for generating large amounts of electric power. There are presently thousands of wind farms in a number of countries throughout the world producing about 200 gigawatts of electrical energy, and this number is expected to increase tremendously over the coming decade as low cost oil supplies are depleted and fear of nuclear power increases due to accidents. In China alone where air pollution due to coal-fired power plants is affecting vast areas, they expect over the years to produce near 750 gigawatts of electrical energy from wind farms. Many wind farms are offshore since there are less obstructions to the wind than on land, so that the average wind speed is considerably higher over open water. However, offshore wind farms are more expensive to build than are wind farms on land, and the maintenance costs are relatively higher, particularly in salt water, since the salt water and sea spray are corrosive towards most of the components of wind turbines. Most wind farms that are offshore have wind turbines described as fixed-bottom turbines, that is, having their support towers founded on the sea floor. More recently, floating wind turbines anchored to the sea floor in even deeper water have been constructed. Power is transmitted from offshore turbines by means of undersea cables.

Amongst the conditions which have to be accounted for in an offshore wind farm are waves. Waves are generally under 2.5 m, and the average should be considered to be 3 m. However, high wave conditions occur occasionally, and the maximum survival waves have been determined to be 9.7 m. Currently, for safety reasons, wind turbine maintenance should currently generally not be attempted when the swell conditions exceed 1.5 m.

There are number of maintenance systems currently employed for wind farms. One is the step transfer system. In this system, a vessel sails from a port and conducts operations and maintenance on the respective wind turbines as required. Personnel step off the vessel onto a ladder on the tower holding the wind turbine and attach themselves to a sliding safety harness between the two vertical poles of the ladder and then climb upwards as required. The maximum wave height is usually 1.5 m for safe transfer using the step transfer system. The step transfer system is widely used, and relatively simple and cost effective. However, there are safety implications, and it can be difficult to perform the operations and maintenance required during periods when there are high currents or wave heights above 1.5 m. The occurrence of periods of high waves could delay access and prevent departure increasing the total time to perform the operations and maintenance, and trapping the limited number of maintenance personnel on board the wind turbine tower apparatus, rendering the step transfer system inefficient. It is desired that turbine wind towers should be accessible about 95% of the time, but it has been found that the step transfer system is operable about 75% of the time in the summer and below 45% of the time in the winter. It has been judged that the step transfer system is unlikely to be the best method for use in many wind farms.

Another system involves the use of lifts and cranes, and this is presently the industry standard for transferring tools and equipment to the workmen on offshore turbines. Lifts and cranes are used to transfer equipment, but rarely personnel, all in relatively good weather.

Another system is called the "Waterbridge," which is an inflatable bridge attached to a vessel and presented to a wind turbine through the attachment of a cable to the foundation of the wind turbine. The cable is kept taut with a constant tension winch. The object of the technology is to absorb the vessel motions through passive use of the inflatable bridge, and the vessel would have the same motion as it would if it were at anchor. In use, a vessel approaches the foundation of the wind turbine, and a cable is hooked over a set of upward curved "Rhino Horns" on a transition piece. The cable is tensioned and the vessel retreats from the wind turbine. An inflatable bridge is then winched up the cable to make positive contact with a ladder on the turbine tower. Personnel are then transferred across the bridge to the ladder. The Waterbridge is cost effective in that it can be deployed when necessary from a vessel and only one platform is needed for all turbines. It can be retrofitted to an existing access boat. A fall arrest lanyard is required for safety purposes. However, only limited field tests have been performed with the Waterbridge. Another shortcoming is that transfer in marginal wave swell conditions may be difficult because the Waterbridge is fixed at the turbine, and it will still be moving up and down significantly at the boat end, because it only uses passive damping of the waves.

The Ampelmann is a stand-alone offshore access system. The Ampelmann must be used with a large vessel. It is quite sophisticated using a reverse flight simulator to compensate for the motion of the waves beneath the boat. The Ampelmann has been used in the oil and gas sector. It can be used on any vessel which is more than 50 m in length and can be used by a small crew. It does not require dynamic positioning or adjustments to the vessel. However, it is very expensive and may not be cost effective. It is also quite complicated, having complex moving parts requiring high maintenance. Another problem is the possible leakage from the hydraulics.

The Momac Offshore Transfer System 500 ("MOTS 500") is a self-stabilizing system for providing safe access to offshore structures by actively compensating for motions of the vessel, rather than passive compensation through hydraulics and damping. MOTS 500 uses proven robotics technology and real-time motion measurement equipment. It can be installed on small and fast vessels, and can be used on existing transfer structures without modification. It has been found to be safe, even in the case of power breakdown or other failures, and requires low maintenance and has a seaworthy construction. The problem with MOTS 500 is that is has not been previously tested in an offshore wind project. It cannot be retrofitted to an existing vessel and it must be able to carry a minimum of three tons at the stern/bow.

An Offshore Access System/Offshore Transfer System ("OAS/OTS") is essentially a combination of the Waterbridge and the Ampelmann. The OAS/OTS is a passive bridge extending from the boat to a turbine, and is anchored against the turbine in the same way as is the Waterbridge, and is deployed in a manner similar to that of the Ampelmann. It is effective in that it is secured to the ladder at the turbine tower, and it allows greater time to secure fall arrest lanyards at the latter. However, the OAS/OTS is bulky, requiring a large vessel. It only offers a small improvement over existing practices for significant wave heights. The transition piece would probably require several modifications. It has not been used in offshore wind turbines, and could be very costly.

The Small Waterplane Area Twin Hull ("SWATH") is another possible means for maintaining wind turbines. This system uses a special type of catamaran which is a very stable vessel. The previously described step transfer system can take place with a catamaran or a specially designed platform for installation on a catamaran vessel when personnel are to be transferred to the turbine. SWATH has been used for a number of years in the North Sea, and could be used with a deployable Reinforced Inflatable Boat ("RIB"). Furthermore, the catamaran would reduce the incidence of seasickness. However, a catamaran does have a large draft of about 3 m which would limit its shallow water operation. Furthermore, the proposed catamaran would be 29 m long, which is quite long and would increase the operating expense of the system.

Another possible system for maintenance of offshore wind turbines is Safe Offshore Access ("SASH", a Swedish acronym). SASH is docking system wherein personnel boarding a fixed structure can step onto it by taking only one step from one horizontal plane to another. This procedure minimizes the time when the boarding personnel are exposed or vulnerable to risk. The boat is an integrated part of the system and facilitates the transfer to the fixed structure because of its raised platform. The system itself has several raised platforms, for stepping onto a raised platform of the wind turbine tower. The boat can move 180.degree. around the docking point between the boat and the tower. The complete SASH system has two diagonally mounted piles per wind turbine so that the boat can always meet the sea bow on. The bow and fender of the boat make it possible to use the boat's engine to control the friction needed to keep the boat stable in terms of the rolling and vertical movements. The boarding personnel do not need to jump or climb, but are able to walk from one fixed structure to another without stress and without any time pressure. This is a fast and improving method. However, since there is only a single hinge point between the pressure point, this magnifies the gap between platform and vessel during high sea states which may render this system unsafe. Also, the SASH system may not be applicable to all foundation types. It is not adapted for tides, which would seem to be necessary. It is currently only used on a Swedish lighthouse and requires a high level of skill of the vessel's skipper.

A Sliding Ladder ("SLILAD") is a turbine mounted passive system from Momac GmbH & Co. KG, a German company that produced the MOTS 500 discussed earlier. In operation, the SLILAD is fixed to the vessel so that there is no relative movement when the personnel step across the ladder. Once the personnel are securely on the SLILAD, it becomes fixed to the platform and the personnel are able to climb up it if there is no relative movement between the SLILAD and the platform. Since SLILAD has automatic tide level adjustment, there will be no growth of mussels or vegetation on the used part of the latter. The SLILAD has a simple and seaworthy construction, and it is easy to use. However, Momac is no longer developing the SLILAD so it may not be hereafter commercially available. There is an expense involved in maintaining SLILAD and there is a risk of damage due to the large number of moving parts.

Helicopter transfer is well-known. A heli-hoist pad is installed on each wind turbine. Personnel and equipment are winched down one at a time. A maximum of five technicians can be transferred using a helicopter. Helicopters are expensive, and although they can be operated with many kinds of sea-state, they certainly would be dangerous in inclement weather or if the wind turbine is operating. Helicopter transfer is fast, but expensive and the number of personnel and amount of equipment that can be carried per trip is limited. There are risks, health and safety concerns. Helicopters have higher maintenance requirements, are relatively energy inefficient, and are limited in operative range.

Another possible system is the Personnel Transfer System ("PTS") which is a crane and winch system which is only being developed at this time. It is operated remotely and involves a vessel with fuzzy logic control. It can transfer one load of equipment and one person to the turbine. There have not been any instances of this technology being utilized, although there is at least in one study in which it has been considered. Among its strengths are that there is no risk associated with climbing the transition piece ladder as the PTS lifts. The PTS could be retrofitted to existing vessels, and there is no mechanical contact between the vessel and the turbine. However, amongst its weaknesses is that only one person could be transferred at a time, rendering it slow and involving significant waiting times for persons waiting transfer. Also, a person would not feel safe when suspended several meters above the sea being only supported by a harness, so that survival suits would be necessary. More importantly, this type of maintenance system is only in its preliminary stage, and it is not ready for operation.

A recent development is the Houlder's Turbine Access System ("HTAS"). It is essentially a passive damping mechanism similar to the OAS/OTS discussed earlier, but on a smaller scale which could be fitted to small vessels. It has a unique tuned damping system to reduce the vessels motion response at the bow, but does not attempt to maintain the bow stationary relative to the tower. An access ramp is heave and roll compensated to provide a constant transfer position relative to the tower, either by way of a ladder or platform depending on the tower configuration. The HTAS has been shown to provide for safe transfer at wave heights of 2 m without any relative movement between the access ramp and platform position. Amongst its advantages are that it would require small adjustment to existing procedures and vessel designs, that it is relatively inexpensive and may be economically more favourable than the previously described SWATH and other systems. However, the only increase is the safe access for swell heights exceeding by 0.5 m from 1.5 m to 2 m, but it comes from a company without sufficient reputation or experience, and would require a lot of testing.

A new proposal for maintaining offshore wind turbines is a wave deflection harbour. The purpose of this device is to eliminate waves entirely. It would fit over a transition piece and be attached to a bearing which rotates freely around the position piece according to the direction of the current. When a boat approaches, the deflection harbour would be able to lock into position by use of a remote control operated braking mechanism, similar to that used to stop turbine blades on some wind farms. The wave deflection harbour is a pair of walls which are flat and meet at a point, with the separated walls being connected by a curved wall. The proposed design moves the stagnation point back further into incoming water so that the water will attempt to reattach further from the transition piece, and when it does, it would actually help the vessel into the local harbour. The free rotation of the wave deflection harbour assures that it will be in the correct position for desired flow conditions to occur. The biggest design constraint is the force that is exerted on the foundations. Amongst its advantages are that it could save costs in the long run, that it could increase the size of allowable sea swells and could be applied in many wind farms. However, while the wave deflection harbour is still at its design stage, it may not be cost effective, it would add to capital expenditures, it would require more time through research, testing and prototyping, it may not be operable with some foundation types and the waves may come from a different direction than the current, and could have an adverse effect on the local sea state conditions.

An offshore wind farm maintenance vessel has been prepared by Offshore Ship Designers, an Anglo-Dutch company. It is intended to improve options of deep water wind turbines, reduce maintenance costs and carbon emissions. A mother ship remains in offshore deep water wind farms and has a number of catamaran workboats which carry wind turbine engineers to service the wind turbines. It is a submersible dock ship intended to accompany the foregoing engineers, as well as a crew, service personnel, ships and a support crew. It is further intended to remain offshore rather than reporting to port, and workboats are deployed from the dock ship. It is intended that the fast catamaran and monohull workboats go out from shore to wind farms closer to shore, but not for deep water wind farms. The dock ship is also intended to support Autonomous Rescue and Recovery Craft which are safe watercraft and can support marine and helicopter operations remote from the mother ship in emergency or rescue operations, limited only by their rough weather capabilities. The largest mother ship is intended to accommodate up to 200 engineers and would have extensive recreational, catering facilities and a waste handling plant. A support vessel is intended to carry twenty five wind turbine engineers and carry fuel, potable water, dry and refrigerated storage containers. It is supposed to have a crane, a walkway and two daughter workboats. This concept appears to be very extensive.

A container is disclosed in U.S. Patent Publication No. 2009/0242581 (Heitkoetter). However, Heitkoetter discloses a container which is used for holding dense materials and which can be locked to prevent an end door from swinging open rapidly due to the weight of the material or pressure of the material inside the container (Par. [0034]). The sides are angled to facilitate dumping of the material from the container when the end door is opened (Par. [0035]). The container of Heitkoetter is watertight, and does have vents for allowing gases to leave the container but prevent anything from entering the container (Par. [0039]). There is nothing in the publication indicating that the container of Heitkoetter is floatable. Nothing in Heitkoetter suggests that it is floatable when filled with dense materials or that it can be used for transporting personnel and tools for repairing a wind turbine or anything else.

European Patent Publication No. 0 053 770 (MacDonell et al.) discloses a carrier which is adapted to be moved between a first platform and a second platform in the off-shore oil industry. For example, it can be moved from a water vessel to a platform located above the water. It then would have to be moved from the platform to the vessel, all during the possible occurrence of high waves. The carrier is described for personnel transfer to carry as many as thirty people. The carrier is not described as being seaworthy meaning capable of voyaging safely upon the sea, watertight or floatable. Chinese Patent Application No. 202186506 (U) discloses a lift diving site-seeing chamber having a glass chamber and a camera through which a person, who could be a tourist, can view the exterior of the diving sightseeing cabin. There is every indication that this diving cabin is meant to sink, in diving it is only supported by a cable or cables run over pulleys affixed to the top of the diving sightseeing cabin, and it could not be used to carry personnel and tools for repairing an offshore wind turbine or any other type of such unit.

SUMMARY OF THE INVENTION

It is an object of the present invention to provide a seaworthy container for use with a system for maintaining offshore wind turbines.

Another object of the present invention is to provide a seaworthy container for use with a maintenance system for maintaining wind turbines in a wind farm.

A more specific object of the present invention is to provide seaworthy container for use with a maintenance system for wind turbine tower apparatus used in offshore wind farms for carrying maintenance personnel, tools and parts to and from a wind turbine tower.

It is a further object of the present invention to provide a seaworthy container for a maintenance system for maintaining offshore wind turbines, which container can be quickly and safely transferred between a maintenance vessel and a wind turbine tower apparatus, regardless of the weather or sea conditions.

A further object of the present invention is to provide a seaworthy, watertight, floatable container for a wind turbine maintenance system for maintaining offshore wind turbine tower apparatuses.

It is also an object of the present invention to provide a seaworthy container that can be transported by a launch/recovery ("L/R") cradle for the purposes of being launched from, received by, moved by and stored on a maintenance vessel.

It is yet additional object of the present invention to provide a container which is watertight, and can hold up to five and possibly more repair persons along with the necessary tools and parts for removing and replacing the defective or worn parts on the respective wind turbines or diagnose and restart them, for a wind turbine maintenance system as described above.

It is yet another object of the present invention to provide a seaworthy maintenance capsule holding a container which is buoyant in case the maintenance capsule should fall into the surrounding sea, both to protect any repair personnel on board and the parts and equipment carried therein and to propel itself away if necessary from colliding with the wind turbine tower when it is deposited in the sea, for a maintenance system for wind turbine tower apparatus.

It still a further object of the present invention to provide a maintenance capsule as described above that is capable of holding up to five repair persons and possibly more, and a ton or more of equipment.

A general object of the present invention is to provide a seaworthy container for all-weather maintenance system for offshore wind turbine tower apparatus, which container is safe, efficient and effective in operation, and which can be constructed and used economically.

These and other objects will be apparent to those skilled in the art from the description to follow and the appended claims.

BRIEF DESCRIPTION OF THE DRAWINGS

FIG. 1A is a detailed cross sectional, schematic view of the upper part of the maintenance capsule shown in FIG. 1.

FIG. 3 shows a partial cross sectional, perspective view of the crane assembly on a wind turbine tower apparatus as shown in FIG. 2.

FIG. 4 shows a partial cross sectional, schematic view of a trolley on a truss extending from an offshore wind turbine tower raising a maintenance capsule according to a preferred embodiment of the invention. FIG. 4D is a detail exploded view of part of a latching assembly incorporated in the trolley.

FIG. 5 is a perspective, schematic view of the lower part of a trolley transporting a maintenance capsule according to a preferred embodiment of the invention.

FIG. 6 is a partial, schematic, cross sectional view of a damping mechanism portion of a gimbal latching assembly according to a preferred embodiment of the invention.

FIG. 7A shows an alternative path to that shown in FIG. 7.

FIGS. 9B, 9C, 9D and 9E are schematic top, bottom, side and end elevations of a gear drive assembly for the L/R cradle shown in FIG. 9.

FIG. 9F is a top elevation of an alternate gear drive assembly from that shown in FIG. 9B.

FIG. 18 is a perspective view of a flexible services carrier in a crane boom which supports a trolley, and FIG. 19 is a perspective view of a flexible services carrier in a crane boom.

DETAILED DESCRIPTION OF THE PREFERRED EMBODIMENT

The present invention in its preferred form includes as its basic components a maintenance capsule with a container which would carry a group of repair personnel and their equipment for maintaining an offshore wind turbine on a wind turbine tower and for returning repair personnel and equipment to a maintenance vessel such as a ship or boat. The equipment comprises tools and replacement parts. The maintenance capsule and the container are conveyed from and to a wind turbine tower apparatus by means of such a maintenance vessel. The maintenance vessel would carry a number of maintenance capsules configured as required and they would each be transferred to a wind turbine tower apparatus by means of an appropriate crane apparatus or assembly which is also part of the invention, which is located at the wind turbine tower apparatus. The maintenance capsule and the container must be as strong or stronger than shipboard escape vehicles or pods of the type that are dropped from the stern of a ship from considerable heights into the sea (any body of water is referred to herein as the sea). The container preferably has a cylindrical shape with truncated upper and bottom portions. As explained earlier, the maintenance capsule in its preferred form is able to carry five persons or possibly more plus the necessary equipment. The term capsule includes the container and other auxiliary items. In some cases, the capsule and container are one and the same.

In calm conditions, the maintenance capsule is transferred to and from a maintenance vessel and a wind turbine tower apparatus by means of a winch aboard a trolley disposed on a crane assembly on the wind turbine tower apparatus. In moderately severe conditions, deployment to the wind turbine is achieved by connecting a strong floating rope from the trolley to be collected by the maintenance vessel, locked into a receptacle atop the maintenance capsule which is pulled off the said vessel. Retrieval by the vessel is done by a strong floating rope deployed from the bottom of the capsule which is captured by the maintenance vessel and pulled by a winch on the vessel onto a launch/recovery cradle on the vessel. In the case of the most severe weather, deployment to the wind turbine is achieved in the same manner as moderately severe conditions, except that the maintenance vessel stands off as the maintenance capsule is dragged off into the sea and then upwards. Recovery under the most severe conditions is achieved when the maintenance capsule is dropped in the sea, and a miniature radio-homing boat transports a strong line therefrom to the maintenance vessel, whereupon a strong floating rope is pulled out of the capsule by the use of said line and then captured by the vessel for pulling the capsule up a raisable recovery ramp in the vessel. Maintenance capsules are stored and transported on and within the vessel on launch/recovery cradles.

Figure 1:
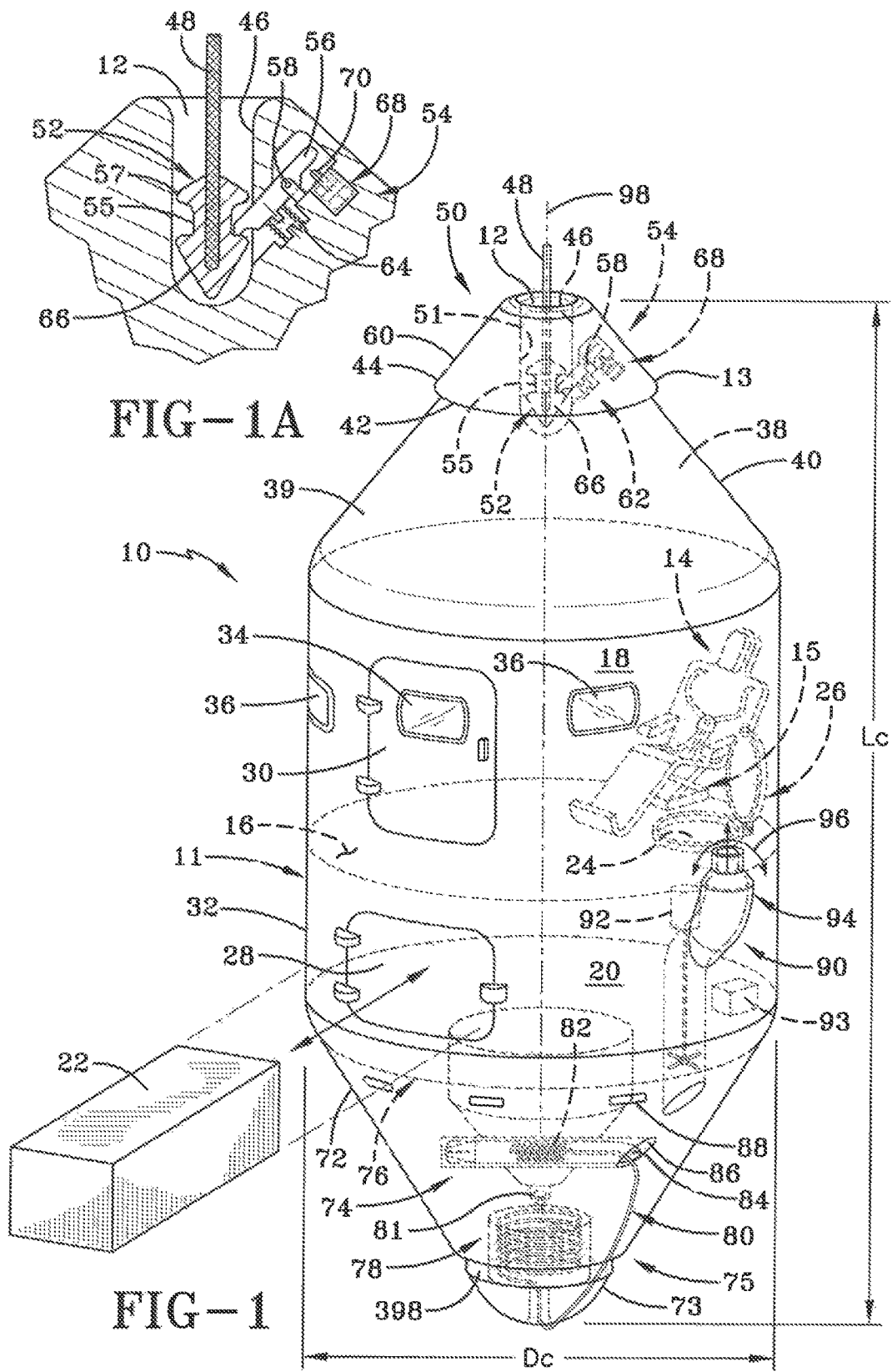
FIG. 1 is a perspective, partially cut-away, schematic view of a maintenance capsule according to a preferred embodiment of the invention.

Referring to FIG. 1, a maintenance capsule 10 is shown in schematic form in an upright position. Capsule 10 includes a seaworthy, watertight, floatable container 11 having various walls and other external and internal structures. A rope, cable or other capsule attachment line discharge port 12 is located in a first end 13 at the top of maintenance capsule 10 for holding a floatable rope, releasable cable or other capsule attachment line as discussed below. A series of seats or other person support structure 14 (only one is shown) shaped to hold maintenance personnel during transport of maintenance capsule 10 are included, it being preferred that there are up to five or possibly more such seats 14 for persons as required. Each seat 14 preferably includes appropriate shock absorber 15 shown schematically. Maintenance capsule 10 further has a watertight bulkhead 16 separating a personnel compartment 18 in which seats 14 are located, from a storage or cargo compartment 20 in which tools and parts and other equipment shown in a storage box 22 for a wind turbine are stored and appropriately restrained. Access from personnel compartment 18 to cargo compartment 20 is by way of a hatch assembly 24 in bulkhead 16.

Hatch assembly 24 includes a hatch cover 26 as is common in seagoing vessels. Personnel compartment 18 further has an access door 30 going through a generally cylindrical outside outer wall 32, forming the outside of personnel compartment 18 and cargo compartment 20. Door 30 interfaces with the exterior of capsule 10. Personnel compartment 18 may have a window 34 in door 30, as well as a series of windows 36 in the rest of personnel compartment 18. A cargo compartment access door 28 through which storage box 22 can be moved is provided. Doors 28 and 30, and windows 34 and 36 are all watertight, as is the rest of maintenance capsule 10 to render it seaworthy. As explained below, the weight distribution of maintenance capsule 10 is such that when it is disposed in the sea, it floats with a longitudinal axis 98 near horizontal.

Another watertight bulkhead 38 forms a ceiling for personnel compartment 18, for defining a second compartment 39. A truncated conical outer shell 40 extends between the top of outer wall 32 to a shoulder 42. A truncated wall 44 has a wider diameter than is the diameter at the upper end of outer shell 40, for defining shoulder 42 and concludes at capsule attachment line discharge port 12. As explained later, shoulder 42 is symmetrical about longitudinal axis 98, and can be latched to the lower part of a trolley 124 (FIG. 2) on a boom of a crane on a wind turbine tower apparatus 100 having a wind turbine 101 positioned on a wind turbine tower 102. A recess portion 46 in a nose portion 60 of capsule 10 is provided to define rope or cable receiving and discharge port 12.

A rope, cable or other capsule attachment line 48 is received by a capsule attachment line holding-and-releasing apparatus 50 including a receptacle 51 suitably radiused at the entry to avoid cutting or fatiguing said rope or capsule attachment line 48, in a capsule attachment line engaging apparatus forming part of said capsule line, in the form of a barb 52 and fixed on said capsule attachment line 48 by some appropriate means such as swaging. Barb 52 and capsule attachment line 48 are releasably held in recess portion 46 by a holding mechanism 54, shown in enlarged form in FIG. 1A. Barb 52 has an annular depression 55 for receiving the nose of at least one ratchet 56 mounted on a pivot 58 fixed in nose portion 60 of maintenance capsule 10. The diameters of a head portion 66 and a tail portion 57 of barb 52 are the same, so that the longitudinal axis of barb 52 will be closely aligned with the longitudinal axis of recess portion 46. An internal structure may be required in some instances so that barb 52 can swivel relative to capsule attachment line 48 to avoid undue twisting of said line 48. Ratchet 56 is loaded by a spring 64 to the latched position, meaning that ratchet 56 engages head portion 66 of barb 52 and releasably holds barb 52 and capsule attachment line 48 fixed in recess portion 46 of nose portion 60 of maintenance capsule 10. Various ratchet control apparatuses can be used for selectively releasing barb 52 from recess portion 46. Barb 52 may also incorporate a floatation compartment or body sufficient to allow barb 52 to float on the sea. The one employed as shown in FIG. 1A is a hydraulic or pneumatic piston assembly 68. When it is decided to unlatch barb 52 and capsule attachment line 48 from recess portion 46, hydraulic piston assembly 68 is activated by some appropriate means such as an electro-mechanical actuator (not shown), and a piston rod 70 is driven forward to rotate ratchet 56 counterclockwise, with enough force to overcome the load imposed by spring 64 plus frictional and other loads. The rotation of ratchet 56 about pivot 58 releases barb 52. Capsule attachment line holding-and-releasing apparatus 50 includes each of said receptacle 51, barb 52, holding mechanism 54, ratchet 56, pivot 58, spring 64, piston assembly 68 and piston 70.

Returning to FIG. 1, a truncated shell or operational compartment outer walls in the form of a truncated conical outer wall 72 forms an outside of capsule operational compartment 74 of maintenance capsule 10. Truncated annular wall 72 has a groove 398 near a lower end 73 of maintenance capsule 10. A watertight bulkhead 76 is disposed across the top of operational compartment 74 to separate the latter from cargo compartment 20. Disposed inside of operational compartment 74 is operational equipment 75 including a towrope storage compartment 78 in which a tow line in the form of a towrope 80 is coiled and attached to maintenance capsule 10 by a lug or attachment point 81 on towrope 80. Towrope 80 has at its other end a connecting loop or other form of termination to which a light line 82 is secured, and by which towrope 80 can be collected and attached to a winch drum or cable aboard the maintenance vessel so that towrope 80 may be wound onto said winch drum. Spool of light line 82 may be stored on board a miniature radio-homing boat 84 if towrope 80 is too stiff or heavy to be easily otherwise dispensed. Towrope 80 can be composed of woven wires (i.e. a cable or wire rope), plastic or other fibers or a combination thereof, fibers or any other material capable of withstanding the forces, stresses and strains to which towrope 80 is expected to endure. Light line 82 is secured to and stored on a dispensing spool within miniature radio-homing boat 84 located in a miniature radio-homing launch tube 86. Miniature radio-homing boat 84 may directly take out towrope 80, if towrope 80 is sufficiently light and strong, and permit its collection by a maintenance vessel 300 as described hereinafter. Operational equipment 75 further includes the foregoing miniature radio-homing boat launch tube 86.

Maintenance capsule 10 has a series of air vents 88 for enabling capsule 10 to vent air from operational compartment 74 as required. In order to provide capsule 10 with means to steer it when capsule 10 is in the sea, an electric water jet thruster 90 with an electric motor 92 constituting a component of operational equipment 75, may be provided and which is powered by a battery 93. Electric water jet thruster 90 is composed of a steerable nozzle 94 that is able to move in the directions indicated by arrows 96 to direct capsule 10 in a desired direction. Also encompassed in operational equipment 75 are electric water jet thruster 90, electric motor 92 and battery 93. It should be understood that a non-electric water jet thruster could also be used.

The approximate size for maintenance capsule 10 for the details as discussed below would have an approximate height $L_c$ of up to 6 m and approximate diameter $D_c$ of up to 3 m. The approximate weight of maintenance capsule 10 holding five work persons, tools and parts could be as much as five tons. As noted previously, maintenance capsule 10 should be able to withstand being dropped from a considerable height in a manner similar to modern life boats which are dropped from the stern of a ship. The size could vary according to operating conditions according, for example, to the conditions of the sea in the area of the turbine, the weather conditions, the number of workers to be transported, the amount and weight of tools and parts, etc.

The construction of maintenance capsule 10 is such as to protect the on-board personnel and equipment from harsh external conditions as may occur in the area of the wind farm. In view of the harsh conditions which could occur, it is intended that maintenance capsule 10 could have enough supplies and equipment to enable personnel to survive in the maintenance capsule for two or three days without external assistance.

Figure 2:
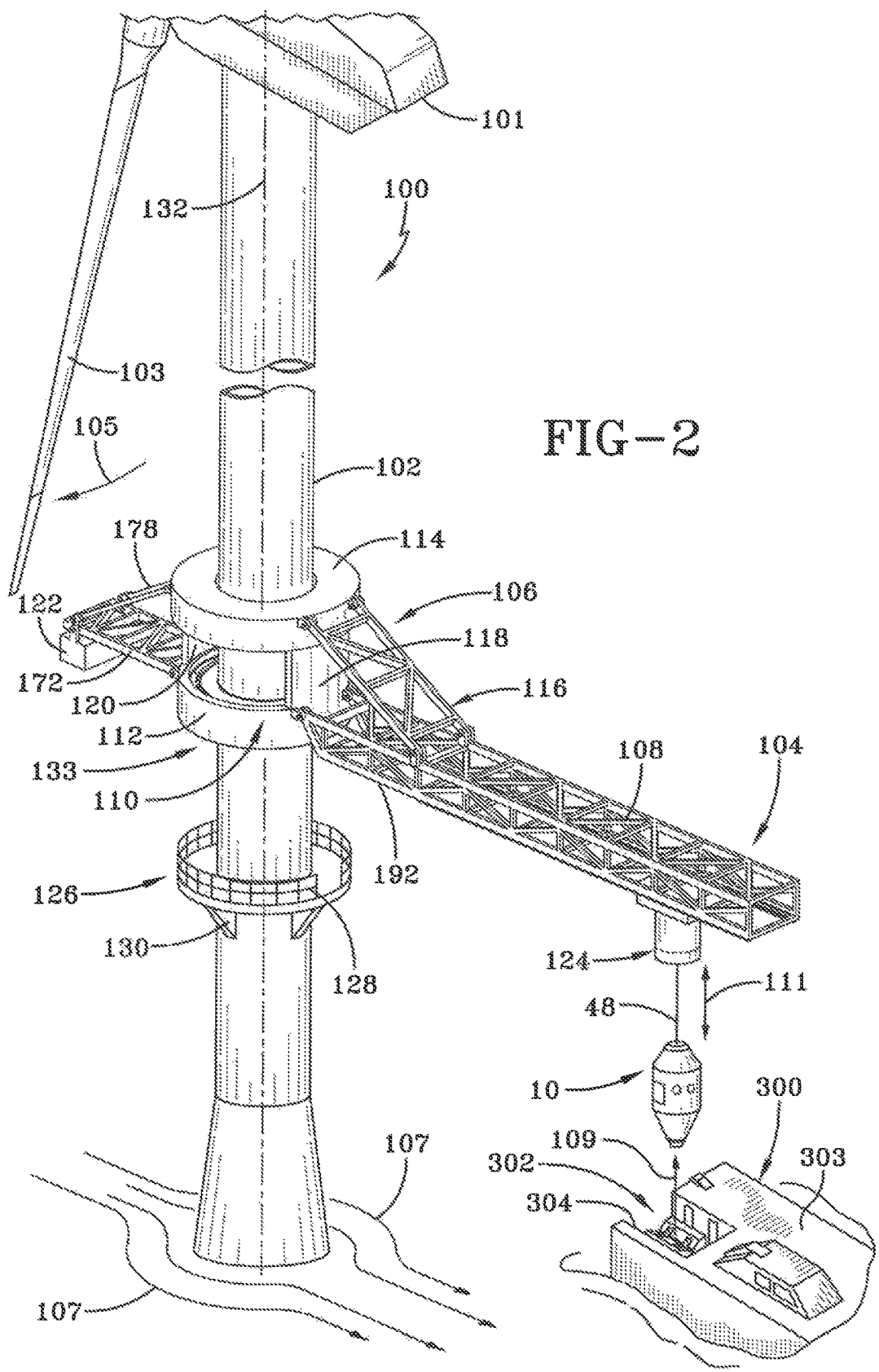
FIG. 2 is a partial, schematic, perspective view of a preferred embodiment of a crane assembly which is shown on a portion of a wind turbine tower apparatus transporting a maintenance capsule to or from a maintenance vessel, according to a preferred embodiment of the invention.

Aspects of wind tower turbine apparatus 100 are shown in schematic form in FIGS. 2 and 3. Referring to FIG. 2, a maintenance capsule 10 is shown being lifted in the direction indicated by arrows 109 and 111 from vessel 300 disposed in the sea. Vessel 300 has an upper surface or deck 303, a capsule support apparatus in the form of a launch/recovery ("L/R") cradle 302 in a capsule support-apparatus holding bay or an upper or cradle-holding bay 304 at the stern or rear of vessel 300. Upper bay 304 is disposed below upper surface 303.

Wind turbine tower 102 extends from the floor of the sea via a number of possible foundations. Wind turbine tower 102 includes turbine vanes 103 (one of which is shown), which rotate in the direction shown by an arrow 105. A long, swivelable crane assembly 104 is mounted on tower 102 and held there in part by a structured assembly 106 forming part of crane assembly 104. If the sea currents flow in one direction only as shown by arrows 107, the swivelling capability may be dispensed with allowing for a much smaller, lighter crane, and the fixed crane would be directed downstream.

Crane assembly 104 further includes a boom in the form of a preferably lightweight truss 108 (although a tubular construction with an internal weatherproof access way could be beneficial), a swing-and-support assembly 133 in the form of a tower-engaging support 110 which itself includes a lower annular support ring or rail 112 surrounding and engaging tower 102, an upper annular support ring or rail 114, a structural assembly 116 connecting lower annular support ring 112 and truss 108, and vertical support structures 118 and 120 extending respectively from tower-engaging support 110 to upper annular support ring 114. A counterweight assembly 122 extends from lower annular support ring 112 in the opposite direction from truss 108. Trolley 124 depends from truss 108 and is movable along the underside of truss 108. Assembly 133 also includes an upper annular rail 154 (FIG. 3) discussed below.

A walkway or access platform or service platform 126 surrounds tower 102. A safety fence 128 forms a guard rail around walkway 126, and support flanges 130 support walkway 126.

Swivelable crane assembly 104 is able to swing around wind turbine tower 102 in order to both withdraw capsules 10 from maintenance vessels 300 when maintenance is to be performed on tower 102, and to deposit capsules 10 in vessels 300 following maintenance, and maintenance vessel 300 is preferably positioned downstream of the wind turbine tower 102. As shown in detail in FIG. 3, wind turbine tower 102 is a hollow structure having a longitudinal axis 132. In order to accomplish the annular rotation of crane assembly 104 about wind turbine tower 102, a lower annular ring rail 134 which extends outwardly from tower 102 and is integral therewith. Lower annular ring rail 134 is composed of an upper annular disk-like portion 138 opposite to a lower annular disk-like portion 136. A lower annular vertical member or upstanding portion 140 extends between portions 136 and 138 distal from tower 102. A few annular upwardly-facing recesses 141 defined by a few lower horizontal flanges 142 extend toward tower 102 from lower annular support ring 112 with which it is integral. A pair of annular vertical upstanding walls 143 extends upwardly from each flange 142 to define recesses 141. Recesses 141 are integral with lower support ring 112 of tower-engaging support 110 below disk-like portion 136, and each has at least two radially-extending axles 144, preferably equiangularly disposed about the centerline of crane assembly 104, which extend across and into walls 143 defining each recess 141 to resist lifting forces on tower-engaging support 110 due to the upwardly traveling capsule 10 impacting trolley 124. Each axle 144 carries a rotatable anti-friction roller 146. Only a few rollers and axles are needed, and two would be an appropriate number of rollers. A lower, annular, inwardly-facing recess 148 (open towards wind turbine tower 102), defined by opposing radial walls 149 extending inwardly from lower annular support ring 112 with which it is integral, preferably has equiangularly-spaced vertical axles 150. Axles 150 extend through opposite horizontal walls 149 defining the height of recess 148, on which are disposed rotatable anti-friction rollers 152.

Upper annular support rail 154 extends from wind turbine tower 102 in a position above and opposite to lower annular support rail 134. Upper annular support rail 154 has a lower disk-like portion 156 and an upper disk-like portion 158 whose ends distal from tower 102 are connected by an upper annular vertical member or upstanding portion 160. Upper support ring 114 of tower-engaging support 110 has a pair of vertical walls 163 and 165 defining an annular, downwardly facing recess 161. Extending through walls 163 and 165 defining recess 161 are a series of radially extending, preferably equiangularly spaced, axles 162 on which are disposed vertically oriented rollers 164. Another inwardly facing, annular recess 166 faces lower annular ring 154 and has extending between a pair of horizontal walls 167 and 169 defining recess 166, a set of vertically oriented axles 168, which are preferably equiangularly spaced, for holding a set of horizontal anti-friction rollers 170. Rollers 164 and 170 rotate around upper annular rail 154 in the same manner that rollers 146 and 152 engage lower annular rail 134 to facilitate the relatively low friction rotation of swivelable crane assembly 104 about wind turbine tower 102.

As noted, counterweight assembly 122 extends from lower annular support ring 112. As shown in FIG. 3, counterweight assembly 122 is connected to lower annular support ring 112 by means of an arm 172. A yoke 174 extends outwardly from lower annular support ring 112, and an axle 176 extends through yoke 174 and arm 172. Lower annular support ring 112 is connected to upper annular support ring 114 by vertical support structure 120, and yoke 174 is part of structure 120. Likewise, another arm 178, located above arm 172, extends from a yoke 180 which is attached to or part of upper annular support ring 114. Yoke 180 is also integral with structure 120. An axle 182 extends through arm 178 and yoke 180. Arms 172 and 178, and their respective yokes 174 and 180 are connected to counterweight 122 as partly indicated in FIG. 3 in a pivotable construction, so that counterweight 122 is able to pivot with respect to axles 176 and 182 and may not exert bending moments into arms 172 and 178. A pair of sheet metal or plastic weather covers 184 and 186 extend outwardly as sheet metal flanges from wind turbine tower 102 and upper annular support ring 114 in an overlapping fashion to prevent water from getting into the spacing between wind turbine tower 102 and upper annular support ring 114.

Rollers 146, 152, 164 and 170 are preferably made from suitable alloys of cast iron or steel. All of the vertical forces applied to upper annular support ring 114 are resisted by rollers 146 and 164, and by the surfaces of annular ring or lower annular rail 134 and upper annular rail 154.

As noted earlier, structural assembly 116 extends between lightweight truss 108 and upper annular support ring 114. With further reference to FIG. 3, structural assembly 116 is pivotably attached to upper annular support ring 114 by means of an axle 188 extending through a yoke 190 (which is integral with ring 114) and through a hole in an end of structural assembly 116 to avoid inducing bending moments in either parts connected together. A similar arrangement (not shown) is provided for attaching a lower structural assembly or connecting lugs 192 to lightweight truss 108 to also enable the movement of structural assembly 116 and lugs 192 with respect to swivelable crane assembly 104.

Figure 4A:
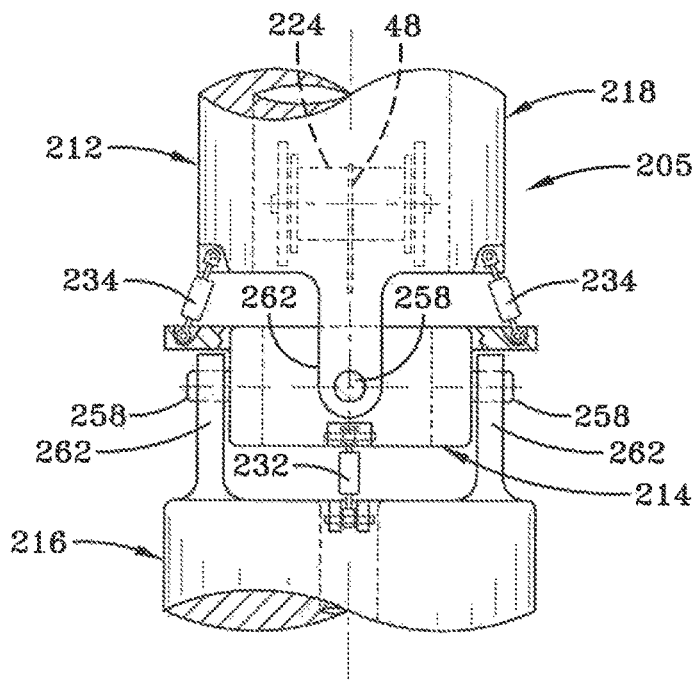
FIG. 4A is a partial view of a body member assembly attached to a gimbal ring, which is in turn connected to a lower ring-like member.
Figure 4B:
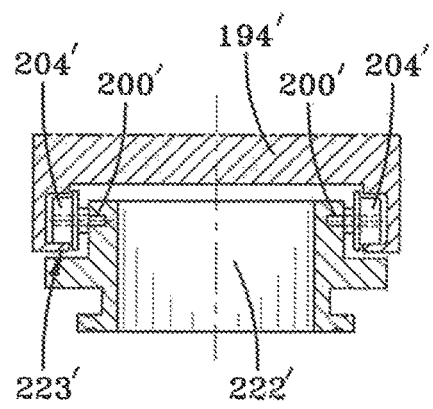
FIGS. 4B and 4C are alternate ways for attaching wheels for moving the trolley along the crane assembly.
Figure 4C:
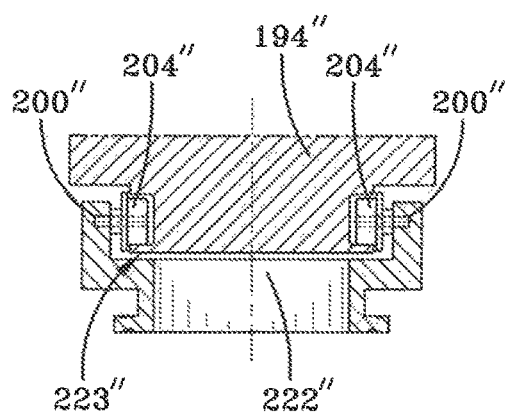

Referring next to FIGS. 4 and 4A, trolley 124 is shown mounted on truss 108. Truss 108 has wheel support structure shown as horizontal upper and lower support flanges 193 which extend either outwardly or inwardly from both sides of webs 194 of truss 108. Trolley 124 includes a movement structure 198 having a number of axles 200 rotatably supported in axle holders 202 on which are mounted rotatably held wheels 204 for engaging and riding on flange 193. Wheels 204 are located on the upper portion of movement structure 198, and a support member or support-and-holding assembly 222 cooperates with the lower portion of movement structure 198 as discussed below. Support member 222 includes an annular L-shaped portion 208. Support member 222 is connected to a rotational bearing-and-drive device 205 via L-shaped annular support 208. Rotational bearing-and-drive device 205 comprises a rotational bearing assembly 206 and two other ring-like members, namely a gimbal ring 214 and the other lower ring-like member 216. (Wheels 204 could have other structural arrangements with a modified web 194. Referring to FIG. 4B, alternate wheels 204' are mounted on opposing axles 200' extending from a support member 222' (which is modified from support member 222). Web 194' is configured to provide a track 223' for each of wheels 204' so that trolley 124 can move along web 194', as well as to coordinate the movement of support member 222' along web 194'. Another possible modification is shown in FIG. 4C. Wheels 204" are mounted on axles 200" extending from modified support member 222". Web 194" has been modified to include a track 223" for receiving and allowing the rotation of wheels 204" to enable the movement of trolley 124 along web 194". Rotational bearing assembly 206 is composed in part of ball or other bearings 210 for reducing friction between support member 222 and body member assembly 212. Body member assembly 212 is thus connected to movement structure 198. Body member assembly 212 has at its upper portion an inverted recessed annular structure 218 having an upper flange 220 for cooperating with annular L-shaped portion 208 and ball or other bearings 210 to control the rotation of rotational bearing-and-drive device 205, including the rotation of gimbal ring 214.

Support member 222 rides along with movement structure 198 by virtue of the travel of wheels 204. Body member assembly 212 also includes a capsule line-holding apparatus in the form of a winch 224 (which could be attached higher on rotational bearing-and-drive device 205 than is shown or configured as in tower cranes for winding capsule attachment line 48 extending from maintenance capsule 10 thereon). Lower ring-like member 216 comprises a driven tensioning guide roller mechanism 226 and includes a set of pairs of driven tensioning guide rollers 228 and 230. The latter are provided to tension capsule attachment line 48 extending between winch 224 and tensioning guide roller mechanism 226 which maintains the capsule attachment line 48 under tension to prevent backlash. A set of dampers 232 are provided for damping movement between gimbal ring 214 and, thus, inverted recessed annular structure 218 and lower ring-like member 216. A further set of guide rollers 237 guide the movement of capsule attachment line 48 between guide rollers 228 and 230. Lower ring-like member 216 is gimballed and has a damper assembly 231 and a latching assembly 235. Damper assembly 231 includes dampers 232 and 234, which are also shown in FIG. 5 and discussed in further detail below. Latching assembly 235 includes in part unlatching arm actuating assemblies 246 for releasing capsule 10 when required. Dampers 232 and 234 damp the movement of body member assembly 212, particularly when maintenance capsule 10 is suspended by capsule attachment line 48 and is attached to lower ring-like member 216 as described below.

Latching assembly 235 further includes a set of three or four latching mechanisms 236 which are provided on lower ring-like member 216. Each latching mechanism 236 includes a latching device in the form of a latching arm 238 with engagement ends 240 for engaging maintenance capsule 10 just beneath shoulder 42, a spring support arm 242, a spring 244 and unlatching device in the form of the foregoing unlatching arm actuating assembly 246 for opening each latching mechanism 236 or other forms.

Referring to FIG. 4D, actuating assembly 246 is shown as a hydraulic actuator or hydraulic actuating assembly 248 having inlet and outlet lines 250 and 252, and a piston 254 having a forked head 256 for engaging latching arm 238 to open respective latching arms 238 from their latched positions. Thus, spring 244 biases each latching mechanism 236 to its latching condition, and latching arm 238 can cause each latching mechanism 236 to assume its releasing condition.

Turning next to FIG. 5, lower ring-like member 216 is shown in further detail. As noted previously, the lower part of lower ring-like member 216 includes damped latching assembly 235. Inverted recessed annular structure 218 is pivoted by means of arms 258 which extend outwardly and radially from gimbal ring 214. Lower ring-like member 216 has two upstanding arms 262 (FIG. 4A) and as explained above, dampers 232 interconnect lower ring-like member 216 and recessed annular structure 218. Dampers 234 interconnect inverted recessed annular structure 218 and gimbal ring 214.

Dampers 232 are shown in further detail in FIG. 6. Each damper 232 is pivotally supported in damper supporting mounts 264 mounted in a support 265 and has a piston 266 mounted for movement through a seal 271 integral with piston 266, vertically as shown by arrows 267 in a hydraulic cylinder 268 which holds hydraulic fluid 270. Hydraulic fluid 270 is part of a hydraulic system 272 whose flow is controlled by a flow restrictor 274 and a bypass valve 277, flow restrictor 274, and a hydraulic pressure relief valve 276. Flow restrictor 274, pressure relief valve 276 and bypass valve 277 collectively form damping circuit components 281. A small powered hydraulic system 278 is in parallel with said damping circuit components 281 and is alternatively selectable by use of a valving apparatus shown as two-way valves 280.

The purpose of damper assembly 231 is to damp the motion of maintenance capsule 10 when it is fastened to trolley 124 by latching assembly 235. When capsule 10 is initially suspended on capsule attachment line 48, flow restrictor 274 is bypassed by bypass 277 to allow capsule 10 to swing freely as shown by arrows 279. Then, bypass 276 is closed and flow restrictor 274, with integral over-pressure relief, damps the motion. Small powered hydraulic system 278 (or springs for accomplishing this effect) may be then selected and used to make the longitudinal axis of capsule 10 vertical if the damping system and/or wind pressure has stopped capsule 10 in a non-vertical attitude.

Referring to FIG. 4, movement structure 198 is shown with its axles 200 supported in axle holders 202 on which wheels 204 are mounted. Rotational bearing-and-drive device 205 which includes gimbal ring 214 and lower ring-like member 216, comprises driven tensioning guide roller mechanism 226, body member assembly 212 which comprises inverted recessed annular structure 218 and capsule line-holding apparatus (such as winch 224), dampers 232 and 234 which damp the motion of latching assembly 235, actuating assembly 246, arms 258 and hydraulic system 272.

Figure 7:
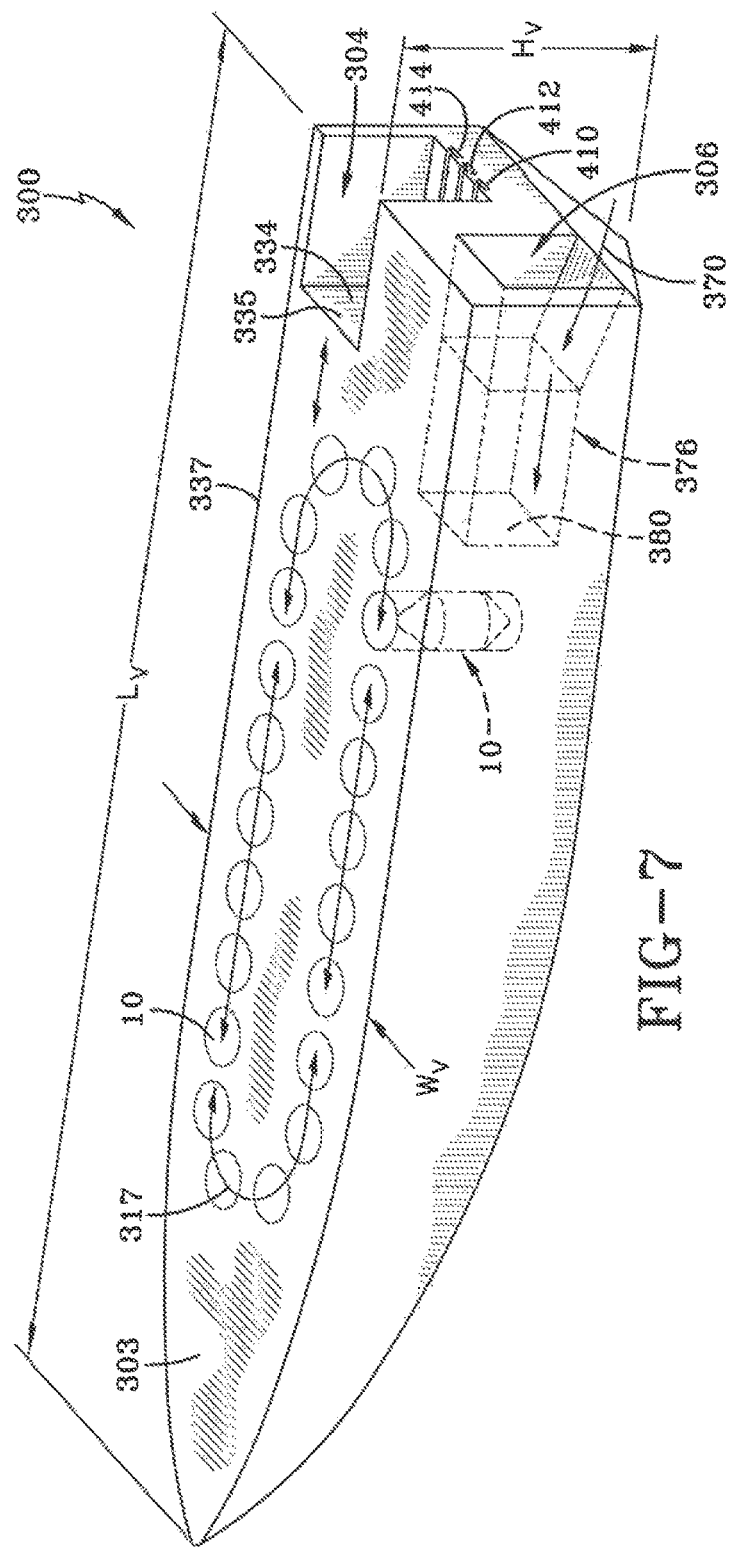
FIG. 7 is a schematic, perspective, partially cut-away view of a maintenance vessel according to a preferred embodiment of the invention.

Maintenance vessel 300 is shown in FIGS. 7, 8, 10 and 13-15. Referring to FIG. 7, vessel 300 preferably has a length $L_v$ of about 100 meters, a width $W_v$ of about 12 meters and a height $H_v$ of about 12 meters, although different dimensions may be used for stability or other reasons. The main purpose of maintenance vessel 300 is to transport preconfigured maintenance capsules 10 and maintenance personnel to and from a wind turbine farm and to deploy and recover the maintenance personnel and their equipment within the maintenance capsule 10 as may be required. Maintenance vessel 300 would be capable of approaching the respective wind turbine tower apparatus 100 in good and poor weather, and be able to pass slowly in close proximity to each wind turbine tower apparatus 100 for deploying and recovering maintenance capsules 10 even in the worst weather. When the weather is good, and when there is no need to service other wind turbines 101, maintenance vessel 300 can be positioned and maintained on station in close proximity to the specific wind turbine tower apparatus 100 for a minute or two while deploying an appropriately preselected maintenance capsule 10. Maintenance vessel 300 may then stand off while required maintenance is performed. Afterwards, maintenance vessel 300 can recover maintenance capsule 10 while vessel 300 is in close proximity to wind turbine tower apparatus 100. If the weather worsens to levels where it becomes difficult to recover a maintenance capsule 10 directly on board, maintenance vessel 300 may have to be positioned to recover the maintenance capsule 10 from the sea, at a safe distance from the wind turbine tower apparatus 100. The use of azimuth thrusters located below vessel 300 to propel and hold the position of vessel 300 against water currents and wind may be considered necessary in some instances. These azimuth thrusters may be electrically powered Azipods as developed by Kvaerner Masa-Yards and registered by ABB. Kvaerner Masa is a builder in Helsinki, Finland which built the unique electric Azimuthing Azipod Propulsion System. The latter system, unlike convention propulsion, pulls a ship through the water rather than pushing it. This development has led to an increase in propulsion efficiency and resulting in fuel savings. The use of Azipods eliminates the need for rudders, long heavy drive shafts, conventional drive units and stern thrusters. It occupies less space on board the vessel.

Maintenance vessel 300 should be able to hold a series of maintenance capsules 10 for use at various wind turbines in a wind farm. Referring to FIG. 7, up to forty capsules 10 may be carried. Although for very large wind farms, larger vessels with more and varied capsules may be advantageous.

Maintenance vessel 300 should be expected in some conditions to operate under poor visibility conditions, such as during dense fog. Maintenance vessel 300 should be provided with thermal imaging equipment to enable the captain of vessel 300 to see through the fog or other vision obscuring material to safely perform the required duties.

Vessel 300 includes L/R cradles 302 (FIGS. 2, 9, 9A, 9G and 12 as discussed below) located on a deck 315 (FIG. 9G) on the top of an elevator bed 322 (FIGS. 8, 10 and 11) at the stern of vessel 300. L/R cradle 302 is used to deploy and recover maintenance capsules 10 in good to moderately bad weather. A lower bay 306 is located on the other side of vessel 300 from upper bay 304 (FIG. 7) around the waterline of vessel 300 into which capsules 10 are winched from the sea and brought on board vessel 300 in very bad weather.

It may become necessary in poor to severe weather conditions to have maintenance vessel 300 distance itself from wind turbine tower apparatus 100 to safely snag towrope 80 for pulling maintenance capsule 10 into lower bay 306 (FIG. 7) of maintenance vessel 300. In order to cope with this condition, the end of cable or towrope 80 may be propelled the required distance by the use of pyrotechnics, small rockets, compressed gas guns, small electrically or otherwise powered miniature homing boats or other means (as described below). If cable 80 is too stiff or heavy to be dragged or propelled the requisite distance from the capsule on board the wind turbine tower apparatus 100, it may become necessary to utilize a length of light, strong precursor rope (as discussed previously and below) attached to the end to permit the overly stiff or heavy cable or towrope 80 to be dragged on board maintenance 300, after the precursor has been snagged and wound up.

Figure 8:
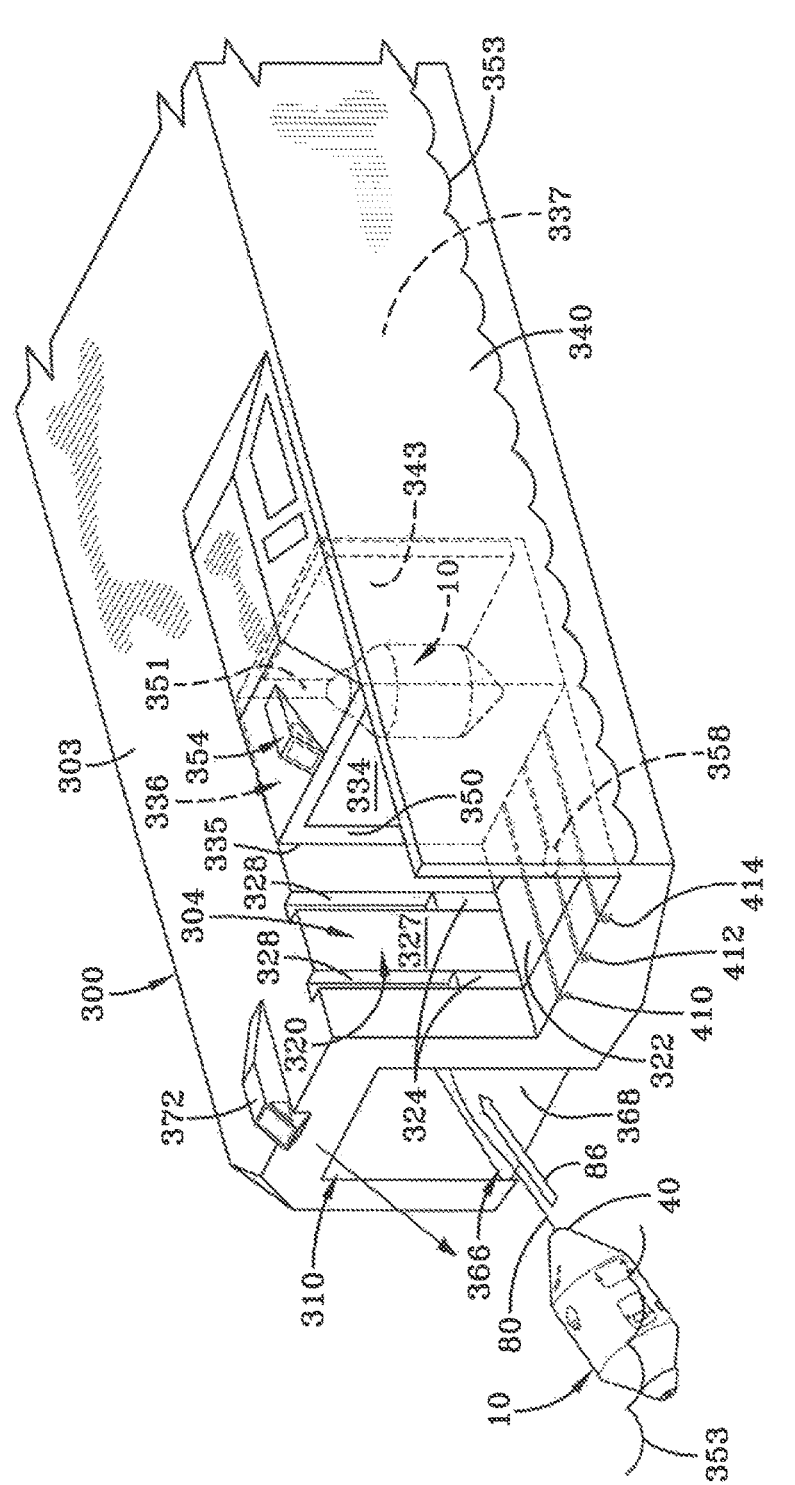
FIG. 8 is a detailed, partial, partially cut-away schematic view of the maintenance vessel illustrated in FIG. 7 showing components for transferring maintenance capsules thereon.
Figure 9:
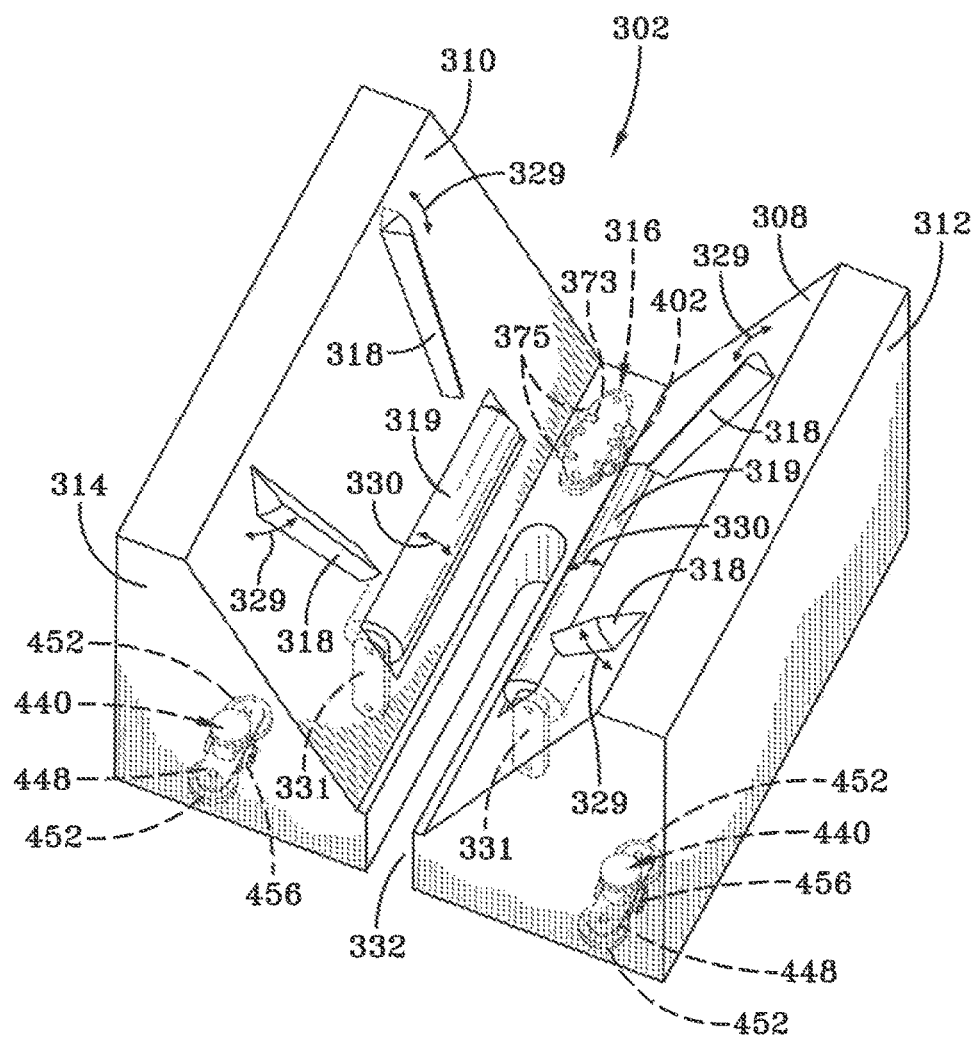
FIG. 9 is a schematic partially cut-away perspective view of a launch/recovery ("L/R") cradle according to a preferred embodiment of the invention.

Maintenance vessel 300 is shown in further detail in FIG. 8. The parts shown in FIG. 8 are used respectively in calm to moderate weather conditions, and rough weather conditions. With respect to calm to moderate sea condition, L/R cradle 302 is employed to deploy and recover the capsule. With reference to FIGS. 9, 9A-9I, 10 and 11, each L/R cradle 302 is composed of a pair of oppositely disposed connected cradle parts 312 and 314, underneath of which is an electric drive system 316 (FIG. 9A) which propels maintenance capsules 10 around a looped path 317 (FIG. 7) internally below upper surface or deck 303 of maintenance vessel 300 to allow the selection of an appropriately preconfigured capsule 10 Other types of path such as one with capsules racked on either side feeding a central path are possible, as shown in FIG. 7A. FIG. 7A shows a set of maintenance capsules 10 located in parallel linear locations 325 and 326, which are moved linearly in L/R cradles 302 along a linear path 321 from lower bay 306 to either of parallel, linear locations 325 and 326. Cradles 302 could also come from and be delivered to upper bay 304. Each of cradle parts 312, 314 include opposing upstanding walls 308, 310, and L/R cradle 302 has retaining members in the form of rollers 319 held by brackets 331 for engaging a cooperating portion of maintenance capsule 10 such as a groove 398 (FIGS. 1 and 12) in truncated conical outer wall 72 (as discussed below) to hold capsule 10 releasably fixed in L/R cradle 302. Rollers 319 rotate in the direction shown by arrows 330. Cradle parts 312 and 314 are partially separated by an opening 332 (which could be a hole) for receiving cable or towrope 80 of maintenance capsule 10. L/R cradle 302 also has orienting assemblies in the form of four orienting arms 318 for maintaining capsule 10 in a vertical orientation, with orienting arms 318 being disposed in each of opposing upstanding walls 308 and 310 which are inclined from outwardly spaced upper or free ends (as shown in FIG. 9) towards each other at their lower narrowly spaced connected ends. The movement of orienting arms 318 is shown by the arrows 329. An elevator structure 320 (FIGS. 8, 10, 11) is located in bay 304 and is selectively moved up and down to raise and lower L/R cradle 302 between a position recessed in upper bay 304 and located near upper surface or deck 303 of vessel 300.

Figure 10:
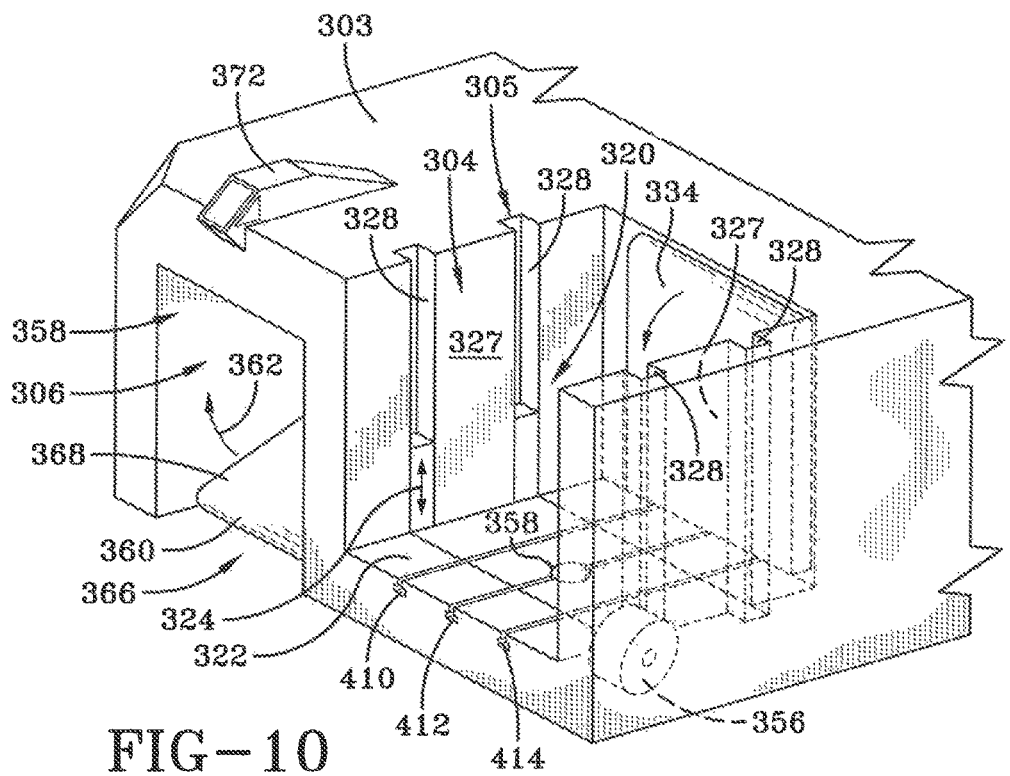
FIG. 10 is a schematic perspective view showing a detail of the stern of the maintenance vessel shown in FIG. 8.
Figure 11:
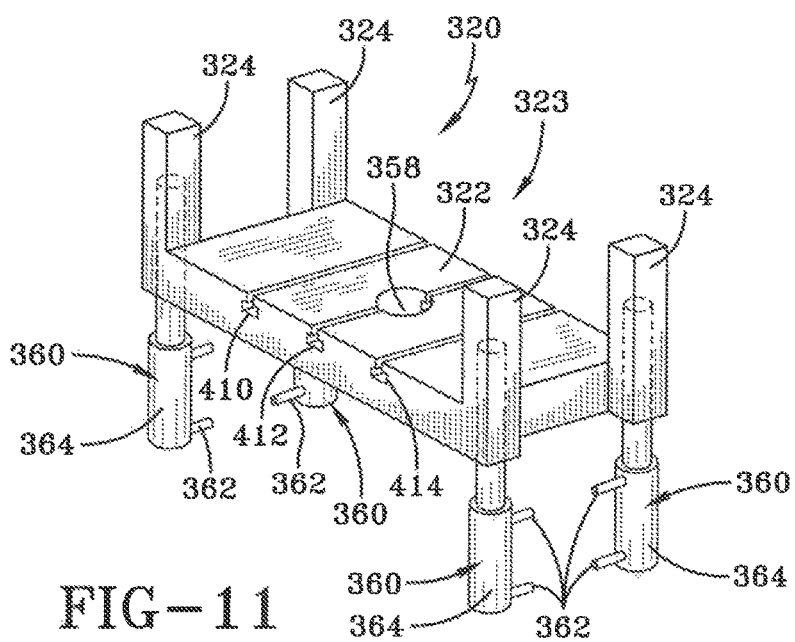
FIG. 11 is a schematic, perspective view of an elevator and shock absorbing apparatus used on the stern of the vessel as shown in FIG. 10.

Elevator structure 320 shown in FIG. 11 has an elevator support structure 323 which includes elevator bed 322 and opposing pairs of columns 324 extending at right angles to bed 322, and a track system or guiding structure 402. The latter is in the form of three tracks or inverted T-shaped slots 410, 412 and 414 in bed 322. The middle slot is drive-and-guide slot 422. Slots 410 and 414 are located in bed 322. Slots 410 and 414 are guide slots. Slots 410, 412 and 414 further run along deck 315 below deck 303 and extend around looped path 317 shown in FIG. 7 or linear path 321 in FIG. 7A. Further included in bay 304 for cooperating with columns 324 of elevator structure 320 is a lifting/lowering structure 305 (FIG. 10). Lifting/lowering structure 305 includes opposing pairs of grooves 328 (only one pair is visible in FIG. 10) in opposing side walls 327 of bay 304 for receiving and guiding columns 324. Slot 412 is provided for receiving and engaging electric drive system 316 of L/R cradle 302.

Maintenance vessel 300 has a travel structure 470 (FIG. 9C) for being operatively engaged by the respective L/R cradles 302. In the preferred embodiment, travel structure 470 is composed of a guiding structure which could be a variety of forms, preferably a track system 472 (FIGS. 9B, 9C, 9E, 9F) discussed herein and a pair of gear racks 422 attached to slot 412 as discussed below. Electric drive system 316 cooperates with travel structure 470 to effect movement of L/R cradles 302 as also described below.

Electric drive system 316 is composed of a drive device 416 (FIGS. 9B, 9C and 9F), which is in turn composed of electrical wheel driving apparatus including a pair of rear drive shafts 418 and their respective power apparatus for turning shafts 418 (not shown, but would be an appropriate type of preferably electric motor and gear box for rotating the shafts, to be determined by one skilled in the art), a rotatable mechanism 415 in the form of a pair of gears 420 (alternative arrangements are shown in FIGS. 9B and 9F, and described below), wheel structures including friction-reducing wheels 424 mounted on axles 426 for reducing the friction of said L/R cradles 302 as said cradles 302 move on vessel 300, and guide rollers 428 mounted on vertical guide wheel support axles 430. Gears 420 rotate in opposite directions as shown by arrows 419 and 421. Travel structure 470 includes gear racks 422 which are mounted parallel to side walls 425 (FIG. 9E) of drive slot 412 and which are engageable by gears 420. Referring first to FIG. 9B, parallel gear racks 422 are shown which define path of motion of L/R cradle 302. A support 432 is shown through which parallel gear drive or gear shafts 418 extend, the axes of rotation of drive shafts 418 lying in an imaginary plane perpendicular parallel gear racks 422. Referring to FIGS. 9B-9F, pairs of gear shafts 418 rotate in the opposite directions at the same speed except at corners to drive their respective gears 420 in a synchronized manner. Gears 420 engage racks 422 to drive L/R cradle 302 in either direction in slot 412. Referring to FIG. 9C which shows a drive device 416 in plan view, gear 420 shown in the upper part of the drawing rotates in the clockwise direction while gear 420 shown in the lower part of the drawing rotates in the counterclockwise direction as shown by respective arrows 419 and 421 to drive L/R cradle 302 to the left as shown by an arrow 423. As shown in FIG. 9B, and as noted above, gears 420 are mounted on axles 418 whose axes of rotation are perpendicular to the imaginary plane of motion of gear racks 422. The same result can be achieved with the arrangement shown in FIG. 9F, where gears 420 are longitudinally offset from each other between gear racks 422, although both driving assemblies for L/R cradle operate virtually identically. One advantage of the arrangement shown in FIG. 9F is that the distance between gear racks 422 can be lessened since the axes of gear shafts 418 are closer together between gear racks 422 and the top slot can be narrower.

In order to keep L/R cradles 302 properly centered in slot 412, guide rollers 428 are at opposite ends of support 432 and rotate on vertical guide wheel support axles 430 which are vertical to deck 303 of maintenance vessel 300. The diameter of guide rollers 428 is sufficient to engage one or the other of sides 434 of slots 412 as shown most clearly in FIG. 9E, said diameter being marginally smaller than the walls of slot 412.

Figure 9G:
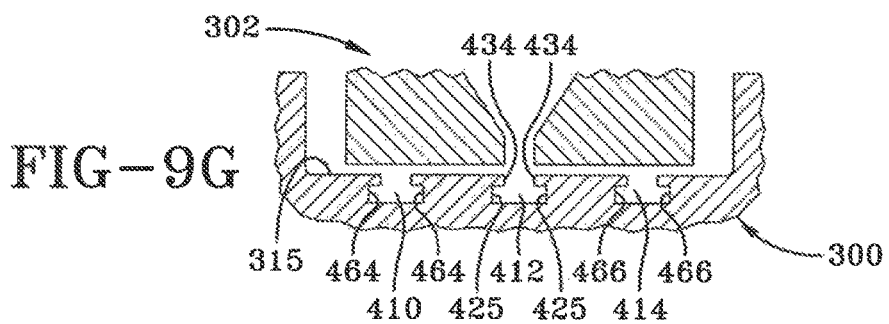
FIG. 9G is a cross sectional schematic view of the deck of a maintenance vessel showing slots in which an L/R cradle is transported on the deck.
Figure 9A:
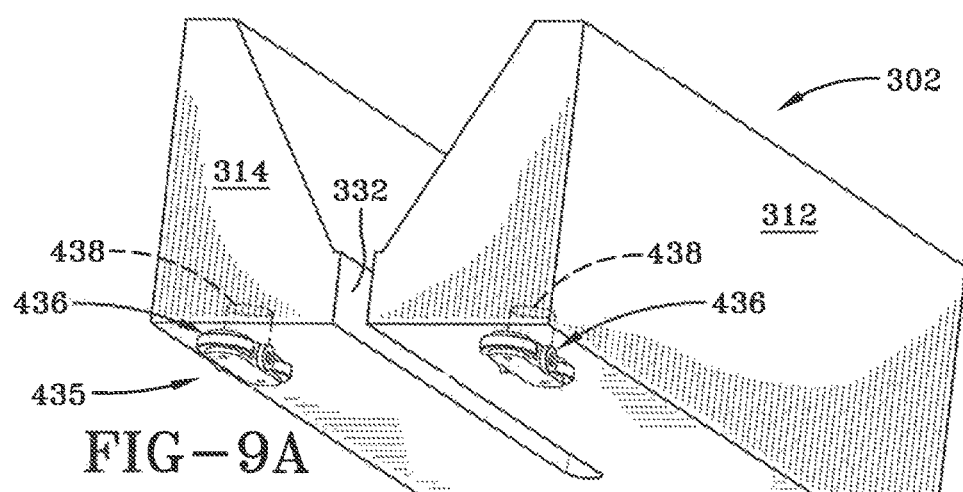
FIG. 9A is a perspective schematic view of the base of the L/R cradle shown in FIG. 9, revealing a drive assembly.

In order to keep L/R cradle 302 properly aligned and not subject to unduly bob left and right, L/R cradle 302 comprises an alignment and stability apparatus 435 (FIG. 9A). Apparatus 435 includes a pair of idler assemblies 436 (FIG. 9H) are provided which are mounted in, and partially extend through openings 438 in the bottom of L/R cradle 302 as shown in FIG. 9A. Idler assemblies 436 ride in each of slots 410 and 414 as shown in FIG. 9G while supporting, restraining vertically and guiding L/R cradle 302 laterally.

Figures 9H, 9I:
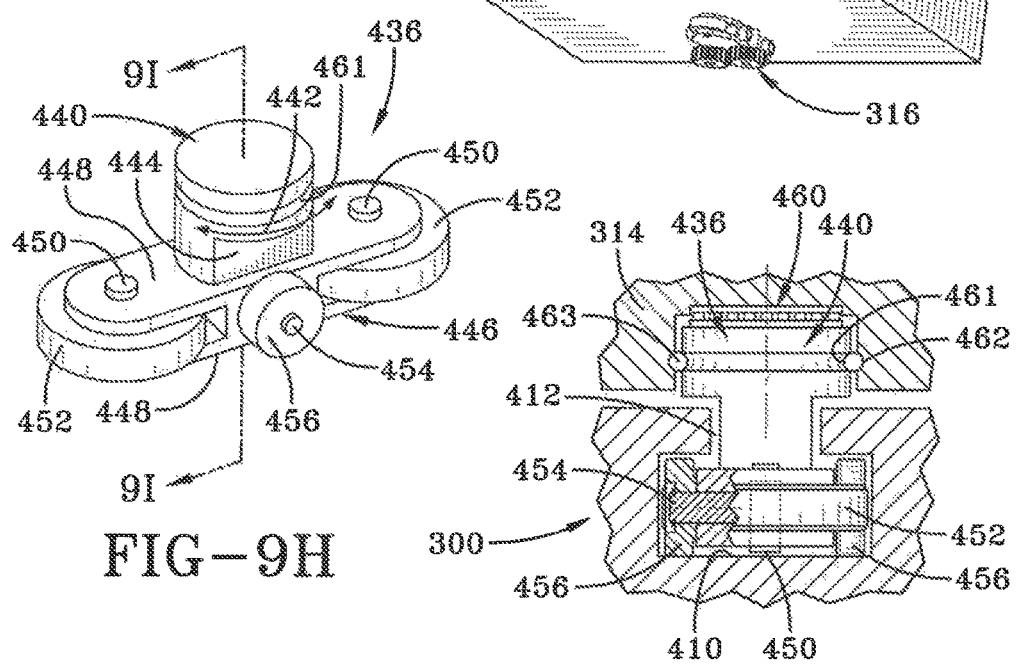
FIG. 9H is a schematic perspective view of an idler assembly for use in the L/R cradle shown in FIG. 9.
FIG. 9I is a cross sectional schematic view showing a slot in the deck of the maintenance vessel according to an embodiment of the invention showing the idler assembly of FIG. 9H therein.

Each idler assembly 436 (FIG. 9H) is composed of a vertical idler shaft 440 which can rotate as indicated by an arrow 442. Idler shaft 440 has a recess 444 so that it can be accommodated between the narrow parts of inverted T-shaped slots 410 and 414. Recesses 444 are deep enough so that the upper walls defining the length of slots 410 and 414 can pass unimpeded through recess 444. An axle support 446 is fixed to idler shaft 440, and has a pair of yokes 448 for supporting a pair of vertical axles 450 which hold a pair of guide or idler rollers 452. Shaft 440 also has extending through it a wheel-holding, horizontal axle 454 whose longitudinal axis is perpendicular and intersects the longitudinal axis of idler shaft 440, as well as being perpendicular to the plane intersecting the longitudinal axes of axles 450. A pair of wheels 456 is mounted for rotation on axle 454. Idler shaft 440 is shown as mounted in L/R cradle 302 and slot 412 in FIG. 9I and supports a thrust and rotational bearing 460 for reducing the friction that otherwise would occur as idler shaft 440 rotates in the base of L/R cradle 302 through which opening 438 extends. A groove 461 can be provided in each idler shaft 440 with a corresponding annular groove 462 in each of cradle parts 312 and 314 (cradle part 314 with idler assembly 436 is shown in FIG. 9I, and an identical assembly is in cradle part 312). Ball bearings 463 are located in grooves 461 and 462. Alternatively, crossed rollers could be used. Slots 410 and 414 have opposing side walls 464 and 466 respectively as shown in FIG. 9G, and idler rollers 452 (FIGS. 9H and 9I) engage the respective side walls 466 and 464 to properly locate wheels 456 in slots 410 and 414 and the mechanism for driving L/R cradle 302 in slots 412.

Figure 12:
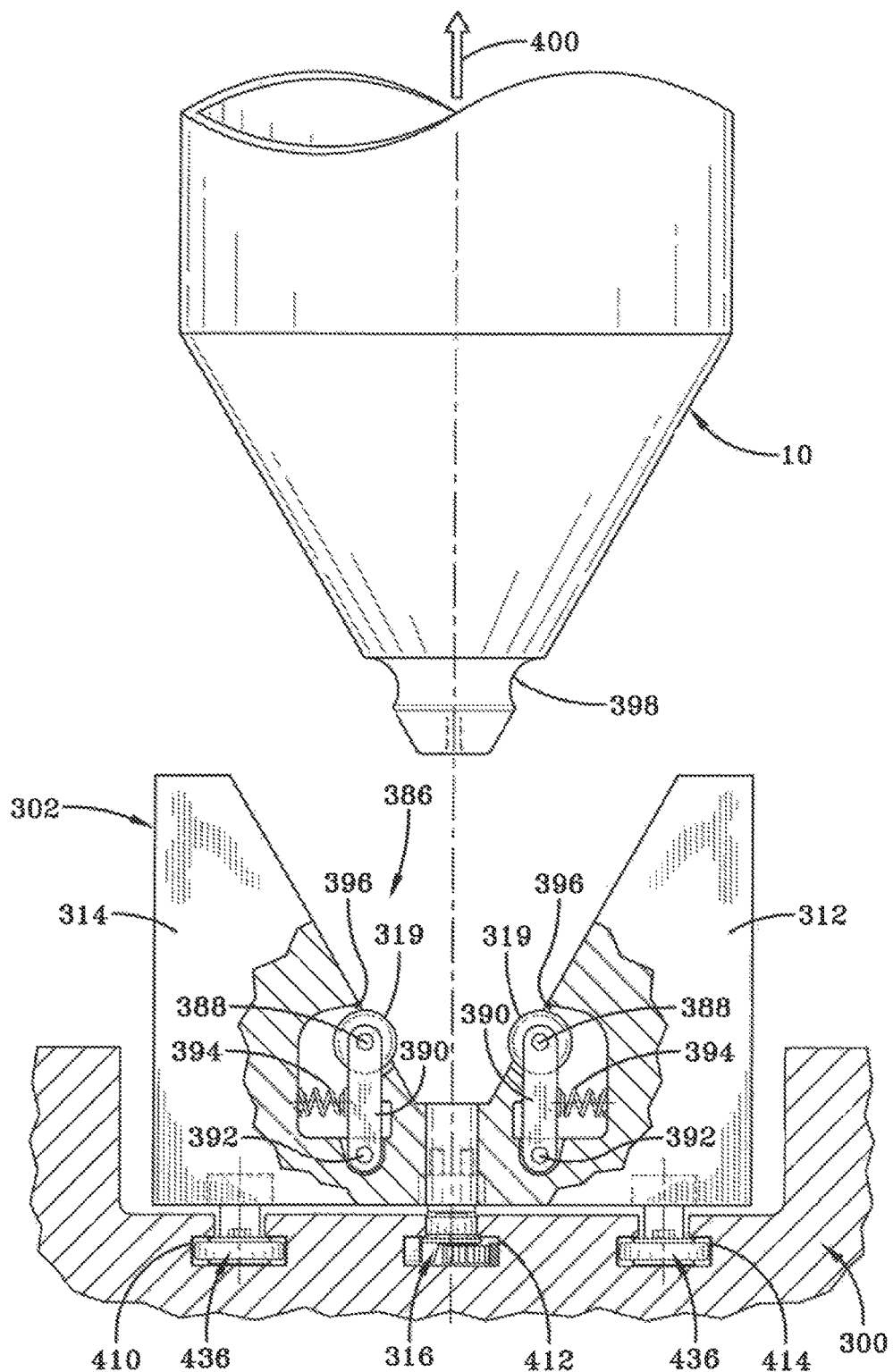
FIG. 12 is a detailed cross sectional, schematic view of a part of the UR cradle located on a deck part of the maintenance vessel shown in FIG. 7, and a maintenance capsule cooperating with the L/R cradle.

Referring to FIG. 12, each of cradle parts 312 and 314 has a capsule safety holding mechanism 386 for preventing the inadvertent removal of capsule 10 from cradle 302. Capsule safety holding mechanism 386 includes rollers 319. Rollers 319 are mounted for rotation on axles 388 of pivotally mounted arms 390 in each of cradle parts 312 and 314. Arms 390 are mounted respectively on a respective pivot 392 and loaded by force applying structure such as respective springs 394 and biased towards respective openings 396. Rollers 319 engage groove 398 on capsule 10 to prevent capsule 10 from being pulled out of cradle 302 until a large enough upward force 400, as shown in FIG. 12, is exerted by a capsule release structure such as by winch 224 (FIG. 4) which may be in trolley 124. This prevents capsule 10 from being pulled out of cradle 302 during rough seas and accidentally falling overboard. L/R cradle 302 is driven into position in bay 304, by electric drive system 316 driving in slot 412 and idler assemblies 436 in slots 410, 414 and columns 324 of elevator structure 320 which is elevated if necessary, columns 324 being guided by sliding in grooves 328.

Figure 13:
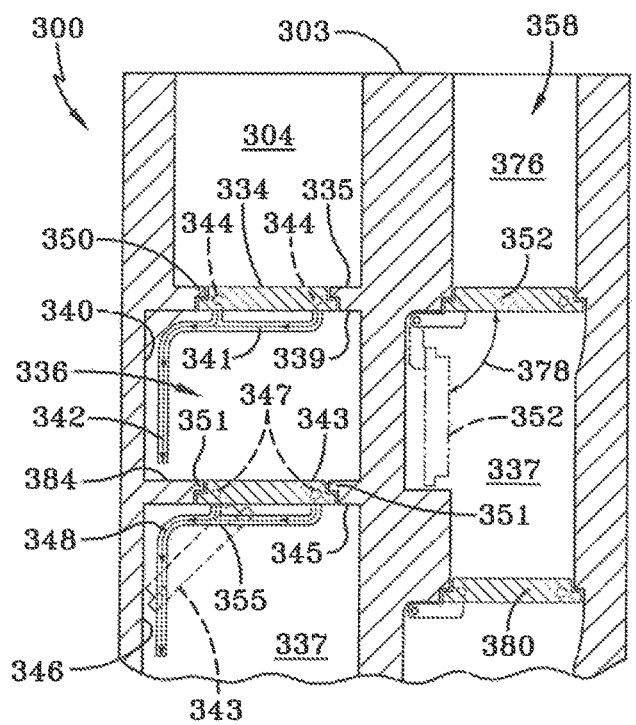
FIG. 13 is a top cross sectional detail of door arrangements in the stern part of the maintenance vessel according to the preferred embodiment of the invention in schematic form.
Figure 14:
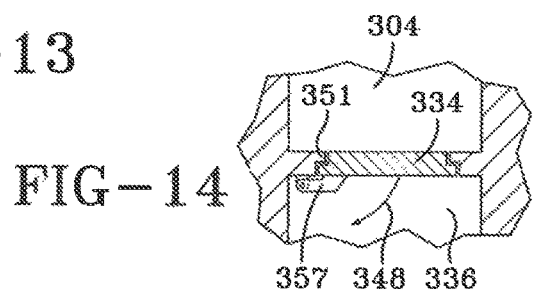
FIG. 14 shows an alternate door arrangement shown in FIG. 13.

Referring to FIGS. 8, 13 and 14, a capsule transit airlock compartment 336 is provided adjacent to and forward of upper bay 304 for permitting a maintenance capsule 10 to transition from a dry interior portion 337 of vessel 300 to the exterior. An airlock door 334 is shown in FIGS. 8, 13 and 14 covering an opening between upper bay 304 and transit airlock compartment 336, airlock door 334 fitting in an airlock door frame 335 in a sealing arrangement. Capsule transit airlock compartment 336 has a fore bulkhead 339 and a side bulkhead 340, and an airlock door track 341 (FIG. 13) which could be either on lower deck 315, on the overhead or on both the deck and the overhead of capsule transit airlock compartment 336. A track engaging structure 344 such as pins or the like are provided on airlock door 334 for riding in airlock door track 341. Airlock door track 341 maintains both vertical sides of airlock door 334 proximal fore bulkhead 339 and side bulkhead 340, as shown by arrows 342, so as to leave enough room for L/R cradle 302 with capsule 310 thereon with enough room to fit in capsule transit airlock compartment 336. An interior airlock door 343 between the dry interior portion 337 of vessel 300 and capsule transit airlock compartment 336 is provided.

Likewise, a similar interior airlock door track 355 extends along an aft bulkhead 345 and a side bulkhead 346 of dry interior portion 337. Interior airlock door track 355 could be on lower deck 315, in the overhead or in both deck 315 and the overhead, of dry interior portion 337. Door 343 has a track engaging structure 347 such as pins or the like for riding in interior airlock door track 355. Interior airlock door 343 can close against an interior airlock door frame 384 in a sealing engagement. Doors 334 and 343 alternatively swing out of the way, as shown by arrow 348 (FIG. 14) (door 343 would have a substantially identical swinging apparatus), on a hinge 357 to allow capsule 10 to enter or leave dry interior 337 of vessel 300. Appropriate sealing in the form of resilient gaskets are provided between the edges of airlock door 334 and a jamb 350 for door 334. Similar gaskets are provided for interior airlock door 343 and its interior airlock door jamb 351, and for severe weather for an outer airlock door 352 and a severe weather inner airlock door 380 as shown in FIG. 7 (the latter are discussed below). It can be seen that a water line 353 (FIG. 8) is located below door 343, although the water line could change from time to time. A viewing station 354 is provided to enable the captain or other personnel on vessel 300 to watch and control the operation of L/R cradle 302. Alternatively, doors 334 and 343 may be simply hinged so as to rotate about a vertical axis, but this will require additional space in airlock compartment 336.

With reference to FIG. 10, and further considering bay 304, it can be seen further that a winch 356 is provided for winding up and releasing towrope 80 extending from a maintenance capsule 10. Towrope 80 extends through a port 358 in the lower part of bay 304. Inverted T-shaped slots 410, 412 and 414 are located in deck 303 of bay 304 and in bed 322 of elevator structure 320, and port 358 is located in slot 412. Door 334 is provided at the forward part of bay 304 (see also FIGS. 13 and 14) for enabling the transfer of maintenance capsules 10 into or from dry interior 337 of vessel 300 where other capsules 10 are stored for use.

FIG. 11 shows elevator structure 320 in further detail, and further shows shock absorbing members preferably as shock absorbers or hydraulic rams 360. Elevator structure 320 is composed of four upstanding columns 324, rectangular in cross section which each ride in grooves 328 (also rectangular in cross section) (FIG. 10) disposed in the opposing sides of bay 304. Each shock absorber 360 is a hydraulic shock absorber having oil inlet and outlets 362 to a hydraulic system (not shown) with pressure relief valves provided in a respective cylinder 364 for each of shock absorbers 360. Cylinders 364 are hydraulic cylinders which both elevate bed 322 and act as shock absorbers by virtue of having pressure relief on the down stroke only. These reduce the deceleration felt by occupants of capsules 10 during rough weather recoveries, and allow the raising and lowering of elevator structure 320.

Figure 15:
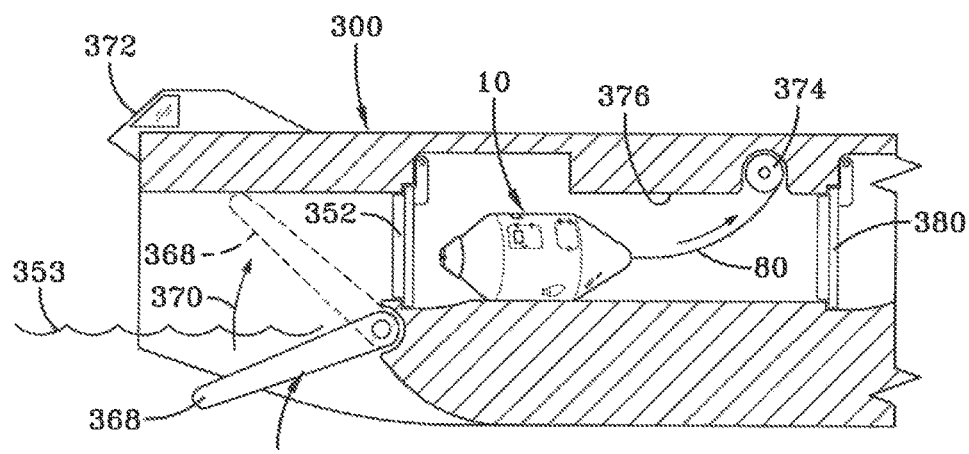
FIG. 15 is a detailed, side cross sectional view of the stern part of the maintenance vessel shown in FIG. 7.

Considering FIGS. 8, 10 and 15, a severe weather recovery ramp assembly 366 includes a raisable ramp 368 which is movable between an open position shown in solid lines in FIGS. 8, 10 and 15 and a raised position (shown by arrows 370) indicated in dotted lines in FIG. 15. A rough weather viewing station 372 (FIGS. 8 and 15) is located above recovery ramp assembly 366 to enable the captain or other personnel of maintenance vessel 300 to observe the movement of a maintenance capsule 10 during a severe weather recovery via raisable ramp 368. As shown in FIG. 15, a winch 374 is used to pull cable or towrope 80 extending from maintenance capsule 10 thereby pulling said capsule 10 into a severe weather airlock 376 as shown in FIGS. 7 and 13. Access to and egress from severe weather airlock 376 is by way of outer airlock door 352 (FIG. 13) and an inner airlock door 380 (FIG. 7). When raisable ramp 368 is in the raised position, it in effect substantially seals maintenance capsule 10 from the effects of the sea and the weather. In preparation for a severe weather capsule recovery, ramp 368 is lowered and only outer airlock door 352 is opened. Outer airlock door 352 is shown by dotted lines in its open position. When door 352 is in its fully-open position, its inwardly facing surface (on its right side as shown in FIG. 13) is coplanar with the walls of severe weather airlock 376 to allow capsule 10 to pass through. Outer airlock door 352 pivots in the direction shown by an arrow 378 (FIG. 13) to its fully-open position. As soon as capsule 10 is on board, ramp 368 is raised, and when capsule 10 is within the bounds of severe weather airlock 376, outer airlock door 352 closes and the capsule 10 is cycled into interior 337 of vessel 300 for refurbishing and reuse.

For the items described above whose operation is described below, vessel 300 has certain requirements for a wind farm of up to 200 wind turbine tower apparatus. Vessel 300 should be able to hold about forty maintenance capsules 10, associated equipment, turbine spare parts and personnel. As stated earlier, the length $L_v$ of vessel 300 is preferably about 100 meters long, the width $W_v$ is preferably about 12 meters wide and its height $H_v$ is preferably about 12 meters high. The weight of vessel 300 would be about 800 tons, with a capacity of about 200 tons of maintenance capsules 10. Vessel 300 preferably has a cruising speed of about 35 km/hour, a maximum thrust of about 0.15 g or 150 tons, a range of 1000 km and with a monohull as the hull type. The type of engines would determine the fuel economy. Some degree of stabilization would be required for the range of motions and degrees of freedom (roll, pitch, heave, yaw, sway and surge).

Turbine tower 102 has at its upper portion a nacelle 550 shown in FIGS. 21 and 22 and discussed below. Nacelle 550 houses the equipment for operating the control and rotation of turbine vanes 103. The system described below includes some of the components previously described with some variations and modifications.

Once the maintenance personnel and parts, equipment and tools are transferred to the service platform 126 of the wind turbine, there is a further utilitarian requirement, that is, to move the said maintenance personnel and parts, equipment and tools to the most likely place requiring these, i.e., nacelle 550 of the wind turbine.

Maintenance personnel may be safely moved from platform 126 to nacelle 550 by an internal personnel elevator, but heavy, bulky parts, equipment and tools may prove too heavy and difficult to maneuver through an access door to service platform 126, and thence up and into nacelle 550. The interior of nacelle 550 contains a large gearbox, electrical generator and associated electrical equipment, much of it on the centreline of nacelle 550 and over the center of tower 102, making access for large items from the interior of tower 102 onto the generator floor of nacelle 550 somewhat problematic. Thus, an exterior cargo elevating system is deemed to be necessary.

It should be noted that an external cargo elevator capable of transporting materials from service platform 126 via a tower surface-mounted guide track could have the said track extending downwards to sea level. This would allow, foundation type allowing, in calm weather, the direct transfer of material from maintenance vessel 300 to the cargo elevator and, thence, to nacelle 550. This avoids having the lifted load swinging dangerously in the wind from a long cable, extending downwards from a mounted crane on nacelle 550 to a maintenance vessel, as is currently done.

In strong winds, even when waves are within the capability of proposed or existing transfer systems which could place personnel and materials on the service platform, the lowering of a cable over a hundred meters to pick up a load and raise it to the nacelle can result in the load swinging uncontrollably and smashing disastrously into the side of the tower during the lift. Thus, heavy, bulky items necessary for maintenance could be stranded on the service platform until the offending winds subside.

The discussion to follow represents some modifications to the detailed description previously set forth with respect to FIGS. 1-15. The same numerical identifiers will be retained for previously described components.

Figure 16:
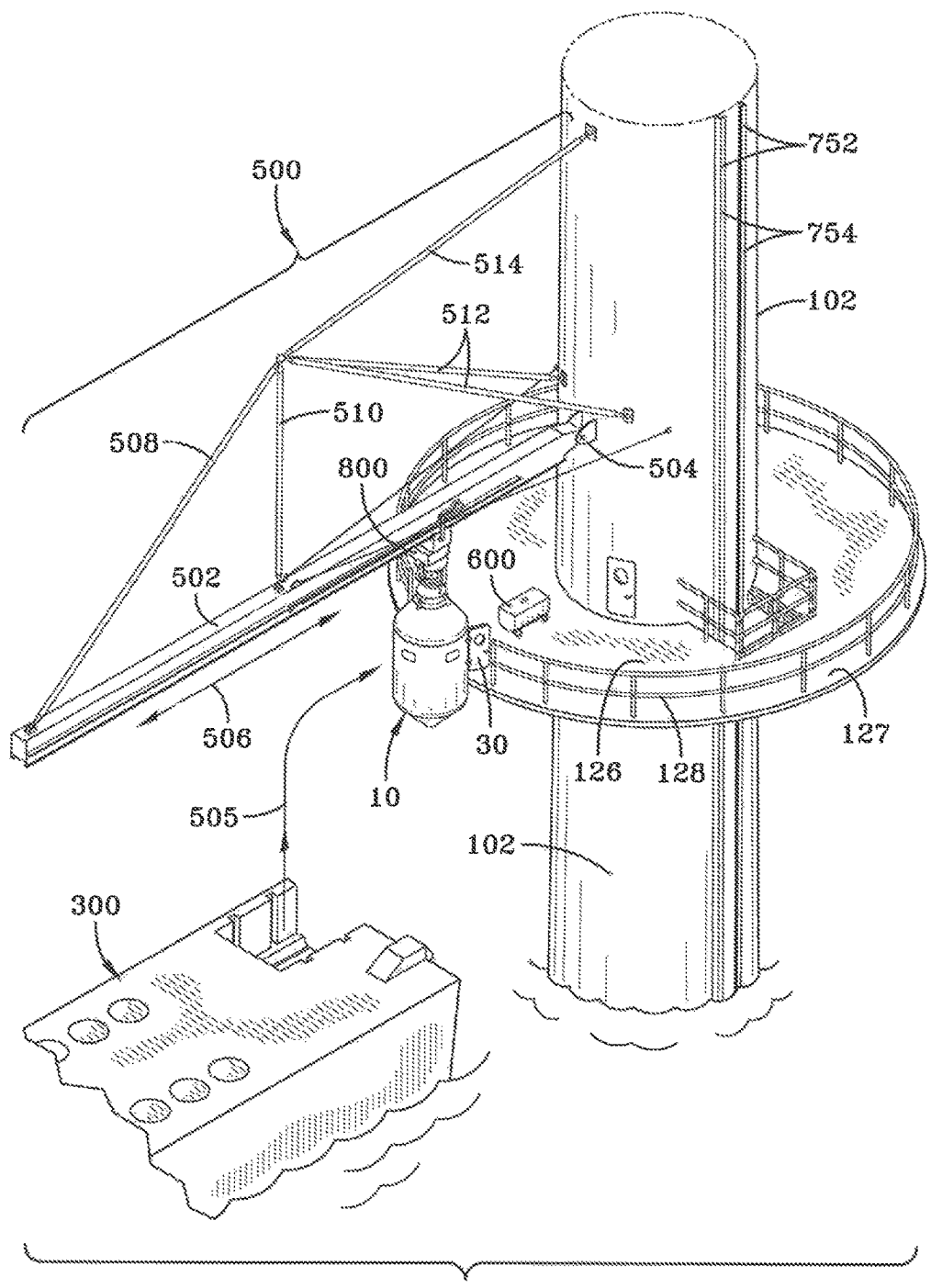
FIG. 16 is a schematic, perspective view of the lower portion of a turbine tower incorporating aspects of the preferred embodiment of the invention showing a maintenance vessel transferring a maintenance capsule to the turbine tower and for lifting a wheeled equipment box up the tower.

Referring to FIG. 16, a fixed maintenance or non-swivelling crane 500 is shown. Fixed maintenance crane 500 faces downstream and has a crane boom 502 extending horizontally outwards from an attachment point 504 located above platform 126. Said crane 500 is located at an elevation above platform 126 such that when cargo compartment access door 28 opens onto the platform 126, the floor of the cargo compartment is approximately level with the top of platform 126 to allow a box or frame 600 (discussed below) to be rolled outwards or inwards from platform 126.

Crane boom 502 is both supported and prevented from rotating upwards about attachment point 504 by rigid braces 508, 510, 512, 514. A trolley 800, different from trolley 124 and described below, may be driven along crane boom 502. Rigid braces 508, 510, 512 and 514 could have various constructions for holding their respective loads and could have the construction of the components of crane assembly 104 discussed earlier.

It should be noted that, if the general downstream direction is known, the maintenance crane 500 can be permanently mounted in that direction, obviating the necessity for a swinging mechanism. This can result in a much simpler, smaller, lighter and less expensive structure. The means by which the movement of parts, equipment and tools is achieved requires that they be moved upwardly along the side of tower 102, then around to a location below a crane mounted on nacelle 550, and thence finally upwardly towards a nacelle access platform (discussed below) outside of nacelle 550, from which they may be put to use inside nacelle 550. This permits use of these items in even the most severe winds, making maintenance possible throughout the entire year, as a cargo crane 560 does not have to lower its cable hundreds of feet to access platform 126 or even lower to vessel 300 to have said cable oscillating wildly in the wind.

Figure 17:
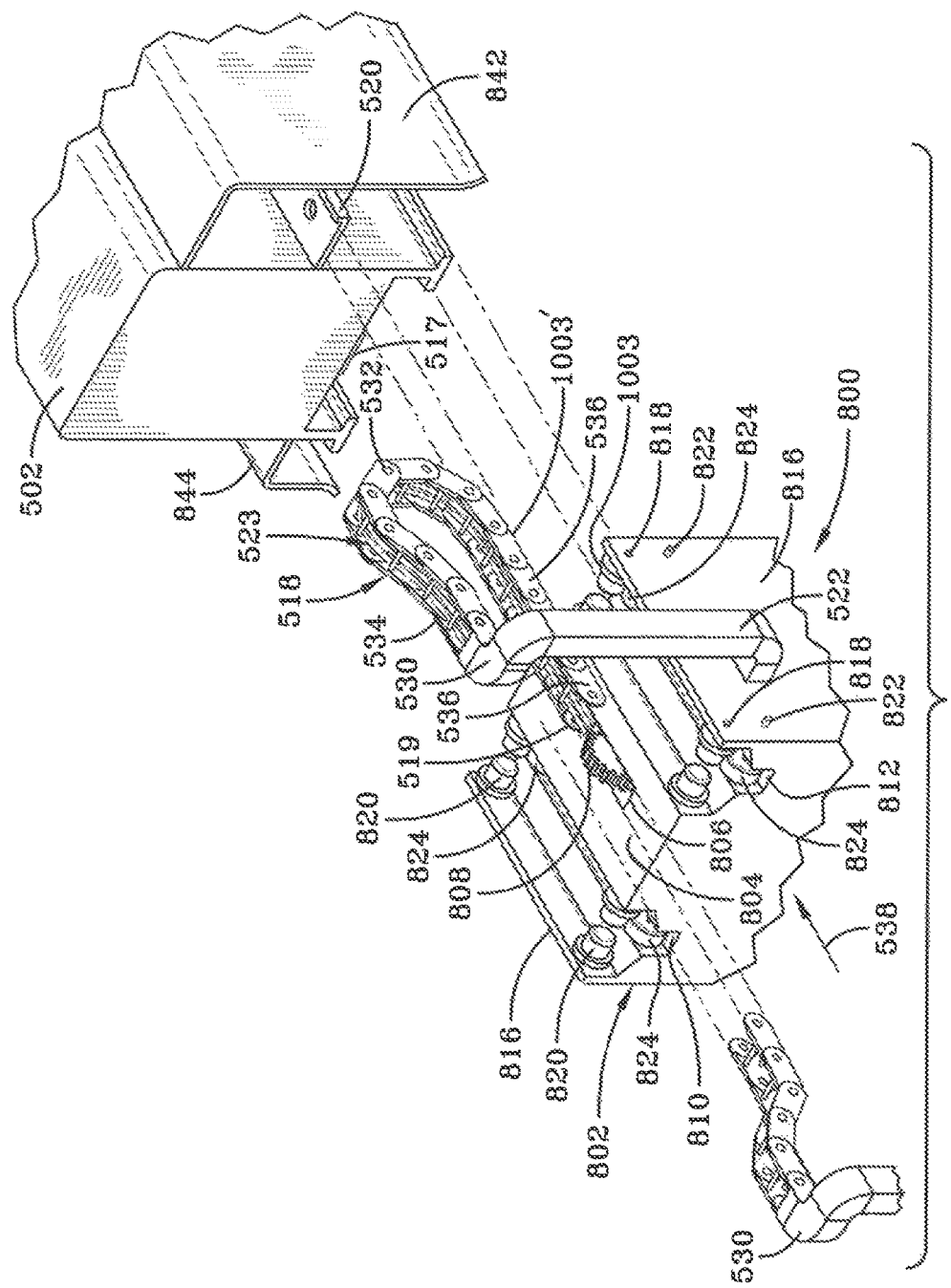
FIG. 17 is a perspective view of a flexible services carrier and a portion of a trolley according to an embodiment of the invention.

Power, hydraulic power hoses, control cables and any other necessary services transmitted along services transmitter lines 523 (FIG. 17) may be conducted within turbine tower 102 and along crane boom 502 to a location near its midpoint. There is another embodiment of the invention which is considered to be an improved system for moving a trolley along a crane boom. This is described below. Direct continuous connection of services to trolley 800 as it moves along crane boom 502 may be achieved by use of a modular carrier or flexible services carrier 518 connected together as shown in FIGS. 17-19. Modular carrier 518 is made of corrosion-resistant materials and plastics such as those manufactured by Gortrac Division of A&A Mfg. Co. Inc. or others. Modular carriers 518 are described in detail below.

Figure 20:
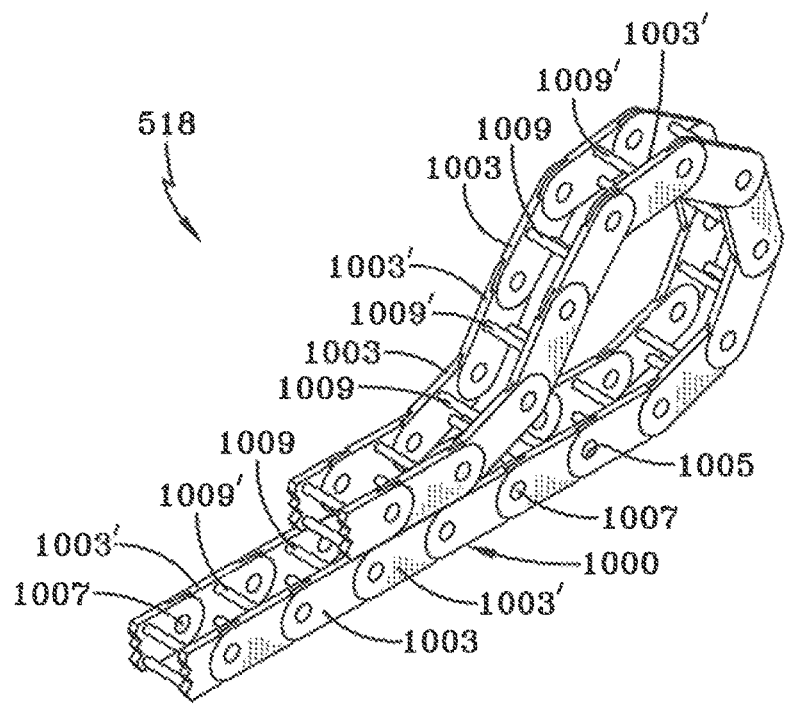
FIGS. 20 and 20A are partial perspective and partial side views of a rack chain drive for a modular carrier or flexible services carrier according to an aspect of the invention.
Figure 20A:
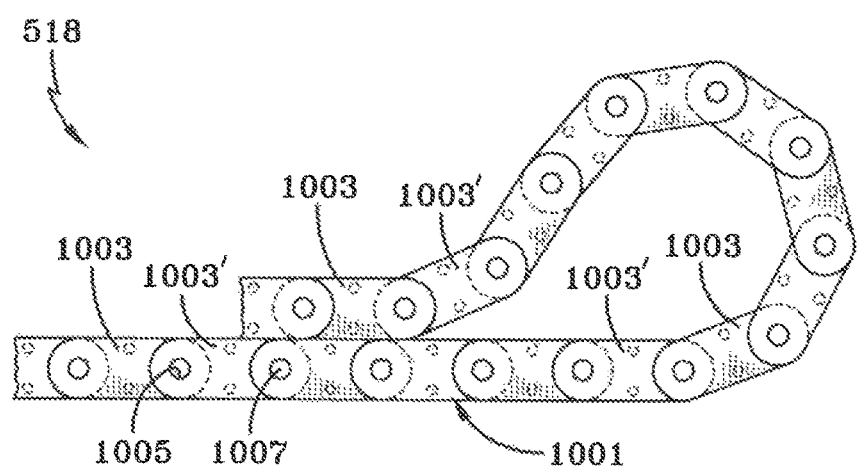

Modular carriers 518 as provided by the foregoing Gortrac Division can be Gortrac's Nylatrac®. Open-Style Modular Carriers which are constructed from standard components which can be modified to achieve a high strength, customized engineered carrier system. Modular carrier 518 can essentially have the features shown in FIGS. 20 and 20A, but variations and modifications would have to be made depending on the characteristics of each system in which the modular carrier 518 is used. Modular carrier 518 would comprise a series of chain links or carriers 1001, as shown in FIG. 20. Each chain link 1001 is composed of a side plate 1003 having an axle hole 1005 at either end. Each axle hole 1005 has an axle 1007 extending therethrough, and each side plate 1003 is attached to a separate offset plate 1003'. Each side plate 1003 is attached to an opposing side plate 1003 and connected thereto by cross bars 1009, and each offset side plate 1003' is attached to an opposing offset side plate 1003' and connected thereto by a cross bar 1009'. Modular carrier 518 is similar in construction and flexibility to a bicycle chain. The details of the Gortrac modular carrier could be obtained through their email address sales@gortrac.com.

Due to possible electromagnetic interference between electric power cables and control or communication cables, two carriers 518 may, be necessary, located on opposite sides of crane boom 502. Each modular carrier 518 would rest on a low services carrier tray 520 and a high services carrier tray 524 as shown in FIGS. 17, 17A, 18 and 19 attached one carrier height above, on each side of crane boom 502 as required. An upper end 534 of modular carrier 518 is fixed and proximate to a rigid services tube 522 which is connected to the top of trolley 800. A lower end 536 of modular carrier 518 is located on the side of crane boom 502. Rigid services tube 522 is connected between trolley 800 and upper end 834 of modular carrier 518. Rigid services tube 522 holds services transmitter lines 523 running from modular carrier 518 to operational devices in trolley 800 such as transportation devices, computer systems, hydraulically operated devices, etc., to which services transmitter lines 523 are connected to transmit whatever medium is transmitted by the respective services transmitter lines 523 to the foregoing devices. Modular carrier 518 is connected to trolley 800 and is somewhat longer than the length of the travel of trolley 800 and is directed horizontally away from attachment point 519 proximate the end of tray 520 closest to the midpoint of boom 502 (it is assumed that services transmitter lines 523 extend from turbine tower 102).

Figure 17A:
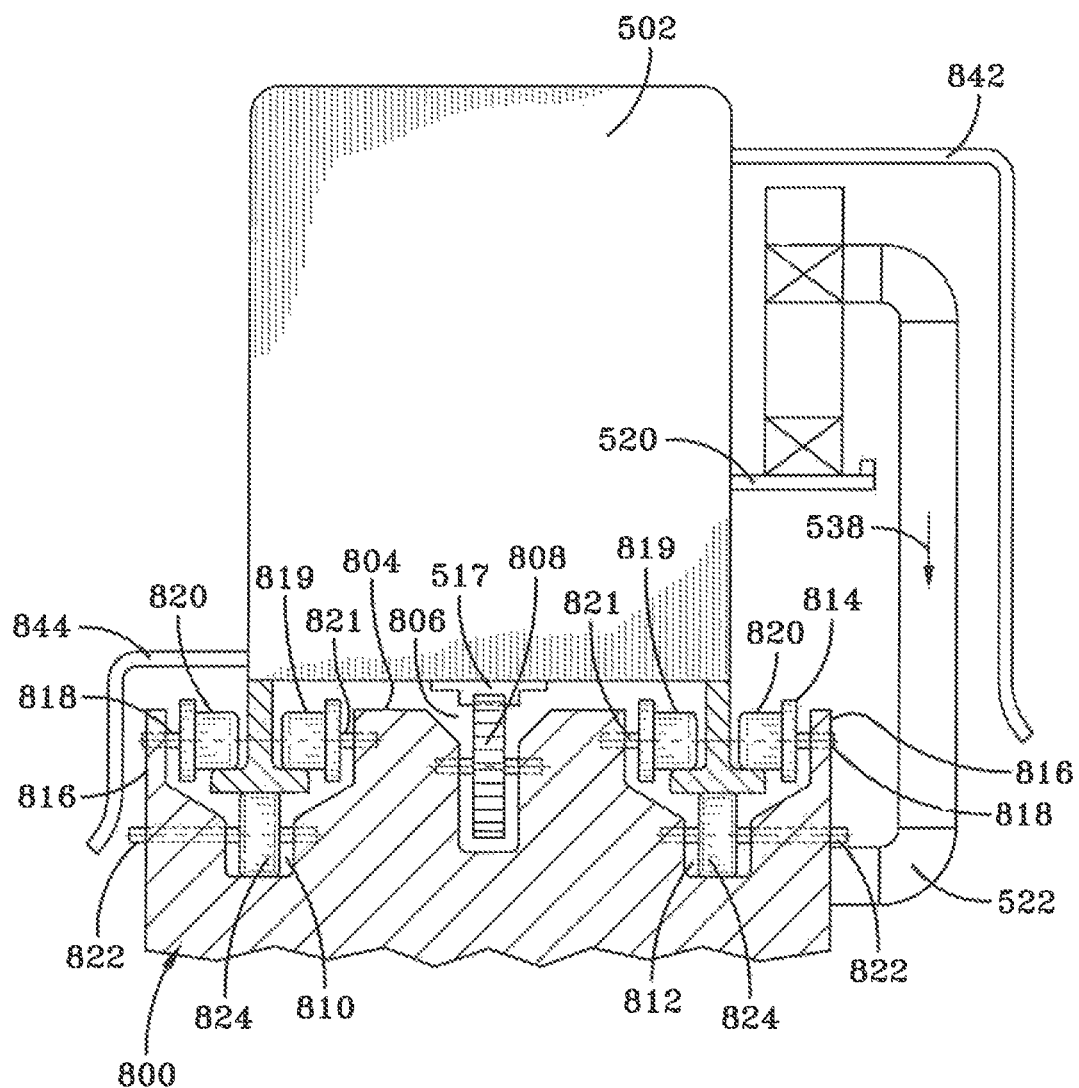
FIG. 17A is a schematic end view of a trolley, a crane boom and a rigid services carrier.

Referring to FIGS. 17 and 17A, trolley 800 includes a body portion 802 having roof 804 with an orifice 806 through which a gear drive 808 extends. Stepped channels 810, 812 extend longitudinally on the upper, outer sides of trolley 800. Axles 818, held by axle holders 814, extend through outer walls 816 of channels 810, 812 for guiding and weight-bearing wheels 820. Another set of lower axles 822 support a set of lower wheels 824 in the lower part of channels 810, 812, and guiding and upward force-resisting upper inboard axles 821 support guiding and weight-bearing wheels 819.

A loop 532 of modular carriers 518 moves between upper end 534 at an entrance and 530 of rigid services tube 522 and a lower end 536 on roof 804 of trolley 800. Upper end 534 of modular carrier 518 is higher above the path of trolley 800 than is lower end 536, and modular carrier 518 droops and forms a looped-over portion 532 as carrier 518 proceeds from upper end 534 slides to lower end 536.

As shown in FIGS. 17 and 17A, drive gear 808 engages a rack 517 fixed to the underside of crane boom 502. Lower wheels 824 are used to prevent excess upward movement of trolley 800 due to connection to any upwardly moving load such as maintenance capsule 10 during transfer operations for maintenance personnel and their tools, equipment and parts. A weather/rain cover 842 extends from crane boom 502 and covers rigid services tube 522, wheels 820 and services carrier tray 520. Another weather/rain cover 844 extends from crane boom 502 and covers wheels 820 on the opposite side of trolley 800 from rigid services tube 522 if a second services carrier is not necessary.

Services transmitter lines 523 carry the services for operating trolley 800 and could include electrical transmission services in the form of electrical conductor cables, control signal services, hydraulic system services and the like. In some cases, such as power cables and signal cables, a physical separation of such cables may be necessary. Therefore, a second modular carrier similar or identical to modular carrier 518 would be located on the opposite side of trolley 800.

If trolley 800 starts in close proximity to turbine tower 102 and travels outwardly along crane boom 502, the looped-over portion 532 of carrier 518 would then droop downwardly until it comes into contact with the upper surface of its lower portion and slides upon itself. As trolley 800 passes near the midpoint of crane boom 502, upper end 534 of modular services carrier 518 passes over lower attachment point 519 and thence onto a high support tray 524 upon which it slides as trolley 800 continues to move outwardly from turbine tower 102. The set of lower wheels 824 on top of trolley 800 is used to prevent excessive upward movement of trolley 800 due to connection to any upwardly moving load, such as a maintenance capsule 10 during transfer operations for maintenance personnel, their tools, equipment and parts. The set of lower wheels 824 are shown in FIGS. 17 and 17A.

Figure 21:
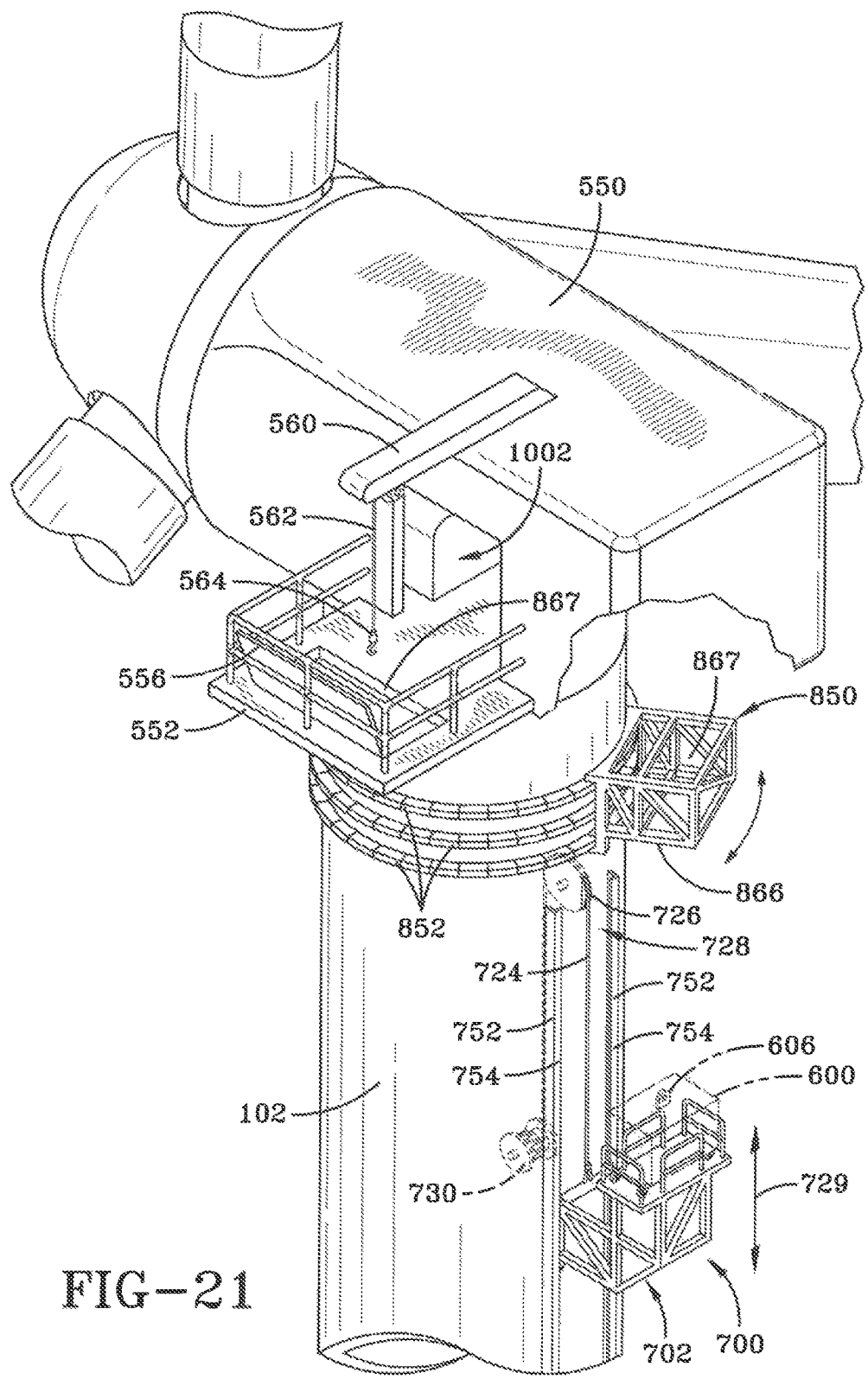
FIG. 21 is a schematic, perspective view of the upper portion of the turbine tower shown in FIG. 16.
Figure 22:
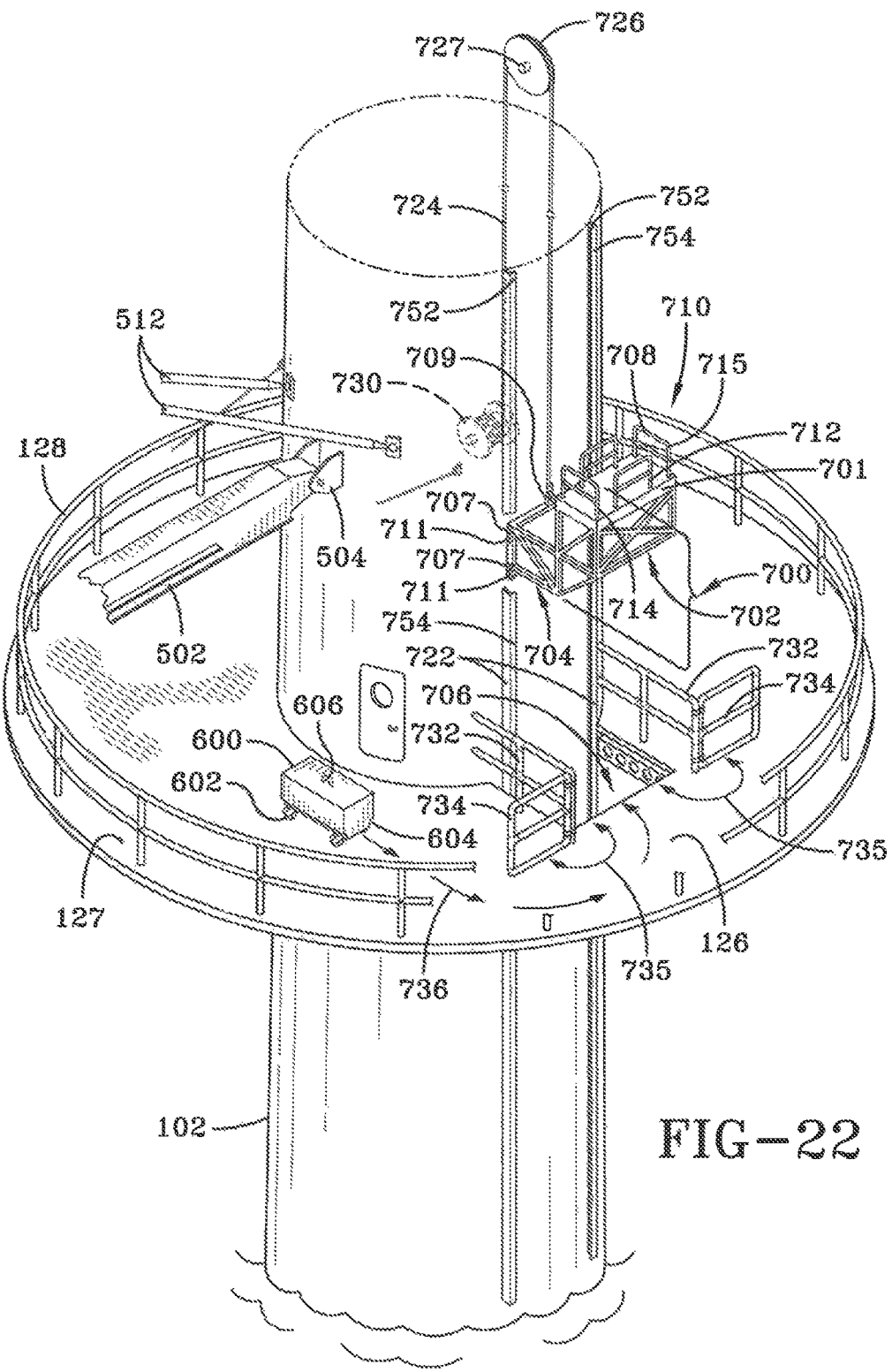
FIG. 22 is an enlarged view of a portion of the maintenance tower shown in FIGS. 16, 21 and 27 with aspects of the preferred embodiment of the invention incorporated therein.
Figure 23:
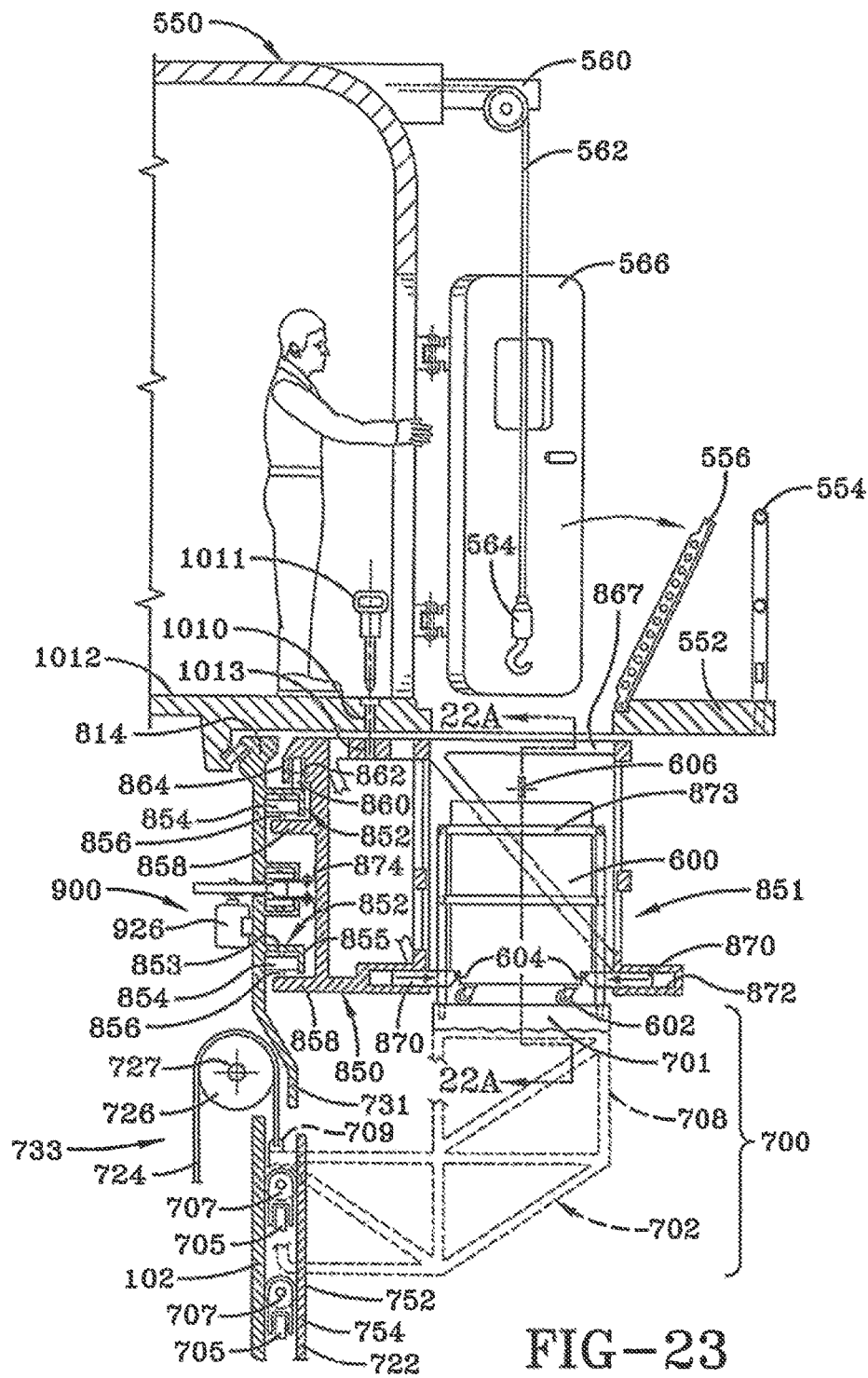
FIG. 23 is an enlarged, cross-sectional view of a nacelle on top of a turbine tower with various aspects of the preferred embodiment of the invention shown therein.
Figure 23A:
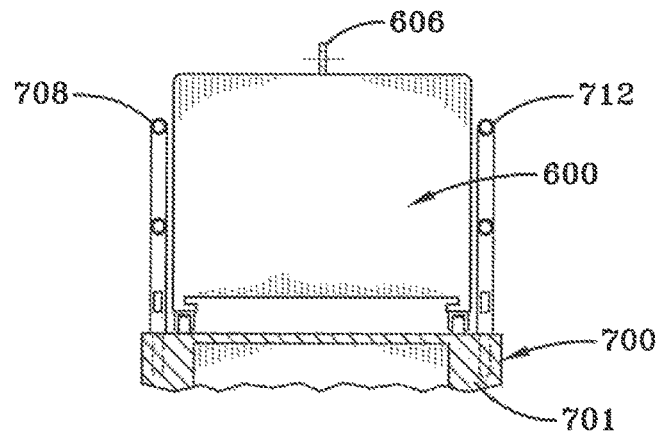
FIG. 23A is a partial, cutaway side view of a cargo elevator carrying a storage box.
Figure 24:
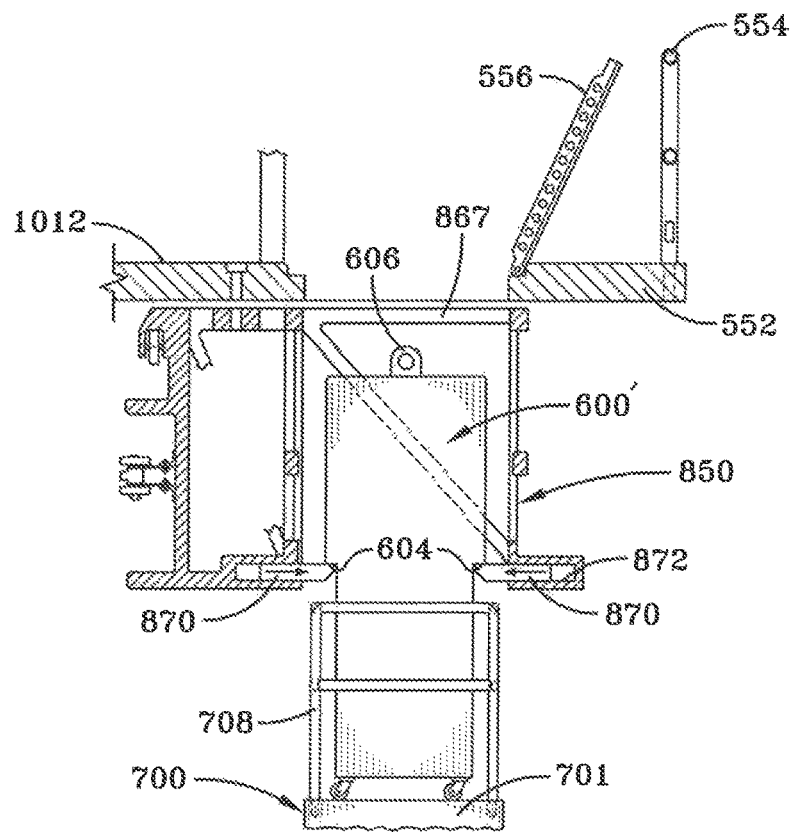
FIG. 24 is a side cross-sectional view of an extra-tall storage box on a partially shown cargo elevator.

Referring to FIGS. 21, 23 and 24, a cargo elevator 700 for carrying weatherproof storage box or frame 600 having casters 602 to permit storage box 600 to be easily rolled, with minimal effort, on a floor or deck 127 of access platform 126 (FIG. 16), on or off cargo elevator 700, and on a nacelle access platform 552 and thereafter into nacelle 550. Nacelle 550 also includes a generator 1002.

Storage box or frame 600 preferably has opposing bottom edge or shoulders or side recesses 604 (FIGS. 22, 23, 23A and 24), which can also be an extra-tall storage box 600' as shown in FIG. 23. Side recesses 604 have horizontal surfaces defining which are capable of supporting storage boxes or frame 600 or 600' by movable latches 870 in cargo carrier 850, as described below.

A pair of L-shaped parallel elevator guide tracks 722 extend vertically on tower 102 from below recessed opening 706 to nacelle 550 and have parallel track legs 752 and coplanar track arms 754.

Cargo elevator 700 (FIG. 22) has on its upper portion a platform or shelf 701, three sides of which have fixed side walls 708 and one removable wall 712. Cargo elevator 700 operates out of an access platform recessed opening 706 in floor 127 of access platform 126 to receive box or frame 600. Elevator guide tracks 722 may extend downwardly to below the surface of the sea to permit the placement of a box 600 directly on cargo elevator 700 from maintenance vessel 300 in calm weather. Elevator 700 further is composed of a lightweight structural frame 702. Structural frame 702 has a cargo elevator truck 704 holding retention wheels 707 on axles generally tangent to turbine tower 102, and side guide wheels 711 on axles generally perpendicular to the axles of retention wheels 707. The function of wheels 707 and 711 are discussed below. Elevator 700 may be positioned such that the upper surface of cargo elevator platform 701 is at the same height as the upper surface of platform 126 when cargo elevator 700 is positioned for loading or unloading at access platform 126. A guard rail 732 and gates 734 surround recessed opening 706 to prevent personnel from falling into opening 706 when elevator 700 is not present.

Cargo elevator 700 moves along guide tracks 722 by means of track-engagement-and-traveling assembly 710. The latter assembly comprises holding retention wheels 707 and side guide wheels 711. Cargo elevator truck 704 is guided and restrained laterally by cargo elevator guide tracks 722. Retention wheels 707 of truck 704 resist the moment applied by the load on cargo elevator 700 in the direction away from the vertical axis of the wind turbine tower 102 and side guide wheels 711 maintain truck 704 in guide tracks 722.

Movable cargo elevator 700 is attached to a cargo elevator cable 724 via a lifting lug 709 on elevator truck 704. A cable attachment structure 728 includes cargo elevator cable 724 and a cable lifting-and-lowering apparatus 733, which includes a pulley 726, a horizontal axle 727 on which pulley 726 is rotatably mounted and a winch 730. Pulley 726 is mounted for protruding out of tower 102 below nacelle 550 of turbine 100 to be connected to winch 730 which is used to raise or lower elevator 700 as desired. The movement of movable cargo elevator cable 724 is shown by an arrow 729 in FIG. 21. A rain cover 731 (FIG. 22) is utilized to prevent severe weather from driving salty sea spray or rain into the interior of the tower 102 where such materials could promote interior corrosion.

Due to wind, cargo box 600 on cargo elevator platform 701 will tend to be blown sideways, so fixed set of sturdy guard railings 708 with stanchions 714, 715, and removable guard railing 712 in the entryway to platform 701, are used to restrain the cargo laterally, as shown in FIG. 24. On the side where cargo box 600 is rolled onto platform 701, a sturdy hinged or removable blocking device in the form of tool and/or parts storage box blocking bar 716 is provided which can be fixed or latched to opposing side stanchions 715 and is used to prevent box 600 from rolling off the cargo elevator platform 701 in severe wind conditions during transit of elevator 700 up or down the turbine tower 102.

When cargo elevator 700 carries the box 600 up the side of tower 102, nacelle 550 may not be in a position where elevator 700 may transfer box 600 onto nacelle access platform 552. Thus, it is desirable to move box 600 around the periphery of tower 102 to a position under a cargo hatch 556 of nacelle access platform 552. Referring to FIGS. 21 and 23, nacelle 550 has cargo crane 560 that may lower a storage box line in the form of a cable 562 thereof, and maintenance personnel can then urge a lifting hook 564 to engage a lifting lug 606 of box 600. Cargo crane 560 can be used to lift box 600 sufficiently to allow cargo hatch 556 to be closed, allowing box 600 to be lowered onto the upper surface of hatch 556 which is then flush with platform 552 of nacelle 550 so that it may be rolled around on its castor wheels 602 on said surface as may be desired, and to enter nacelle 550 where the contents of box 600 may be utilized by maintenance personnel to effect the appropriate maintenance, etc.

The means by which box 600 may be moved around the periphery of tower 102 can be a cargo carrier 850, as shown in FIG. 21, which travels on a set of circumferential guide tracks 852, which support and guide cargo carrier 850 as it drives around the periphery of turbine tower 102, just below nacelle 550. With reference to FIG. 23, cargo carrier 850 comprises a holding frame 851 holding a tool and/or parts storage box 600. Cargo carrier 850 is restrained horizontally by a minimum of three vertical axis wheels 854 turning on vertical axles 856 affixed to outstanding portions 858 of cargo carrier 850. Cargo carrier 850 extends as a cantilever from parallel guide tracks 852. There are two circumferential guide tracks 852 shown, although other numbers of guide tracks 852 could be used depending on operating conditions. Each circumferential guide track 852 comprises a sideways, inverted L-shaped flange having a radial, horizontal flange part 853 extending radially from the turbine tower, and a vertical flange part 855 extending from exterior end of horizontal flange part 853. Cargo carrier 850 is supported vertically by a minimum of two horizontal axis wheels 860 running on horizontal flange part 853 of guide tracks 852. Wheels 860 turn on horizontal axles supported by an outstanding portion 864 of cargo carrier 850.

Holding frames 851 is composed of a light, strong, rigid structural frame 866 with a vertical aperture 867 capable of passing box 600 therethrough from the upper portion of cargo elevator 700. A set of horizontal receptacles 872 has the set of horizontally movable latches 870 (FIG. 23) which are part of cargo carrier 850 and which move inwardly therefrom to engage and support box 600 via recesses 604. Latches 870 may be moved inwardly or outwardly from apertures 872 in cargo carrier 850 to engage or disengage box 600 remotely by electro-mechanical or other actuator devices under the control of maintenance personnel or otherwise, when cargo elevator 700 is situated at the top of a cargo elevator guide track 720, and latches 870 support the entire weight of box 600 when the downward-facing portion of recess 604 is just above the otherwise supportive latches 870, so that said latches 870 when fully extended into vertical aperture 867, box 600 may be moved without being frictionally engaged by the latches 870 as it is hoisted out of the cargo carrier. Cargo carrier 850 further has a restraining bar 873 for restraining box 600 against movement on cargo carrier 850.

Turning next to FIGS. 25 and 25A-25C, a driving mechanism such as a rack chain drive 900 may be used to urge cargo carrier 850 around the periphery of turbine tower 102 with box 600 partially or totally within aperture 867, supported by latches 870 engaging recesses 604. A cargo carrier ring-locking structure 1020 in the form of a rack chain connector 874 (FIG. 23) of cargo carrier 850 is provided to allow a positive connection to the rack chain drive 900 via connectors 932. A cargo carrier ring-locking structure 1020 locks cargo carrier 850 to connector 932. This is shown in FIG. 23.

Gates 734 of access platform 126 are swingable through an arc indicated by arrows 735 as shown in FIG. 24. Gates 734 are moved to their open position once platform or shelf 701 of cargo elevator 700 is even with deck 127 of access platform 126 to enable wheeled storage box 600 to be moved on or off platform or shelf 701 along the path shown by arrows 736.

Still referring to FIG. 23, it is likely that turbine tower 102 is not perfectly circular since it is more than six meters in diameter, so that a rigid ring gear with internal teeth would be expected to experience variable clearances if it were to be rotated around the periphery of the turbine tower 102 in proximity to cargo carrier 850. Therefore, such a ring gear would experience unacceptable friction and wear of the respective contacting surfaces and variability in meshing of the gears. Furthermore, such a large ring gear would also be extremely difficult and costly to manufacture. An alternative might be a roller drive chain. However, if a roller drive chain were driven in a circular path around a large diameter object, this would require a horizontal supportive surface to avoid damaging sagging between the drive mechanism and the driven object. Also, if such a horizontal, supportive surface were present to support a commonly available drive chain, there would be considerable friction and wear on both the downward side of the chain and the top of the supportive surface where they contact.

Accordingly, with reference to FIGS. 25 and 25A-25C, rack chain drive or ring 900 in the form of an endless rack drive chain 901 is shown. Rack drive chain 901 is made of a rigid, corrosion resistant material such as a reinforced self-lubricating plastic. Rack drive chain 901 is composed of individual chain segments 902 which are also shown in FIGS. 25A, 26, 27 and 27A-D. Rack drive chain 901 has connective outstanding portions 903 at one end of chain segments 902, and outstanding portions 903 have connecting vertical holes 905. A corresponding inversion 907 (FIGS. 25, 27B and 27D) at the other end has two vertical access holes 909, both of which receive a connecting pin 906. Connecting pins 906 connect segments 902 end-to-end with each other to permit the construction of endless chain 901. Further, each pin 906 is fitted with a wheel 908 on opposing sides of each segment 902, such that when rack drive chain 901 is closely wrapped around turbine tower 102, there is a clearance C shown in FIG. 25B between the innermost tips of respective gear teeth and the outer edge of turbine tower 102 as wheels 908 ride on the outer surface of turbine tower 102, avoiding friction between the inward-facing gear teeth and the tower 102.

Figure 26:
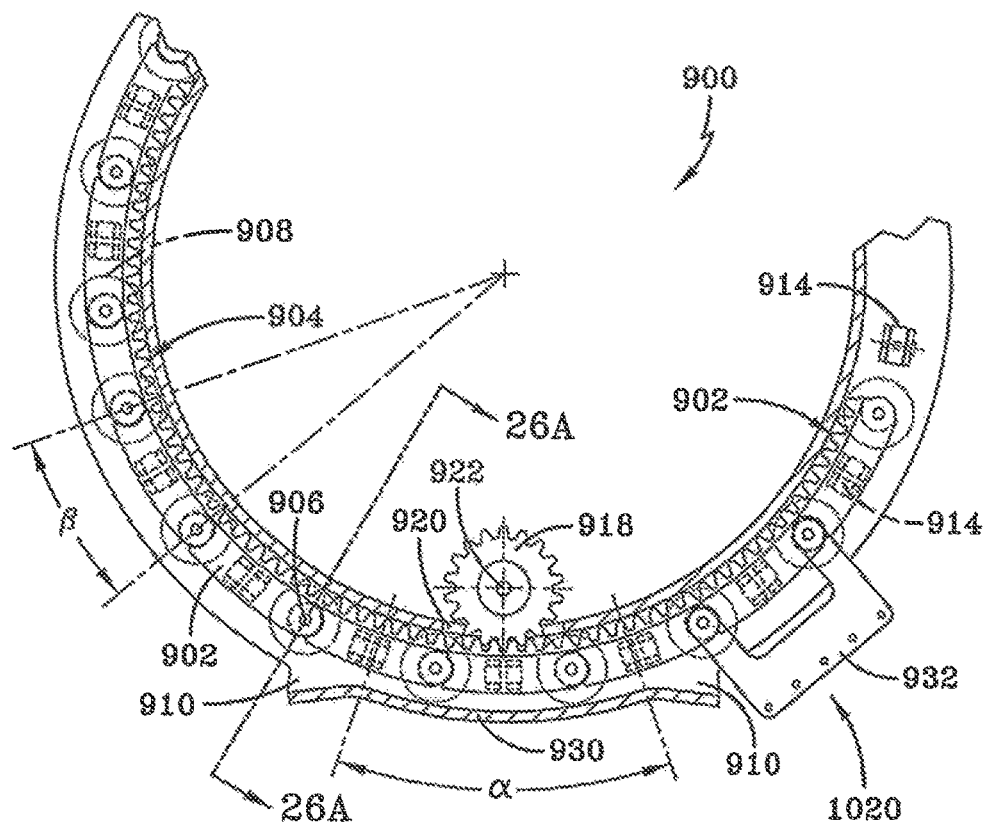
FIGS. 26 and 26A are schematic, cross-sectional and perspective views of the rack drive chain shown in FIG. 20 and how it is used in the preferred embodiment of the present invention.
Figure 27:
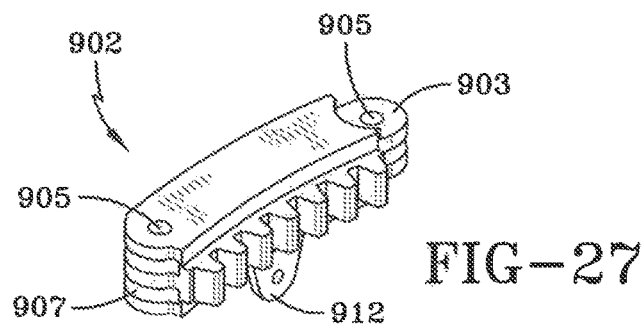
FIG. 27 is a perspective view of a drive chain segment.
Figure 27A:
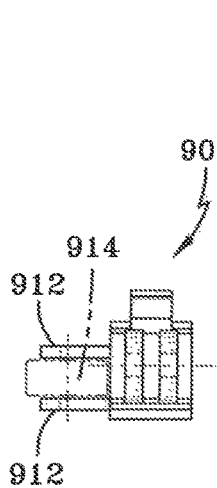
FIGS. 27A-27D are detailed views of a drive chain segment as shown in FIGS. 20-20B and 27.
Figure 27B:
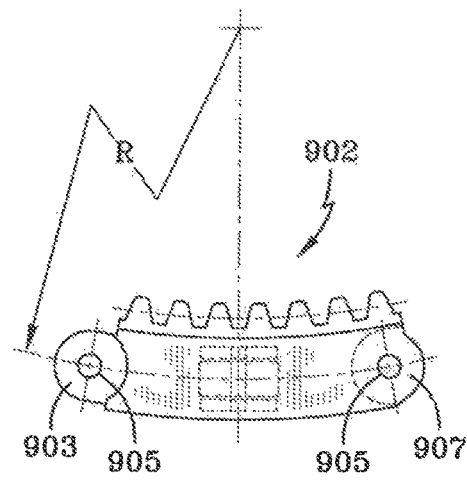
Figure 27C:
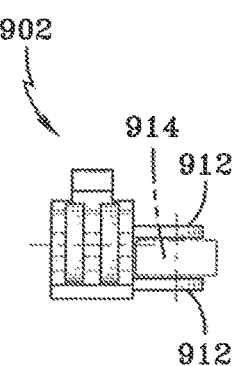
Figure 27D:
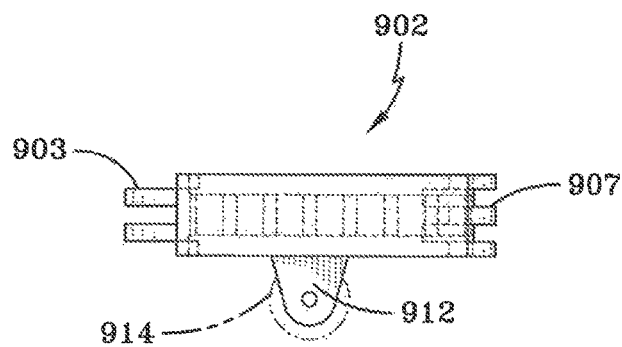

Referring to FIG. 26, it can be seen that each chain segment 902 is identical with each other except for one or more special segments 904. A perspective view of a chain segment 902 is shown in FIG. 27. Segments 904 are selected from a set of special segments which have a decreasing integral number of teeth as compared to each "typical" segment 902, so that excessive clearance between rack drive chain 901 and the outer surface of turbine tower 102 can be adjusted as required for initial installation, or to compensate for wear or stretching of rack drive chain 901 in service. This is accomplished by removal of one or more segments 902 and replacement with appropriate shorter special segments 904. Each chain segment 902 has an internal gear rack 913 which forms the interior respective segments 902.

Figure 25:
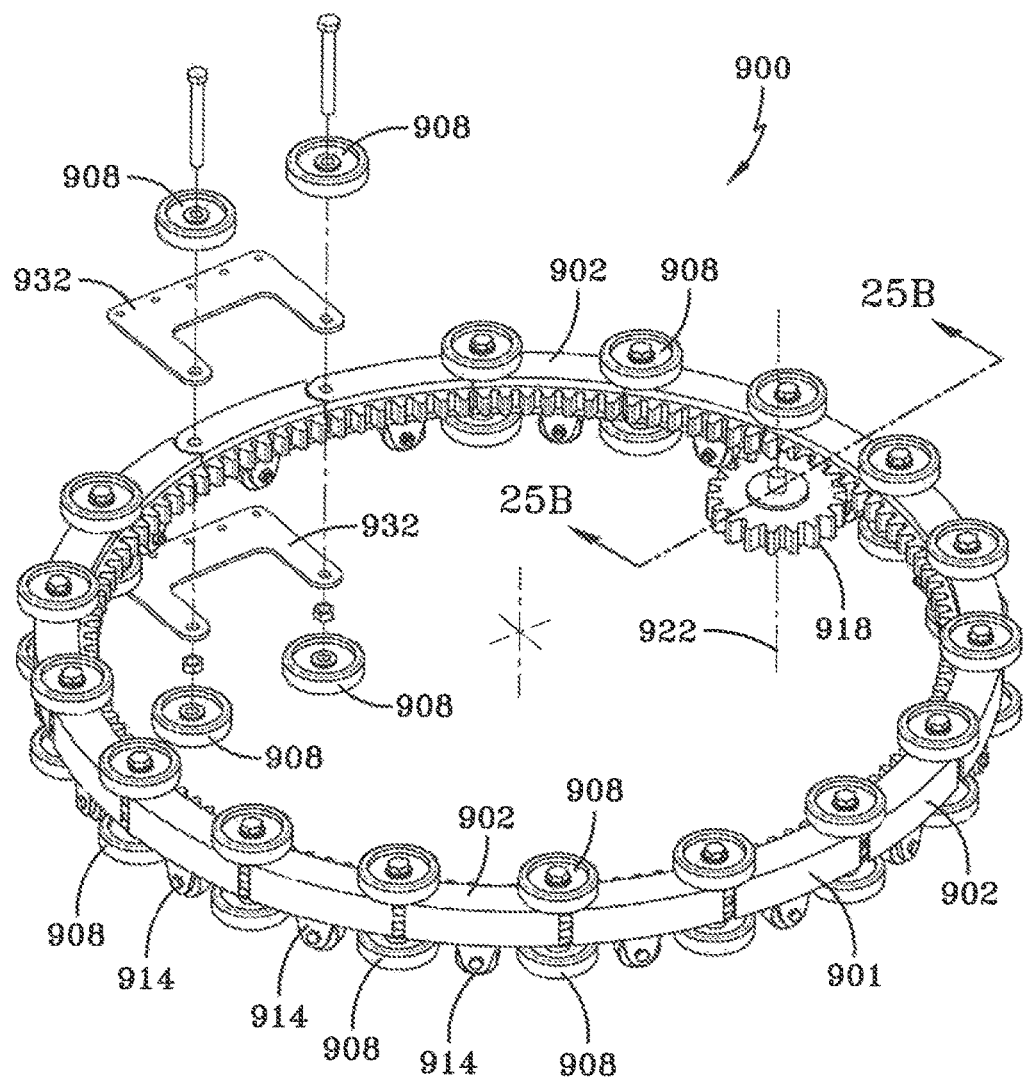
FIGS. 25, 25A, 25B and 25C are perspective, schematic views showing portions of a rack drive chain used with the preferred embodiment of the invention.
Figure 25C:
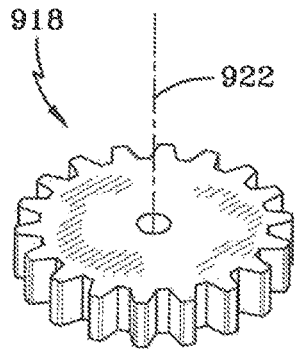
Figure 25A:
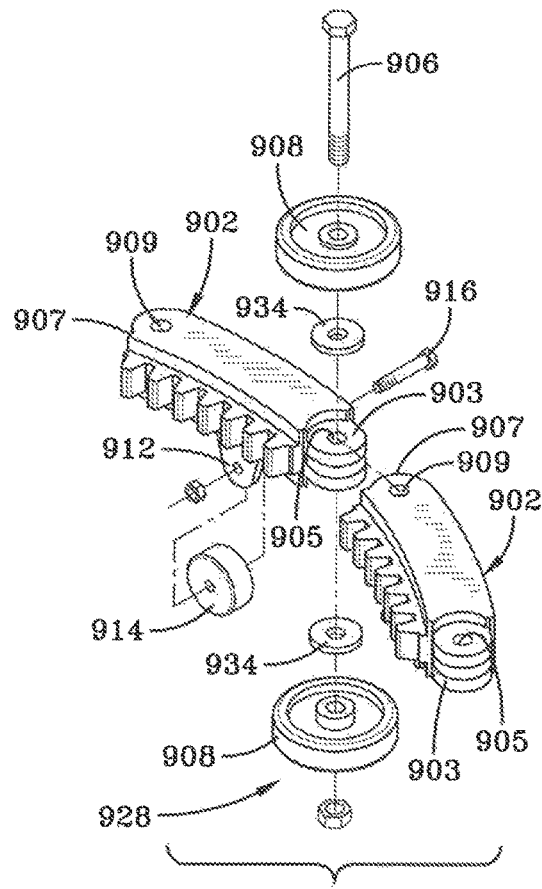
Figure 25B:
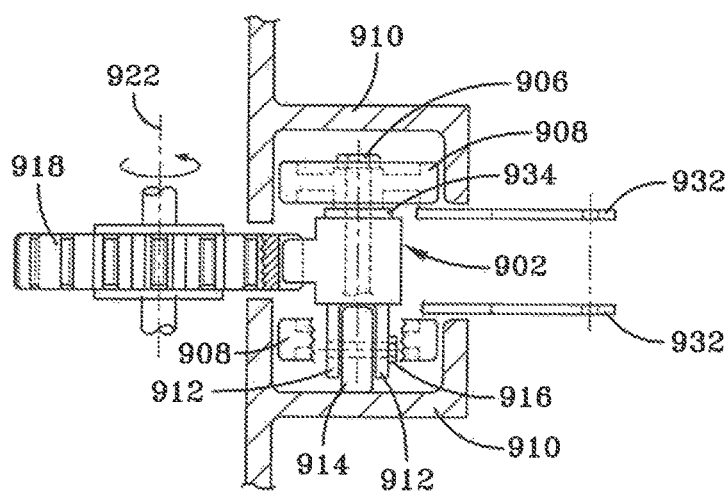

Since rack drive chain 901 is to travel around turbine tower 102 on a horizontal surface on the side of tower 102, a support flange 910 is provided and is shown in FIGS. 25B and 26. Each chain segment 902 and 904 has vertical outstanding flanges 912 shown in FIGS. 25B, 26 and 27A-27D, for the installation of at least one support wheel 914 as shown in FIG. 25B. Each support wheel 914 is mounted on an axle 916, as shown in FIG. 25B. Each axle 916 is oriented radially towards the center of turbine tower 102 so that wheels 914 will roll on, and not skid on, support flange 910. Wheels 908 and 914 each reduce the frictional resistance to the movement of rack drive chain 901 on its path around turbine tower 102.

Axles 916 and each connective pin 906 are secured to respective support wheels 914 by a locking or securing mechanism 928 as shown in FIG. 25A. Rack drive chain 901 is driven around turbine tower 102 by engagement with drive gear 918 as shown in FIG. 25. A drive gear 918 protrudes through the wall of turbine tower 102 via a slot 920. Drive gear 918 is rotated about a vertical axis 922 shown in FIGS. 25B and 26 by a motor and gear box or other drive assembly, referred to generally by numeral 926 shown in FIG. 22. Drive assembly 926 is controlled by the maintenance personnel on board wind turbine 100.

A clutch is preferably provided between a gear box shaft and drive gear 918 to permit drive gear 918 (FIGS. 25, 25B and 26) to be disconnected from the assembly 926 when necessary and allow the cargo carrier 850 to remain in synchronization with the access hatch of the nacelle access platform 552 while maintenance is in progress. Turning to FIG. 23, the clutch is preferably interconnected with an opening 1010 in a nacelle floor 1012, through which a pin 1011 is inserted to engage a receiving hole 1013 in the upper portion of cargo carrier 850 such that as pin 1010 is inserted by maintenance personnel to lock cargo carrier 850 and the nacelle 550 together. The clutch is caused to be disengaged by an electro-mechanical device, such that the rotation of nacelle 550 to follow the varying direction of the wind, and will not back drive the drive assembly and thereby damaging it. The reverse process, where pin 1011 is removed to unlock cargo carrier 850 from nacelle 550, causes the clutch to re-engage to allow rack chain drive 901 to be used to move cargo carrier 850 as desired around the periphery of turbine tower 102. In the area adjacent to drive gear 918, rack drive chain 901 will tend to ride out of engagement with drive gear 918 due to the tooth profile and any slack in rack chain drive 901, so a means of retention in this area is necessary. Thus, short length vertical circumferential walls 930 (FIG. 26A) spaced outward from the wall of turbine tower 102 on which wheels 908 ride by a distance equal to the diameter of wheels 908, plus an acceptable clearance, such that engagement of the gear teeth with rack drive chain 901 and drive gear 918, are maintained. These circumferential walls are centered about drive gear 918 and extend circumferentially for a length not less than two chain segments 902 that have additional outwardly-angled end pieces to guide rack drive chain 901 into proper engagement with drive gear 918.

Figure 26A:
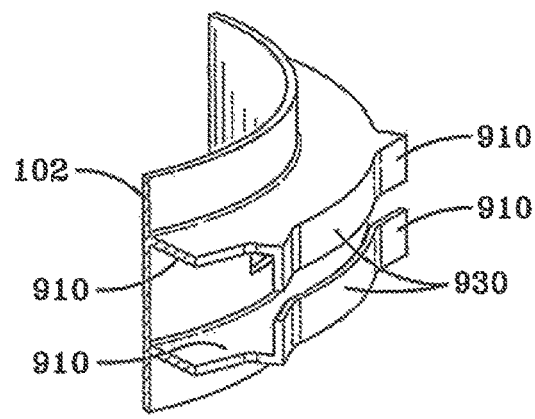

Cargo carrier 850 connects to rack drive chain 901 by means of cargo carrier ring-locking structure 1020. Structure 1020 includes connectors 932 as shown in FIG. 26. Connectors 932 replace spacer washers 934 (FIG. 25B) which are normally fitted on connecting pins 906 for connecting one or more rack drive chain segments 902. Connectors 932 extend beyond the horizontal extent of restraining circumferential walls 930, as shown in FIG. 26A sufficient to allow connection to a rack chain connector 874 in cargo carrier 850 as shown in FIG. 22. In order to allow the free passage of connectors 932 past circumferential walls 930, upper and lower walls 930 are separated by a gap 933 sufficient to prevent any contact between themselves and connectors 932 or any portion of cargo carrier 800.

The operation of the preferred embodiment of the invention will now be described. Maintenance vessel 300 with maintenance capsules 10 loaded on board would travel to a wind turbine tower apparatus 100 in an offshore wind turbine farm along an optimal path to attend to the maintenance of wind turbine 101 and numerous others as determined by a preventative maintenance schedule modified by unscheduled problems reported from various turbines via telemetry. As explained earlier, when the weather is good, there is no need to expedite the maintenance service, and maintenance vessel 300 would travel into close proximity of a wind turbine tower apparatus 100 for a minute or two to deploy an appropriate maintenance capsule 10. Swivelable crane assembly 104 (or a fixed maintenance crane 500 discussed below) would be remotely activated before the close approach of maintenance vessel 300 by one or more personnel either on wind turbine tower 102 or on board vessel 300. Maintenance vessel 300 would be moved downstream of tower apparatus 100 (the downstream direction is defined herein as the direction of drift of an unpowered vessel in the vicinity of the respective wind turbine tower apparatus 100 most directly away from said wind turbine tower apparatus 100). Truss 108 of crane assembly 104 is rotated about tower 102 on lower annular support rail 134 and upper annular support rail 154 (FIG. 3) extending around tower 102, to be in the downstream direction of maintenance vessel 300 (fixed crane boom 502, shown in FIG. 16, would not be rotated). Trolley 124 (or trolley 800) is activated and caused to travel along truss 108 (or crane boom 502) towards the end of truss 108 (or crane boom 502), and capsule attachment line 48 is lowered from winch 224, and attached directly to maintenance capsule 10 directly below, aboard the maintenance vessel 300. The maintenance capsule 10 is then lifted to a height just above the level of walkway 126 (FIG. 2, or as shown by an arrow 505 in FIG. 16) by said winch 224, so that the maintenance personnel and equipment can easily be unloaded to walkway 126. At this height, maintenance capsule 10 is engaged at its shoulder 42 by latch arms 238 (FIG. 4) of latch assembly 236 of trolley 124 (or trolley 800). When winch 224 winds up capsule attachment line 48, it does so through tensioning guide rollers 228 which may be driven to maintain a minimum suitable tension in said towrope or capsule attachment line 48 when it is wound onto the drum of winch 224. If winch 224 on trolley 124 (or trolley 800) lifts maintenance capsule 10 directly from L/R cradle 302 of vessel 300, it should do so at a rate exceeding the maximum vertical speed of maintenance vessel 300 as it rides on the sea. The reason for having maintenance vessel 300 located downstream from wind turbine tower apparatus 100 is to prevent vessel 300 from colliding with wind turbine tower 102 in the event there is propulsion engine failure. If the latter occurs, maintenance vessel 300 would drift away from tower 102 rather than running the risk of colliding with it Thus, in all weathers, the captain would drive vessel 300 in reverse generally towards wind turbine tower 102, orienting maintenance vessel 300 so that its stern or rear end is adjacent to wind turbine tower apparatus 100 to enable fast unloading of capsule 10, and to enable it to drive away quickly in case problems arise.

Winch 224 and its associated equipment should be operated remotely. Likewise, swivelable crane assembly 104 should be operated remotely and caused to rotate about the vertical axis of tower 102 so as to extend its main boom or truss 108 in the downstream direction, and to remotely drive trolley 124 (or trolley 800) as far as necessary outwardly from wind turbine tower apparatus 100 in the direction of the free end of truss 108.

When the capsule attachment line 48 of winch 224 of trolley 124 (or trolley 800) is lowered to maintenance capsule 10 for locking onto the top of capsule 10, care must be taken to allow for enough slack in capsule attachment line 48 so that even if the difference between winch 224 and maintenance vessel 300 is in a wave trough, capsule attachment line 48 will not become taut, as this may endanger personnel on board maintenance capsule 10 or cause capsule 10 to inadvertently detach from L/R cradle 302 on vessel 300.

As soon as maintenance capsule 10 is lifted clear of vessel 300, vessel 300 should be propelled away from beneath capsule 10. The retraction speed of capsule attachment line 48 may then be varied as desired, and should be slowed as maintenance capsule 10 approaches latch assembly 236 on trolley 124 (or trolley 800) so that the maintenance personnel aboard would not be subjected to objectionable or dangerous decelerations when maintenance capsule 10 docks with trolley 124 (or trolley 800). If access door assembly 30 of capsule 10 is not facing wind turbine tower 102, the rotational drive of trolley 124 (or trolley 800) should be activated to rotate capsule 10 on rotational bearings 206 so that access doors 28 and 30 can be opened in the direction of access platform 126.

After trolley 124 (or trolley 800) is attached to maintenance capsule 10, trolley 124 (or trolley 800) is driven back along truss 108 (or crane boom 502) until capsule 10 comes alongside platform 126 of wind turbine tower apparatus 100. The maintenance personnel swing away the nearest portion of safety fence 128 of walkway 126, and disembark from capsule 10 with their equipment and perform the necessary maintenance.

After the required maintenance has been conducted, the foregoing process is reversed. The maintenance personnel load their equipment into cargo compartment 20 of capsule 10 and enter personnel compartment 18. If the sea is dead calm, the capsule 10 may be lowered directly onto L/R cradle 302. If the sea is relatively calm, the maintenance personnel may opt to lower recovery cable or towrope 80 from the bottom of maintenance capsule 10 to L/R cradle 302 of maintenance vessel 300, where personnel of vessel 300 would attach towrope 80 to winch 356 beneath L/R cradle 302. There must be enough slack left in towrope 80 for the reasons explained above.

The braking system of winch 224 is activated and latch arms 235 are detached from annular recess 42 of capsule 10. Said braking system is set to a tension equal the weight of maintenance capsule 10 plus an amount to appropriately tension recovery cable or towrope 80 to keep it relatively straight. Winch 356 of L/R cradle 302 on vessel 300 is engaged to pull maintenance capsule 10 against the tension of the braking system of winch 224 at a speed exceeding the maximum speed of which maintenance vessel 300 may rise as the sea swells, until maintenance capsule 10 sets into L/R cradle 302 which is raised to absorb the shock of docking and whose shock is absorbed by shock absorbers 360. Capsule attachment line 48 from winch 224 is forcibly disengaged from the top of maintenance capsule 10, maintenance vessel 300 is propelled away from wind turbine tower apparatus 100, and attachment line 48 is retracted.

If the weather has become more severe where it exceeds the capability of the system to recover maintenance capsule 10 directly from tower apparatus 100 to L/R cradle 302 aboard maintenance vessel 300, the maintenance personnel in capsule 10 may opt to disengage the attachment latch arms 238 and have winch 224 of wind turbine tower apparatus 100 lower maintenance capsule 10 into the sea where capsule attachment line 48 of turbine winch 224 is forcibly disengaged for a downstream sea recovery of the capsule by maintenance vessel 300, and the attachment line 48 is retracted.

Alternatively, the maintenance personnel may opt to disengage the turbine hoist capsule attachment line 48 from the top of maintenance capsule 10, and open attachment latch arms 238 to effect the dropping of maintenance capsule 10 directly into the sea downstream of wind turbine tower apparatus 100 for a sea recovery by maintenance vessel 300 at a safe distance from tower apparatus 100. Sea recovery entails the ejection of floating towrope 80 from the bottom of maintenance capsule 10 as it floats on the sea, and the snagging of floating towrope 80 by maintenance vessel 300 which uses towrope 80 to haul capsule 10 up raisable ramp 368 using a sea recovery winch aboard vessel 300. This is the same manner in which a whaling ship hauls a dead whale on board.

In severe weather, a different mode is required to transfer maintenance personnel and their associated equipment onto wind turbine tower apparatus 100. When the weather is most severe, (unless fixed maintenance crane 500 is being used) swivelable crane assembly 104 is remotely operated to rotate truss 108 about its vertical axis so as to extend truss 108 in the downstream direction, and drive trolley 124 as far as necessary outwardly from tower 102 in the downstream direction on truss 108. Maintenance vessel 300 does as when the weather is calm, have its stern portion closest to wind turbine tower apparatus 100, with the maintenance capsule 10 to be used on board. Winch 224 (FIG. 4), controlled remotely, is caused to lower its hoist capsule attachment line 48 with its end float into the sea. Enough cable is reeled out so that it streams out downstream a safe distance to where maintenance vessel 300 is able to snag capsule attachment line 48. The end of capsule attachment line 48 is then locked onto the top of maintenance capsule 10.

Maintenance vessel 10 is backed up as close as possible to tower apparatus 100 while truss winch 224 continues to take up slack in capsule attachment line 48, rapidly taking in and reeling out line as vessel 300 rises and falls due to the motion of the sea. This occurs until the angle between capsule attachment line 48 and an imaginary vertical line reaches an acceptable value. Then, winch 224 is remotely controlled to forcibly retract capsule attachment line 48 at a speed faster than maintenance vessel 300 rises on the sea as the sea swells. This causes capsule 10 to be released from retaining rollers 319 of L/R cradle 302, lifting maintenance capsule 10 clear of maintenance vessel 300. As soon as maintenance capsule 10 is lifted clear, the propulsion system of maintenance vessel 300 is engaged to propel it away from capsule 10 and consequently wind turbine tower apparatus 100. The retraction speed of capsule attachment line 48 may be varied, and should be slowed as maintenance capsule 10 approaches latching assembly 235 of trolley 124 (or trolley 800), when maintenance capsule 10 docks with trolley 124.

Once maintenance capsule 10 is securely latched onto trolley 124 (or trolley 800), the maintenance personnel with their associated equipment are transferred to access walkway 126 of tower 102 as described above with respect to calm weather deployment procedure.

Most of the equipment discussed above could be modified from existing apparatus. The components of wind turbine tower apparatus 100, including wind turbine 101, tower 102 and walkway 126 may be acceptable as they are presently used in the field. The use of insulated, seaworthy maintenance capsule 10 with its shock absorbing seats 14, above a sealed cargo compartment 20 which restrains tools and parts, is extremely safe even if capsule 10 is struck or ends up in the sea. The use of the downstream location of vessel 300 offers added protection even if there is failure of the propulsion system of vessel 300. Trolley 124 (or trolley 800) can be operated manually, along with the components of trolley 124 (or trolley 800), adding another degree of safety. Although vessel 300 could be modified from existing vessels, it may be necessary to produce a new vessel because of the novel features involved.

The invention has been described in detail with particular reference to the preferred embodiments thereof, and variations and modifications within the spirit and scope of the invention may occur to those skilled in the art to which the invention pertains.

The invention claimed is:

1. A container for use in an offshore wind turbine maintenance program, said container being constructed to safely survive being disposed and briefly submerged in the sea and protect maintenance people and cargo located in said container, said container comprising:
   an outer wall for said container, said outer wall being seaworthy and watertight for rendering said container floatable;
   a personnel compartment within said outer wall for holding at least one maintenance person;
   a cargo compartment within said outer wall for holding cargo;
   a watertight bulkhead separating said personnel compartment from said cargo compartment;
   at least one access door assembly for opening and closing said outer wall to said personnel compartment for enabling at least one maintenance person to enter and exit said container;
   a truncated conical shell including a forward truncated end portion and a rearward truncated end portion of said container, said truncated conical shell further including a forward endmost section and a rearward endmost section; and
   a capsule attachment line holding-and-releasing apparatus disposed in one of said endmost sections for selectively holding and selectively releasing a capsule attachment line from said receptacle for selectively enabling said at least one container to be moved to or from a wind turbine tower, said holding-and-releasing apparatus including:
      a receptacle for receiving and discharging a capsule attachment line; and
      a capsule attachment line engaging apparatus for being secured to a capsule engagement line.

2. A container according to claim 1 wherein said holding-and-releasing apparatus further comprises: a releasable holding mechanism for selectively holding a capsule attachment line to enable said container to be pulled or released by the capsule attachment line.

3. A container according to claim 1 and further comprising:
   an attachment line discharge port for receiving and releasing said capsule attachment line.

4. A container according to claim 1 and further comprising: a towrope storage compartment for storing a towrope for being grasped to enable the pulling of said container; a homing boat for optionally taking a part of said towing rope to a maintenance water vessel; and a launch tube for storing said homing boat.

5. A container according to claim 1 wherein said personnel compartment comprises: a seat for supporting a person in said personnel compartment, and a shock absorbing system operatively connected to said seat for absorbing shocks applied to said seat.

6. A container according to claim 1 wherein a capsule attachment line is received in and paid out in one of said endmost section of said truncated conical shell.

7. A container according to claim 1 and further comprising an operational compartment and operational compartment outer walls around said operational compartment, and air vents through said operational compartment outer walls to enable said capsule to ventilate air or drain water from said operational compartment when said container is dropped into the sea.

8. A container according to claim 1 wherein when said container includes a central longitudinal axis extending through said endmost section of said truncated conical shell;
 when said container is disposed and briefly submerged in the sea, said longitudinal axis approximates the horizontal direction; and
 wherein said cargo compartment is disposed below said personnel compartment due to the higher weight in said cargo compartment.

9. A container according to claim 1 wherein said personnel compartment is located closer to said forward endmost section of said truncated conical shell than the location of said cargo compartment.

10. A container according to claim 1 wherein said capsule attachment line holding-and-releasing apparatus comprises:
 a barb attached to a capsule engagement line;
 a holding mechanism for releasably holding said barb and the capsule engagement line having said barb attached thereto; and
 apparatus for selectively releasing said barb from said holding mechanism.

11. A seaworthy, watertight, floatable container for use in an offshore wind turbine maintenance program, said container being able to safely survive being disposed in the sea and protect maintenance people and cargo located in said container, said container including: at least one access door assembly for enabling cargo and any maintenance persons to be loaded and unloaded from said container, a capsule attachment line holding-and-releasing apparatus for selectively holding and selectively releasing a capsule attachment line for selectively enabling said at least one container to be moved to or from a wind turbine tower, and a towrope storage compartment for storing a towrope for being grasped to enable the pulling of said container; a homing boat for optionally taking a part of said towing rope to a maintenance water vessel; and a launch tube for storing said homing boat.

12. A seaworthy, watertight, floatable container for use in an offshore wind turbine maintenance program, said container being able to safely survive being disposed in the sea and protect maintenance people and cargo located in said container, said container including:
 at least one access door assembly for enabling cargo and at least one maintenance person to be loaded and unloaded from said container;
 a capsule attachment line holding-and-releasing apparatus for selectively holding and selectively releasing a capsule attachment line for selectively enabling said at least one container to be moved to or from a wind turbine tower; and
 a truncated outer shell defining the exterior of said container, said truncated outer shell having a nose portion, wherein said capsule attachment line discharge port is located in said nose portion.

\* \* \* \* \*